(12) United States Patent
Laroche et al.

(10) Patent No.: US 10,834,412 B2
(45) Date of Patent: Nov. 10, 2020

(54) METHOD AND APPARATUS FOR ENCODING OR DECODING BLOCKS OF PIXEL

(71) Applicant: CANON KABUSHIKI KAISHA, Tokyo (JP)

(72) Inventors: Guillaume Laroche, Melesse (FR); Christophe Gisquet, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/102,508

(22) PCT Filed: Dec. 10, 2014

(86) PCT No.: PCT/EP2014/077297
§ 371 (c)(1),
(2) Date: Jun. 7, 2016

(87) PCT Pub. No.: WO2015/086718
PCT Pub. Date: Jun. 18, 2015

(65) Prior Publication Data
US 2016/0309172 A1 Oct. 20, 2016

(30) Foreign Application Priority Data

Dec. 10, 2013 (GB) .................................. 1321850.8
Dec. 18, 2013 (GB) .................................. 1322468.8
Mar. 4, 2014 (GB) .................................. 1403823.6

(51) Int. Cl.
*H04N 19/186* (2014.01)
*H04N 19/593* (2014.01)
(Continued)

(52) U.S. Cl.
CPC ......... *H04N 19/186* (2014.11); *H04N 19/176* (2014.11); *H04N 19/463* (2014.11); *H04N 19/593* (2014.11); *H04N 19/94* (2014.11)

(58) Field of Classification Search
CPC .. H04N 19/186; H04N 19/593; H04N 19/176; H04N 19/463
(Continued)

(56) References Cited

U.S. PATENT DOCUMENTS 6,023,558 A 2/2000 Grabowski
7,903,740 B2 3/2011 Chujoh et al.
(Continued)

FOREIGN PATENT DOCUMENTS

CN 1625893 A 6/2005
CN 1713719 A 12/2005
(Continued)

OTHER PUBLICATIONS

Gisquet et al., "AhG10: palette predictor stuffing", Joint Collaborative Team on Video Coding (JCT-YC) of ITU-T SG 16 WP 3 and ISO/IEC JTC I/SC 29/WG 11, 17th Meeting: Valencia, ES, Mar. 27-Apr. 4, 2014.
(Continued)

*Primary Examiner* — On S Mung
(74) *Attorney, Agent, or Firm* — Canon U.S.A., Inc. IP Division

(57) ABSTRACT

A device for processing a current pixel block of an image using a palette prediction mode according to HEVC Format Range Extension (RExt). The mode uses a current palette to build a predictor block of indexes to predict the current pixel block. The current palette comprises entries associating entry indexes with pixel values. The method comprises predicting the current palette from entries of two or more palettes that are palettes previously used to process blocks of
(Continued)

pixels. A palette predictor may be used that is built from the two or more palettes, preferably from the last used palette for a coding unit in the current coding entity and from the previously used palette for which a flag bitmap indicates whether or not its elements have been copied into the last used palette. Accordingly, the coding of the palette mode is improved.

12 Claims, 27 Drawing Sheets

(51) Int. Cl.
 *H04N 19/463* (2014.01)
 *H04N 19/94* (2014.01)
 *H04N 19/176* (2014.01)
(58) Field of Classification Search
 USPC .................. 375/240.12, 240.24, 240.25
 See application file for complete search history.

(56) References Cited

U.S. PATENT DOCUMENTS

| | | | |
|---|---|---|---|
| 8,548,064 | B2 | 10/2013 | Kitahara et al. |
| 2003/0048943 | A1 | 3/2003 | Ishikawa |
| 2003/0202602 | A1 | 10/2003 | Apostolopoulos et al. |
| 2004/0156543 | A1 | 8/2004 | Gardella et al. |
| 2004/0213469 | A1 | 10/2004 | Apostolopoulos |
| 2005/0276489 | A1 | 12/2005 | Ishikawa |
| 2007/0253492 | A1 | 11/2007 | Shelton et al. |
| 2009/0010533 | A1 | 1/2009 | Hung |
| 2010/0046628 | A1 | 2/2010 | Bhaskaran et al. |
| 2013/0317833 | A1 | 11/2013 | Davis |
| 2015/0010053 | A1 | 1/2015 | Xu et al. |

FOREIGN PATENT DOCUMENTS

| | | |
|---|---|---|
| CN | 1716998 A | 1/2006 |
| CN | 101340587 A | 1/2009 |
| CN | 101645173 A | 2/2010 |
| CN | 105814889 A | 7/2016 |
| EP | 3020198 A2 | 5/2016 |
| JP | 2010-226532 A | 10/2010 |
| JP | 2011-035807 A | 2/2011 |
| JP | 4736619 B2 | 7/2011 |
| JP | 4747917 B2 | 8/2011 |
| JP | 5222870 B2 | 6/2013 |
| RU | 2407223 C2 | 12/2010 |
| RU | 2420021 C2 | 5/2011 |
| RU | 2011-109206 A | 9/2012 |
| WO | 2007-013335 A1 | 2/2007 |
| WO | 2012-081162 A1 | 6/2012 |
| WO | 2015086718 A2 | 6/2015 |

OTHER PUBLICATIONS

Sole et al., "Transform Coefficient Coding in HEVC", IEEE Transactions on Circuits and Systems for Video Technology, IEEE Service Center, Piscataway, NJ, US, vol. 22, No. 12, Dec. 1, 2012 (Dec. 1, 2012), pp. 1765-1777, XP011487805.

Sun et al., "AHG10: A triplet palette mode combining JCTVC-P0108 and JCTVC-P0198", Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014.

Zhu et al., "Palette-based compound image compression in HEVC by exploiting non-local spatial correlation", 2014 IEEE International Conference on Acoustic, Speech and Signal Processing (ICASSP), published May 4, 2014, IEEE, pp. 7348-7352.

Zhu et al., "Non-RCE3:Template-based palette prediction", 14. JCT-VC Meeting; Jul. 25, 2013-Feb. 8, 2013, Vienna, (Joint Collaborative Team on Video Coding of I SO/I EC JTC1/SC29/WG11 and ITU-T SG.16 ), URL: http://wftp3.itu.int/av-arch/jctvc-site/, No. JCTVC-N0169-v3, Jul. 30, 2013 (Jul. 30, 2013), XP030114648, the whole document.

Guo, et al., "Non-RCE3: Modified Palette Mode for Screen Content Coding", Joint Collaborative Team on Video Coding (JCT-VC) of ITU-T SG 16 WP 3 and ISO/IEC JTC 1/SC 29/WG 11 14th Meeting: Vienna, AT, Jul. 25-Aug. 2, 2013, pp. 1-6.

Sullivan, et al., "Meeting Report of the 14th Meeting of the Joint Collaborative Team on Video Coding (JCT-VC)", Vienna, AT, Jul. 25-Aug. 2, 2013, pp. 1-207.

Iain E G Richardson, H.264 MPEG-4 Part 10:Intra Prediction, web, http://www.vcodex.com/h264.html/h264_intrapred.pdf, Apr. 3, 2003, pp. 1-6.

Guillaume Laroche, Non-RCE4: On Palette Prediction Modes Coding, Joint Collaborative Team on Video Coding (JCT-VC) of ITU-T SG16 WP3 and ISO/IEC JTC1/SC29/WG11, 16th Meeting, Jan. 9-17, 2014, pp. 1-6, Doc. No. JCTVC-P0116, XP030115614.

| 0 | 0 | 0 | 0 | 0 | 0 | 0 | 0 |
|---|---|---|---|---|---|---|---|
| 0 | 1 | 0 | 0 | 0 | 0 | 0 | 0 |
| 0 | 1 | 0 | 0 | 0 | 0 | 0 | 0 |
| 0 | 1 | 1 | 1 | 1 | 1 | 1 | 0 |
| 0 | 1 | 2 | 2 | 2 | 2 | 2 | 0 |
| 0 | 1 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |

91

| Pred mode = 0 | Level = 0 | Run = 8 | Pred mode = 0 | Level = 1 | Run = 5 | Pred mode = 0 | Level = 1 | Run = 3 | Pred mode = 0 | Level = 2 | Run = 0 |

92

| Pred mode = 0 | Level = 1 | Run = 0 | Pred mode = 0 | Level = 0 | Run = 5 | Pred mode = 1 | Run = 31 | Pred mode = 0 | Level = 0 | Run = 4 |

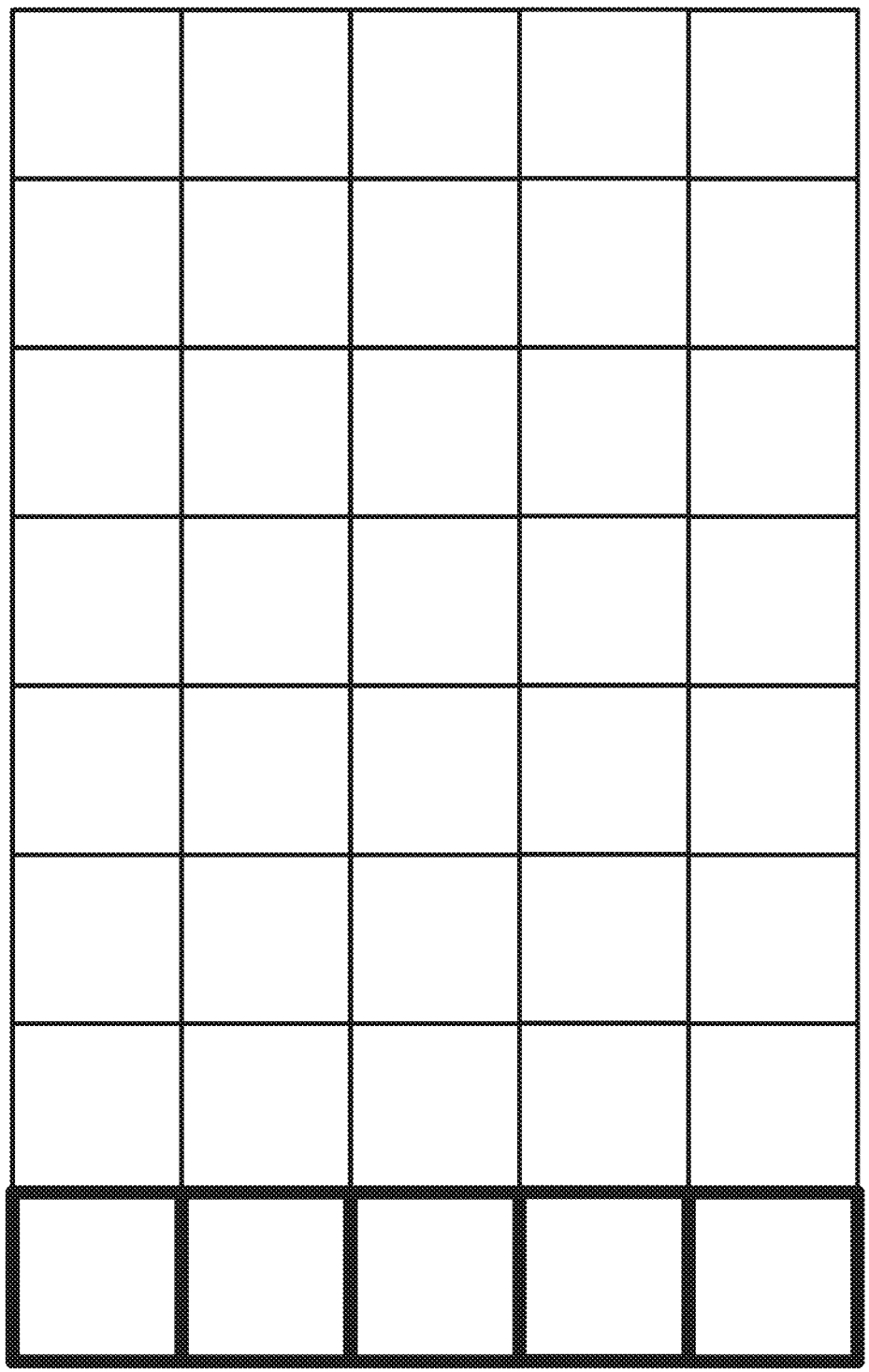

| Class | Occurrences | Related Level |
|---|---|---|
| 1 | 2 | N.A. |
| 2 | 6 | 1 |
| 3 | 9 | 0 |

1802

PALETTE

| Level | Y | U | V |
|---|---|---|---|
| 0 | 245 | 128 | 128 |
| 1 | 0 | 145 | 102 |

1803

Current CU/block:

| 1 | 2 | 2 | 2 | 2 | 2 | 3 | 3 |
|---|---|---|---|---|---|---|---|
| 2 | | | | | | | 3 |
| 2 | | | | | | | 3 |
| 3 | | | | | | | 3 |
| 3 | | | | | | | |
| 1 | | | | | | | |
| 3 | | | | | | | |
| 3 | | | | | | | |
| 2 | | | | | | | |

| Predictor of the palette | | | |
|---|---|---|---|
| level | Y | U | V |
| 0 | 245 | 128 | 128 |
| 1 | 0 | 145 | 102 |
| 2 | 135 | 178 | 94 |
| 3 | 145 | 78 | 90 |
| 4 | 15 | 128 | 128 |

2001

| Decoded Flags |
|---|
| 1 |
| 0 |
| 1 |
| 0 |
| 0 |

2002

| Current Palette | | | |
|---|---|---|---|
| Level | Y | U | V |
| 0 | 245 | 128 | 128 |
| 1 | 135 | 178 | 94 |
| 2 | 246 | 138 | 18 |
| 3 | 10 | 125 | 125 |

2003

Decoded elements from the bitstream

Fig. 20

METHOD AND APPARATUS FOR ENCODING OR DECODING BLOCKS OF PIXEL

CROSS-REFERENCE TO RELATED APPLICATIONS

The application is the National Phase application of PCT Application No. PCT/EP2014/077297, filed on Dec. 10, 2014 and titled "Method and apparatus for encoding or decoding blocks of pixel". This application claims the benefit under 35 U.S.C. § 119(a)-(d) of United Kingdom Patent Application No. 1321850.8, filed on Dec. 10, 2013 and titled "Palette Prediction", United Kingdom Patent Application No. 1322468.8, filed on Dec. 18, 2013 and titled "Method And Apparatus For Encoding Or Decoding Blocks Of Pixel", and United Kingdom Patent Application No. 1403823.6, filed on Mar. 4, 2014 and titled "Method And Apparatus For Encoding Or Decoding Blocks Of Pixel". The above cited patent applications are incorporated herein by reference in their entirety.

FIELD OF THE INVENTION

The present invention concerns a method and a device for processing, e.g. encoding or decoding, a current block of pixels of an image using a palette prediction mode. It particularly concerns the palette mode encoding as introduced in HEVC Range Extension.

BACKGROUND OF THE INVENTION

It applies more particularly to a mode of coding where a current block of pixels is predictively encoded based on a predictor block encoded with or built from a so-called palette.

A palette in this document is defined as a look up table having entries, or "elements", associating an index with a value of a pixel. Typically, but not necessarily, the value of a pixel is constituted by the value of each colour component associated with the pixel, resulting in a colour palette. However, the value of a pixel may be made of a single pixel component, resulting in a monochrome palette.

This mode of encoding a block of pixel is generally referred to as Palette coding mode. It is contemplated to adopt this mode, for example, in the Range Extension of the High Efficiency Video Coding (HEVC: ISO/IEC 23008-2 MPEG-H Part 2/ITU-T H.265) international standard.

When encoding an image in a video sequence, the image is first divided into coding entities of pixels of equal size referred to as Coding Tree Blocks (CTBs). The size of a Coding Tree Block is typically 64 by 64 pixels. Each Coding Tree Block may then be broken down into a hierarchical tree of smaller blocks whose size may vary and which are the actual blocks of pixels to encode. These smaller blocks to encode are referred to as Coding Units (CUs).

The encoding of a particular Coding Unit is typically predictive. This means that a predictor block is first determined. Next, the difference between the predictor block and the Coding Unit is calculated. This difference is called the residue. Next, this residue is compressed. The actual encoded information of the Coding Unit is made of some information to indicate the way of determining the predictor block and the compressed residue. Best predictor blocks are blocks as similar as possible to the Coding Unit in order to obtain a small residue that can be efficiently compressed.

The coding mode is defined based on the method used to determine the predictor block for the predictive encoding method of a Coding Unit.

A first coding mode is referred to as INTRA mode. According to INTRA mode, the predictor block is built based on the value of pixels immediately surrounding the Coding Unit within the current image. It is worth noting that the predictor block is not a block of the current image but a reconstruction thereof. A direction is used to determine which pixels neighbouring the border of the block are actually used to build the predictor block and how they are used. The idea behind INTRA mode is that, due to the general coherence of natural images, the pixels immediately surrounding the Coding Unit are likely to be similar to pixels of the current Coding Unit. Therefore, it is possible to get a good prediction of the value of pixels of the Coding Unit using a predictor block based on these surrounding pixels.

A second coding mode is referred to as INTER mode. According to INTER mode, the predictor block is a block of another image. The idea behind the INTER mode is that successive images in a sequence are generally very similar. The main difference comes typically from motion between these images due to the scrolling of the camera or due to moving objects in the scene. The predictor block is determined by a vector giving its location in a reference image relatively to the location of the Coding Unit within the current image. This vector is referred to as a motion vector. According to this mode, the encoding of such Coding Unit using this mode comprises motion information comprising the motion vector and the compressed residue.

This document focusses on a third coding mode called Palette mode. According to the Palette mode, it is possible to define a predictor block for a given Coding Unit as a block of indexes from a palette: for each pixel location in the predictor block, the predictor block contains the index associated with the pixel value in the Palette which is the closest to the value of the pixel having the same location (i.e. colocated) in the coding unit. The palette coding mode thus uses a current palette to build a predictor block of indexes to predict a current coding unit or block of pixels. A residue representing the difference between the predictor block and the coding unit is then calculated and encoded. Entry indexes in the Palette are also known as "levels".

When using the Palette mode, the palette and the predictor block of indexes or "levels" have to be transmitted in the bitstream encoding the image. This represents a high cost of signalling because a palette, which may comprise tens of entries, needs to be transmitted for each Coding Unit.

SUMMARY OF THE INVENTION

The present invention has been devised to improve the encoding using the Palette mode, in particular to substantially decrease the signalling costs.

It provides for improving the encoding of the Palette mode by predicting the palette used when encoding a block of pixels. This results in having less information about the palette to be transmitted from the encoder to the decoder: the signalling costs are substantially reduced.

According to a first aspect of the present invention, there is provided a method for processing a current block of pixels of an image using a palette coding mode, the palette coding mode using a current palette that comprises a set of entries associating respective entry indexes with corresponding pixel values, the method comprising a step of predicting the current palette from entries of two or more palettes, the two or more palettes being palettes previously used to process blocks of pixels, wherein the prediction of the current palette comprises selecting an entry from a given palette of the two or more palettes, said selection of an entry being based on a bitmap of flags, each flag defining whether or not a corresponding entry in the given palette is selected as an entry to generate an entry in another palette, wherein the selected entry includes an entry of the given palette corresponding to a flag of the bitmap that defines no selection of the entry to generate the another palette. In this way, the entries of the given palette that have been abandoned when predicting the another palette can thus be retrieved to enrich the current palette or its palette predictor.

In an embodiment, the other palette is another one of the two or more palettes.

In an embodiment, said another palette is the palette used to process a block of pixels immediately preceding the current block of pixels in the image.

In an embodiment, the given palette is the palette used to process a block of pixels in the image immediately preceding the block of pixels immediately preceding the current block of pixels in the image.

In an embodiment, the bitmap of flags includes at least one element at a predefined position in the bitmap for signalling whether or not the bitmap includes, after the predefined position, at least one additional flag that defines selection of an entry of the given palette to generate the another palette.

In an embodiment, the current palette is generated from a palette predictor which is built from the two or more palettes.

In an embodiment, building the palette predictor comprises selecting all the entries from a palette last used to process a block of pixels that immediately precedes the current block of pixels in the image, and selecting at least one entry from another palette used to process another block of pixels in the image. This configuration makes it possible to supplement conventional palette predictors (usually the palette last used) with additional entries that may be of high relevancy, in particular selected as described above.

In an embodiment, the current palette is generated from the palette predictor using a bitmap of flags, each flag of which defining whether or not a corresponding entry in the palette predictor is selected as an entry to generate an entry in the current palette.

In an embodiment, an entry of the two or more palettes is added to the palette predictor being built if there is no similar entry already in the palette predictor being built.

According to a second aspect of the present invention, there is provided a method of encoding a sequence of digital images into a bitstream, at least one block of an image being encoded using a palette coding mode comprising the method of processing a current block of pixels according to the first aspect.

According to a third aspect of the present invention, there is provided a method of decoding a bitstream comprising an encoded sequence of digital images, at least one block of an image having been encoded using a palette coding mode, comprising the method of processing a current block of pixels according to the first aspect.

According to a fourth aspect of the present invention, there is provided a device for processing a current block of pixels of an image using a palette coding mode, the palette coding mode using a current palette that comprises a set of entries associating respective entry indexes with corresponding pixel values, the device comprising a prediction module configured to predict the current palette from entries of two or more palettes, the two or more palettes being palettes previously used to process blocks of pixels, wherein the prediction of the current palette comprises selecting an entry from a given palette of the two or more palettes, said selection of an entry being based on a bitmap of flags, each flag defining whether or not a corresponding entry in the given palette is selected as an entry to generate an entry in another palette, wherein the selected entry includes an entry of the given palette corresponding to a flag of the bitmap that defines no selection of the entry to generate the another palette.

According to a fifth aspect of the present invention, there is provided a device for processing a current block of pixels of an image using a palette coding mode, the palette coding mode using a current palette that comprises a set of entries associating respective entry indexes with corresponding pixel values, the device being configured to implement the processing method of the first aspect described above.

According to a sixth aspect of the present invention, there is provided a device for encoding a sequence of digital images into a bitstream comprising means for performing the method according to the second aspect.

According to a seventh aspect of the present invention, there is provided a device for decoding a bitstream comprising a sequence of digital images comprising means for performing the method according to the third aspect.

According to an eighth aspect of the present invention there is provided a non-transitory computer-readable medium storing a program which, when executed by a microprocessor or computer system in a device for processing a current block of pixels of an image using a palette coding mode, the palette coding mode using a current palette that comprises a set of entries associating respective entry indexes with corresponding pixel values, causes the device to perform a step of predicting the current palette from entries of two or more palettes, the two or more palettes being palettes previously used to process blocks of pixels, wherein the prediction of the current palette comprises selecting an entry from a given palette of the two or more palettes, said selection of an entry being based on a bitmap of flags, each flag defining whether or not a corresponding entry in the given palette is selected as an entry to generate an entry in another palette, wherein the selected entry includes an entry of the given palette corresponding to a flag of the bitmap that defines no selection of the entry to generate the another palette.

According to a ninth aspect, there is provided a computer program comprising instructions which upon execution by a computer cause the computer to perform the method of any one of the first, second or third aspects.

According to a further aspect of the invention there is provided a method for processing a current block of pixels of an image using a palette coding mode, the palette coding mode using a current palette that comprises a set of entries associating respective entry indexes with corresponding pixel values.

The method comprises a step of predicting the current palette from entries of two or more palettes, the two or more palettes being palettes previously used to process blocks of pixels.

Accordingly, as mentioned above, less information about the current palette is transmitted to the decoder, thus reducing the signalling in the bitstream. As explained below in this document, a palette predictor may be formed from the two or more palettes and all or part of the current palette may be predicted using the palette predictor. Thus, the invention is also to avoid having a poor palette when a single palette predictor to produce the palette proves to have very few elements. This may happen when such a palette predictor is imposed In a variant, the palette coding mode uses a current palette to build a predictor block of indexes to predict a current block of pixels, and the method comprises a step of predicting the current palette using a palette predictor.

Correspondingly, according to other aspects of the invention there is provided a device for processing, i.e. an encoder or a decoder depending on the case, a current block of pixels of an image using a palette coding mode, the palette coding mode using a current palette that comprises a set of entries associating respective entry indexes with corresponding pixel values.

The device comprises a prediction module configured to predict the current palette from entries of two or more palettes, the two or more palettes being palettes previously used to process blocks of pixels.

In a variant, the palette coding mode uses a current palette to build a predictor block of indexes to predict a current block of pixels, and the prediction module is configured to predict the current palette using a palette predictor.

Optional features of embodiments of the invention are defined in the appended claims. Some of these features are explained here below with reference to a method, while they can be transposed into system features dedicated to a device according to embodiments of the invention.

In some embodiments of the invention, the prediction of the current palette comprises selecting an entry from a given palette of the two or more palettes, said selection of an entry being based on a bitmap of flags, each flag defining whether or not a corresponding entry in the given palette is selected as an entry to generate another palette. This is because the bitmap of flags makes it possible to know which elements/entries have already been reused for some palettes and which ones have been abandoned. Thanks to this information, it is possible to enrich the palette predictor or the current palette with some abandoned elements that may happen to be relevant for the block of pixels currently being processed.

In particular, this is the case when the selected entry includes an entry of the given palette corresponding to a flag of the bitmap that defines no selection of the entry to generate the another palette. Such flag means that the entry has been previously abandoned.

According to some features, the another palette is another one of the two or more palettes. This means that two palettes that are closely related due to the prediction of one based on the other are both used to predict the current palette. This configuration may occur for example when using the last used palettes to predict a new palette.

The entries of the given palette that have been abandoned when predicting the other palette can thus be retrieved to enrich the current palette or its palette predictor.

In particular, the other palette may be the palette last used to process a block of pixels that directly (i.e. immediately) precedes (according to the coding/decoding order) the current block of pixels in the image. In addition, the given palette and the another palette may be the two palettes used to process the last two blocks of pixels that directly precede (according to the same coding/decoding order) the current block of pixels in the image. In particular, the given palette may be the palette used to process a block of pixels in the image immediately preceding the block of pixels immediately preceding the current block of pixels in the image.

These configurations take advantage of redundancy between consecutive and close blocks of pixels to obtain efficient coding.

According to other features, the bitmap of flags includes at least one element at a predefined position in the bitmap for signalling whether or not the bitmap includes, after the predefined position, at least one additional flag that defines selection of an entry of the given palette to generate the another palette. This is to reduce the size of the bitmap and thus to reduce signalling costs. This is because, depending on how the palettes are built up, the last entries of the given palette are more liable to be old and ineffective elements. Therefore, it is likely that the last flags of the bitmaps are all set to 0 defining no selection of the corresponding entry from the given palette.

In some embodiments as introduced above, the current palette is generated from a palette predictor which is built from the two or more palettes.

In some specific embodiments, building the palette predictor comprises selecting all the entries from a palette last used to process a block of pixels that directly precedes the current block of pixels in the image, and selecting at least one entry from another palette used to process another block of pixels in the image. This configuration makes it possible to supplement conventional palette predictors (usually the palette last used) with additional entries that may be of high relevancy, in particular selected as described above.

In other specific embodiments, the current palette is generated from the palette predictor using a bitmap of flags, each flag of which defining whether or not a corresponding entry in the palette predictor is selected as an entry to generate an entry in the current palette.

In some embodiments, an entry of the two or more palettes is added to the palette predictor being built if there is no similar entry already in the palette predictor being built. This is to avoid redundancy.

In some embodiments, blocks of pixels of the image are processed according to a predefined scanning order; and the palette predictor for the current block of pixels is selected from a set of palettes used to predict blocks of pixels previously processed according to the palette coding mode. This corresponds to an Inter prediction of the current palette since it is based on past palettes. This configuration has the potential to reduce a great amount of signalling costs since past palettes with a lot of information are already available at both sides (encoder and decoder) when processing the current block of pixels. Efficient palette prediction can thus be conducted.

In specific embodiments, the palette predictor for the current block of pixels is a palette used for the last block of pixels processed according to the palette coding mode. In other words, it is the last used (e.g. decoded) palette that is selected as a palette predictor. This provision takes advantage of high pixel redundancy between block of pixels that are processed successively, because they are often spatially close. It also reduces memory costs of storing previously used palettes, since only the last one needs to be stored. In addition, it may save bits in the encoded bitstream, since there is no need to designate which previously used palette is used as a palette predictor for the current block of pixels.

In other specific embodiments, the palette predictor for the current block of pixels is selected from the set of palettes used for blocks of pixels previously processed according to the palette coding mode and are contiguous to the current block of pixels. In practice, this is generally the pixels blocks that are above or on the left of the current pixel block. This provision also takes advantage of high pixel redundancy between adjacent blocks of pixels.

In yet other specific embodiments, the set of palettes used for previously processed blocks of pixels is reset when the current block of pixels starts a new coding entity made of blocks of pixels, such as a slice or an independent tile, or starts a new line of coding entities, each made of blocks of pixels. In a variant, the reset may occur at each new image or frame. This provision may speed up the processing (encoding or decoding) of the image, since the coding entities or the lines of coding entities (e.g. Coding Tree Blocks in HEVC) can be processed in parallel. Furthermore, the reset at each new line of coding entities proves to provide more efficient coding of pixel blocks than a reset at each coding entity.

An independent tile as defined in the HEVC standard comprises at least one slice and is spatially independent from the other tiles.

According to a specific feature, the set of palettes is reset to an empty set.

In a variant, the reset set of palettes comprises a by-default palette. This configuration may thus provide palette prediction even in case of reset, i.e. when a new coding entity is processed. This makes it possible to again reduce signalling costs for the first coding unit in a new coding entity.

In this variant, the by-default palette may comprise a set of predetermined entries corresponding to pixel values equally distributed over a colour space. For example, for pixels represented in the YUV colour space (the same would apply for a RGB colour space), the pixel values may be equally distributed over the Y component, while the U and V component values may be fixed at half the maximum possible value MAX given the bit-depth used to code each colour component (i.e. U and V take the median value of the corresponding components in the colour space), e.g. $1<<(bitdepth-1)$ or $(MAX+1)/2$.

In other embodiments of the invention, reference palette predictors are associated with respective coding entities of blocks of pixels that form the image, and the palette predictor for the current block of pixels is the reference palette predictor associated with the coding entity that includes the current block of pixels. These embodiments of the invention make it possible to define very efficient palette predictors at the coding entity (e.g. CTB) level. As an example, a single reference palette predictor may be defined for a single line of coding entities, in the same spirit as the reset above. This is to reduce the costs of signalling the reference palette predictors to the decoder.

In specific embodiments, the reference palette predictor associated with a coding entity is used as the palette predictor for each block of pixels composing the coding entity. Thanks to this provision, a restricted amount of information, namely the reference palette predictor, is needed for the whole coding entity. This aims at substantially reducing signalling costs compared to conventional Palette mode.

Preferably, the reference palette predictors are inserted in a bitstream coding the image. This makes it possible for the decoder to have these reference palette predictors to efficiently perform palette prediction for each block of pixels in the coding entity, i.e. without need for a complex mechanism to determine those predictors.

In specific embodiments regarding the encoder, the method may further comprise selecting, as a reference palette predictor for a coding entity, a palette that minimizes a rate-distortion criterion from the palettes used to predict all the blocks of pixels of the coding entity. Then the encoder should signal the selected reference palette predictor in the bitstream to the decoder. This provides selection of an optimal Palette for all palettes of the coding entity.

In a variant regarding the encoder, the method may further comprise selecting, as a reference palette predictor for a coding entity, the palette used to predict the largest block of pixels of the coding entity. Then the encoder should signal the selected reference palette predictor in the bitstream to the decoder. The implementation of this selection of the reference palette predictor is very simple and this implementation has a low complexity.

In yet other embodiments of the invention, the palette predictor for the current block of pixels includes entries corresponding to values of pixels neighbouring the current block of pixels. This is to take advantage of high pixel redundancies between spatially close pixels.

In specific embodiments, the pixels neighbouring the current block of pixels are selected from pixels contiguous with the upper and left sides of the current block of pixels. This provision increases the above-specified advantage while maintaining dependency on pixels that are always available at the encoder and at the decoder given the causal effect of the block-by-block HEVC coding. Indeed, conventional scanning orders mean that the blocks contiguous with the upper and left sides of the current pixel blocks have already been reconstructed.

According to a specific feature, the pixels neighbouring the current block of pixels include the pixels that are, relative to the contiguous current block of pixels, top-left, top-right and bottom-left. Of course, these three specific pixels may form the selected neighbouring pixels. These pixels are those used for conventional Intra prediction mode. They provide relevant information on pixels of the current pixel block with a small amount of information.

In other specific embodiments, a predefined number of pixels are selected from a predetermined set of pixels neighbouring the current block of pixels, as entries of the palette predictor, the selected pixels being those having the highest spatial distances between them within the predetermined set of pixels. This creates diversity and avoids duplicate pixels.

In yet other specific embodiments, a pixel class is associated with each neighbouring pixel, and the neighbouring pixels are ordered according to a number of occurrences of their associated class within a predetermined set of pixels neighbouring the current block of pixels, to give lower entry indexes of the palette predictor to neighbouring pixels having more frequent pixel classes. This is to reduce the costs when encoding the palette predictor when appropriate. Note that the classes associated with a given pixel may be defined by the pixel values surrounding the value of the given pixel, for example given a predefined margin.

In yet other embodiments of the invention, the current palette has ordered entries, and predicting the current palette using the palette predictor comprises predicting an entry of the current palette from a preceding entry of the same current palette. In other words, the palette predictor when processing a given entry of the palette is made of (includes) the entries that are prior to the given entry in the colour palette. This resembles Intra prediction of the colour palette.

In specific embodiments, a given entry of the current palette is predicted from the entry directly preceding the given entry in the same current palette. This provision reduces signalling in the bitstream (and thus reduces coding costs) since it is no longer necessary to send (to the decoder) information on that preceding entry is used to predict the current entry.

In a similar manner, all the entries of the current palette, except the first one, may be predicted from the entry directly preceding them in the same current palette. This also reduces signalling in the bitstream. This is because all the entries are predicted and thus it is no longer necessary to identify which entries are predicted and which are not.

The above various embodiments to obtain the palette predictor may be combined in whole or in part. Taking into account such combination, the palette predictor used to predict the current palette thus combines two or more of:

a palette used to predict a previously processed block of pixels;

a reference palette predictor associated with a coding entity that includes the current block of pixels;

entries corresponding to values of pixels neighbouring the current block of pixels; and at least one entry of the current palette that precedes a current entry to be predicted in the current palette.

Turning now to the prediction of the current palette from the palette predictor, several implementations may be contemplated.

In embodiments of the invention, predicting the current palette using the palette predictor comprises obtaining a bitmap of flags, each of which defining whether or not a corresponding entry in the palette predictor is selected as an entry of the current palette. This configuration has low (memory and coding) costs to define the actual prediction from the palette predictor. The costs are limited to a bitmap.

In specific embodiments, the bitmap of flags comprises the same number of bits as the number of entries in the palette predictor, and each bit at a position in the bitmap defines whether or not the entry having the corresponding position in the palette predictor is selected as an entry of the current palette. This configuration improves the coding efficiency. A variant that may further reduce the size of the bitmap may consider stopping the bitmap at the last entry that is selected as an entry of the current palette. This is particularly advantageous since, as suggested above, the entries in the palette predictor are ordered according to their occurrences. In some embodiments, this results in the last entries of the palette predictor being statistically not often used for the current palette.

In other specific embodiments, the method may further comprise adding additional entries at the end of the current palette having the selected entries from the palette predictor. These additional entries may be entries for additional pixels decoded (at both the decoder and the encoder using a decoding loop) and entries from a predetermined palette that is for example built by the encoder and transmitted (in the bitstream) to the decoder (as in the conventional Palette coding mode). This provision is to increase the coding efficiency of the current palette.

In other embodiments of the invention, predicting the current palette using the palette predictor comprises obtaining at least one (possibly two or more) entry residual corresponding to the difference between at least one corresponding entry of the current palette and an entry of the palette predictor. This means that the residuals from palette prediction have to be sent to the decoder. This configuration makes it possible to obtain a finer palette compared to the previous embodiments (based on a copy of entries from the predictor to the current palette).

In specific embodiments, the current palette and the palette predictor have respective ordered entries, and each entry residual corresponds to the difference between an entry of the current palette and an entry of the palette predictor that have the same entry index. This provision reduces signalling in the bitstream (and thus reduces coding costs) since it is no longer necessary to send (to the decoder) information on which entry of the predictor is used to predict the current entry.

In a similar manner, a residual may be obtained for every entry of the current palette that has a corresponding entry with the same entry index in the palette predictor. This also reduces signalling in the bitstream since it additionally makes it no longer necessary to identify which entries need prediction and which do not need prediction.

Note that both predictions based on copy of entries or on residuals may be used with the palette predictors obtained using any of the methods described above. Exception is made for the case where the current palette is intra predicted in which case only the residual approach can be used (otherwise two entries would be the same in the palette).

In some embodiments, the pixel values of the entries of the current palette have colour components, and only a subpart of the colour components are predicted using the palette predictor. In practice, one or two colour components out of three may be predicted. This provision reduces processing and signalling in the bitstream.

Another aspect of the invention relates to a device for processing a current block of pixels of an image using a palette coding mode, the palette coding mode using a current palette that comprises a set of entries associating respective entry indexes with corresponding pixel values, the device being configured to implement any embodiment of the processing method as defined above.

Another aspect of the invention relates to a non-transitory computer-readable medium storing a program which, when executed by a microprocessor or computer system in a device for processing a current block of pixels of an image using a palette coding mode, the palette coding mode using a current palette that comprises a set of entries associating respective entry indexes with corresponding pixel values, causes the device to perform the step of predicting the current palette from entries of two or more palettes, the two or more palettes being palettes previously used to process blocks of pixels.

The non-transitory computer-readable medium may have features and advantages that are analogous to those set out above and below in relation to the method and device, in particular that of improving coding efficiency of the Palette prediction mode.

Another aspect of the invention relates to a method for processing a current block of pixels of an image using a palette coding mode, the palette coding mode using a current palette to build a predictor block of indexes to predict the current block of pixels, wherein the current palette comprises a set of entries associating respective entry indexes with corresponding pixel values, substantially as herein described with reference to, and as shown in, FIG. 13 or 14 or 15 or 17 or 19 or 21 or 22 of the accompanying drawings.

In a yet further aspect of the present invention there is provided a method for encoding or decoding a current block of pixels of an image according to a palette mode, the palette mode using a color palette comprising a set of values to represent at least one component of pixels of the current block, the method comprising obtaining a color palette predictor and predicting the color palette of the current block using the color palette predictor.

Preferably, blocks of said image are ordered according to a predefined scanning order and the color palette predictor is determined from the color palette of the last block encoded according to the palette mode in a given causal area of the image.

In an embodiment values of the current color palette are predicted from values comprised in the color palette predictor. The values of color palettes may be ordered and a value of the current color palette associated to a flag indicating whether said value is predicted from the value having the same order in the color palette predictor. In an embodiment, the given causal area is the part already reconstructed of an encoding entity comprising the current block of pixels.

In an embodiment values of color palettes are ordered and a value of the current palette is associated to a flag indicating whether said value is predicted from the value having a given order in the color palette predictor.

In embodiments, the color palette predictor is associated to each encoding entity of the image. The color palette predictor may be obtained from pixels neighboring the current block.

In one further aspect of the present invention, there is provided a method for encoding or decoding a current block of pixels of an image according to a palette mode, the palette mode using a color palette comprising a set of values to represent at least one component of pixels of the current block, the method comprising obtaining a color palette predictor and predicting the color palette of the current block using the color palette predictor, wherein predicting the color palette of the current block using the color palette predictor comprises obtaining a bitmap of flags, each of which defining whether or not a corresponding entry in the color palette predictor is selected as an entry of the color palette of the current block.

The bitmap of flags may comprise the same number of bits as the number of entries in the color palette predictor, and each bit at a position in the bitmap defines whether or not the entry having the corresponding position in the color palette predictor is selected as an entry of the color palette of the current block.

In an embodiment the method additionally comprises adding additional entries at the end of the color palette of the current block having the selected entries from the color palette predictor.

In yet another aspect of the present invention there is provided a method for encoding or decoding a current block of pixels of an image according to a palette mode, the palette mode using a color palette comprising a set of values to represent at least one component of pixels of the current block, the method comprising obtaining a color palette predictor and predicting the color palette of the current block using the color palette predictor wherein blocks of pixels of the image are processed according to a scanning order; and the palette predictor for the current block of pixels is selected from a set of palettes used to predict blocks of pixels previously processed according to the palette coding mode and wherein said set of palettes used for previously processed blocks of pixels is reset when the current block of pixels starts a new line of coding entities each comprising a block of pixels. Preferably, the set of palettes is reset to a by-default palette According to the invention there is further provided a method for processing a current block of pixels of an image using a palette coding mode, the palette coding mode using a current palette to build a predictor block of indexes to predict the current block of pixels, wherein the current palette comprises a set of entries associating respective entry indexes with corresponding pixel values, the method comprising the step of predicting the current palette using a palette predictor.

In an embodiment, blocks of pixels of the image are processed according to a predefined scanning order; and the palette predictor for the current block of pixels is selected from a set of palettes used to predict blocks of pixels previously processed according to the palette coding mode. Preferably, the palette predictor for the current block of pixels is a palette used for the last block of pixels processed using the palette coding mode. The palette predictor for the current block of pixels may be selected from the set of palettes used for blocks of pixels previously processed according to the palette coding mode and are contiguous to the current block of pixels.

The set of palettes used for previously processed blocks of pixels is preferably reset when the current block of pixels starts a new coding entity made of blocks of pixels or starts a new line of coding entities, each made of blocks of pixels. The set of palettes may be reset to a null set or to a by-default palette. The by-default palette comprises a set of predetermined entries corresponding to pixel values equally distributed over a colour space.

In an embodiment, reference palette predictors are associated with respective coding entities of blocks of pixels that form the image, and the palette predictor for the current block of pixels is the reference palette predictor associated with the coding entity that includes the current block of pixels. The reference palette predictor associated with a coding entity is used as the palette predictor for each block of pixels composing the coding entity. The reference palette predictors are preferably inserted in a bitstream coding the image. The method may further comprise selecting, as a reference palette predictor for a coding entity, the palette used to predict the largest block of pixels of the coding entity. In an embodiment the method further comprises selecting, as a reference palette predictor for a coding entity, a palette that minimizes a rate-distortion criterion from the palettes used to predict all the blocks of pixels of the coding entity.

In an embodiment, the palette predictor for the current block of pixels includes entries corresponding to values of pixels neighbouring the current block of pixels. The pixels neighbouring the current block of pixels may be selected from pixels contiguous to the upper and left sides of the current block of pixels. The pixels neighbouring the current block of pixels can include the pixels that are, relative to the contiguous current block of pixels, top-left, top-right and bottom-left. In an embodiment a pixel class is associated with each neighbouring pixel, and the neighbouring pixels are ordered according to a number of occurrences of their associated class within a predetermined set of pixels neighbouring the current block of pixels, to give lower entry indexes of the palette predictor to neighbouring pixels having more frequent pixel classes. Preferably, a predefined number of pixels is selected from a predetermined set of pixels neighbouring the current block of pixels, as entries of the palette predictor, the selected pixels being those having the highest spatial distances between them within the predetermined set of pixels.

In an embodiment, the current palette has ordered entries, and predicting the current palette using the palette predictor comprises predicting an entry of the current palette from a preceding entry of the same current palette. A given entry of the current palette may be predicted from the entry directly preceding the given entry in the same current palette. All the entries of the current palette, except the first one, may be predicted from the entry directly preceding them in the same current palette.

In an embodiment the palette predictor used to predict the current palette combines two or more of: a palette used to predict a previously processed block of pixels; a reference palette predictor associated with a coding entity that includes the current block of pixels; entries corresponding to values of pixels neighbouring the current block of pixels; and at least one entry of the current palette that precedes a current entry to be predicted in the current palette.

In an embodiment, predicting the current palette using the palette predictor comprises obtaining a bitmap of flags, each of which defining whether or not a corresponding entry in the palette predictor is selected as an entry of the current palette. The bitmap of flags may comprise the same number of bits as the number of entries in the palette predictor, and each bit at a position in the bitmap defines whether or not the entry having the corresponding position in the palette predictor is selected as an entry of the current palette. In a further embodiment the method comprises adding additional entries at the end of the current palette having the selected entries from the palette predictor.

In an embodiment predicting the current palette using the palette predictor comprises obtaining at least one entry residual corresponding to the difference between at least one corresponding entry of the current palette and an entry of the palette predictor. The current palette and the palette predictor may have respective ordered entries, and each entry residual corresponds to the difference between an entry of the current palette and an entry of the palette predictor that have the same entry index. A residual is preferably obtained for every entry of the current palette that has a corresponding entry with the same entry index in the palette predictor.

In an embodiment, the pixel values of the entries of the current palette have colour components, and only a subpart of the colour components are predicted using the palette predictor.

In one more aspect of the present invention, there is provided a device for processing a current block of pixels of an image using a palette coding mode, the palette coding mode using a current palette to build a predictor block of indexes to predict the current block of pixels, wherein the current palette comprises a set of entries associating respective entry indexes with corresponding pixel values, the device comprising a prediction module configured to predicting the current palette using a palette predictor.

In an additional aspect of the present invention there is provided a device for processing a current block of pixels of an image using a palette coding mode, the palette coding mode using a current palette to build a predictor block of indexes to predict the current block of pixels, wherein the current palette comprises a set of entries associating respective entry indexes with corresponding pixel values, the device being configured to implement the processing method according to the further provided method and any of the embodiments described above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 9 illustrates the same block of levels and the set of syntax elements used for the encoding of this block of levels;

FIG. 14a shows a frame with several CTBs arranged in rows;

FIG. 18 shows an example of the building of a palette predictor according to embodiments of the invention;

FIG. 20 illustrates the process of FIG. 19 in one example;

DETAILED DESCRIPTION OF EMBODIMENTS OF THE INVENTION

Figure 1:
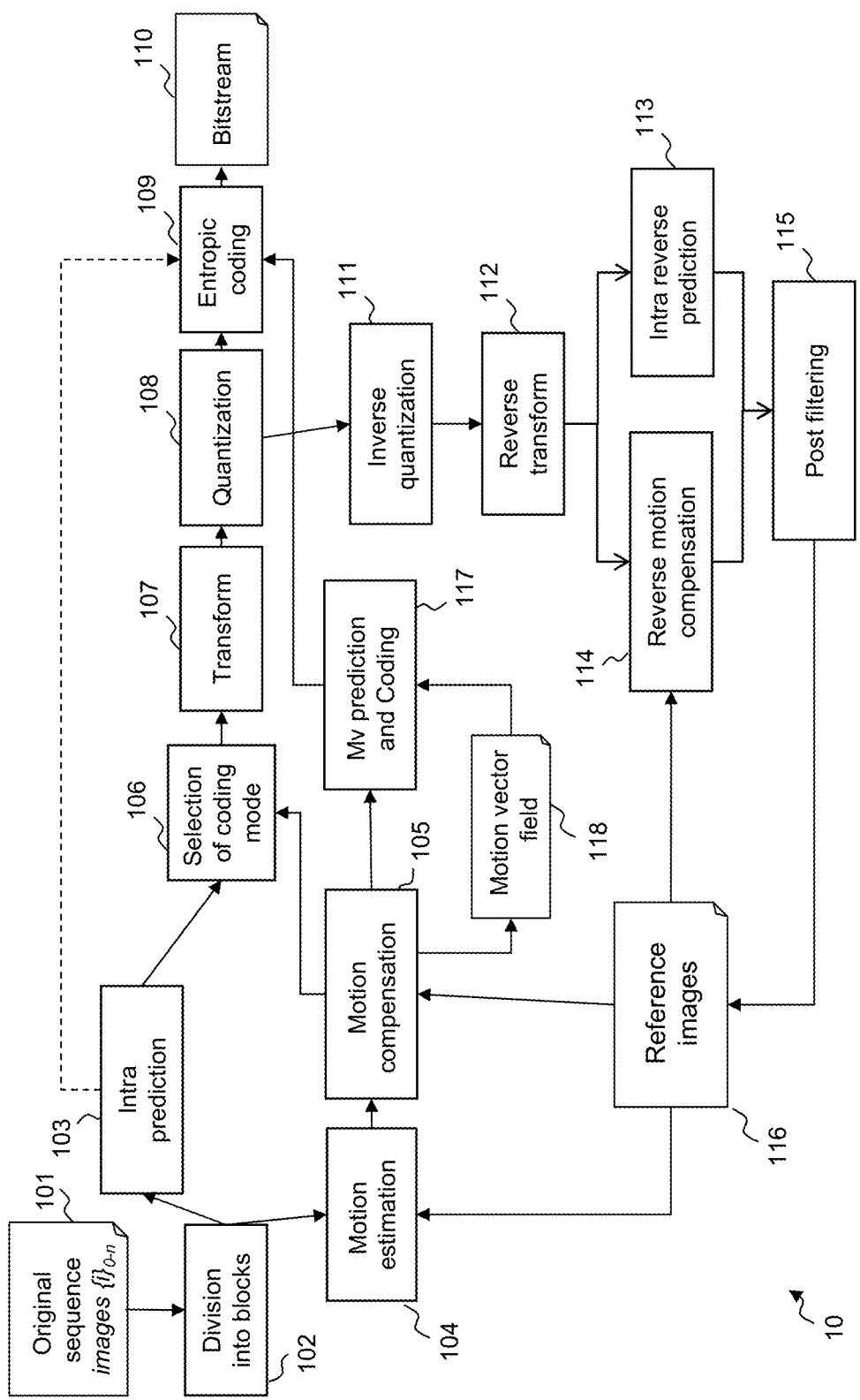
FIG. 1 illustrates the HEVC encoder architecture.

FIG. 1 illustrates the HEVC encoder architecture. In the video encoder, an original sequence 101 is divided into blocks of pixels 102. A coding mode is then assigned to each block. There are two families of coding modes typically used in HEVC: the modes based on spatial prediction or INTRA modes 103 and the modes based on temporal prediction or INTER modes based on motion estimation 104 and motion compensation 105. An extension of HEVC being currently designed, known as HEVC RExt, adds an additional coding mode, namely the Palette coding mode, that compete with INTRA and INTER coding modes to encode blocks of pixels. This Palette coding mode is described in more detail below, in particular with reference to FIGS. 7 to 13.

An INTRA Coding Unit is generally predicted from the encoded pixels at its causal border by a process called INTRA prediction.

Temporal prediction of an INTER coding mode first consists in finding in a previous or future frame called the reference frame 116 the reference area of which is the closest to the Coding Unit, in a motion estimation step 104. This reference area constitutes the predictor block. Next this Coding Unit is predicted using the predictor block to compute the residue in a motion compensation step 105.

In both cases, spatial and temporal prediction, a residual is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly advantageous to encode a motion vector as a difference between this motion vector, and a motion vector in its surroundings. In the H.264/AVC coding standard for instance, motion vectors are encoded with respect to a median vector computed between 3 blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighboring motion vectors, used for the prediction, are extracted from the motion vector field 118.

Next, the mode optimizing the rate distortion performance is selected in module 106. In order to further reduce the redundancies, a transform, typically a DCT, is applied to the residual block in module 107, and a quantization is applied to the coefficients in module 108. The quantized block of coefficients is then entropy coded in module 109 and the result is inserted into the bitstream 110.

The encoder then performs a decoding of the encoded frame for the future motion estimation in modules 111 to 116. This is a decoding loop at the encoder. These steps allow the encoder and the decoder to have the same reference frames. To reconstruct the coded frame, the residual is inverse quantized in module 111 and inverse transformed in module 112 in order to provide the "reconstructed" residual in the pixel domain. According to the encoding mode (INTER or INTRA), this residual is added to the INTER predictor 114 or to the INTRA predictor 113.

Next, this first reconstruction is filtered in module 115 by one or several kinds of post filtering. These post filters are integrated into the decoding loop. This means that they need to be applied to the reconstructed frame at the encoder and decoder in order to use the same reference frames at the encoder and decoder. The aim of this post filtering is to remove compression artifacts.

Figure 2:
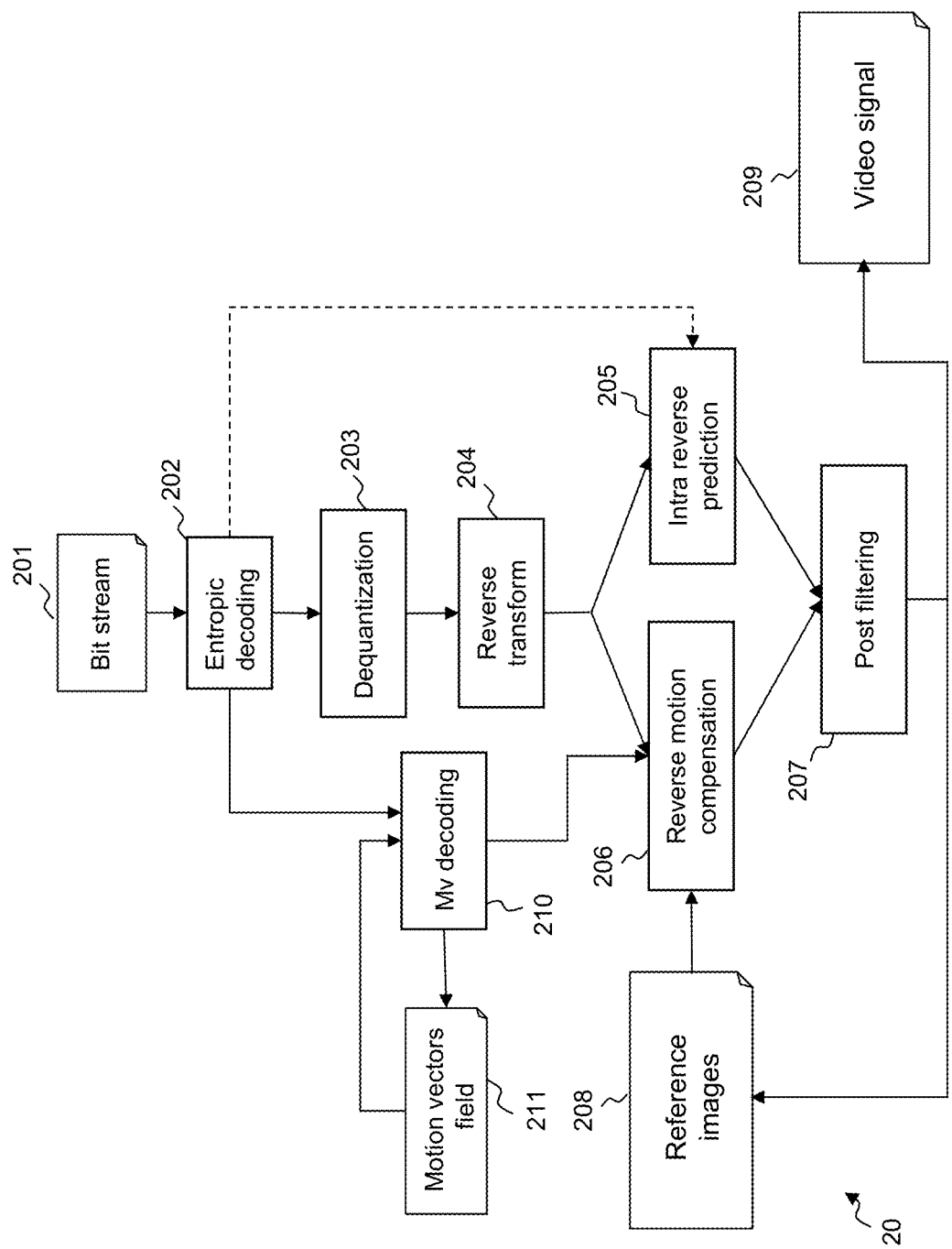
FIG. 2 illustrates the HEVC decoder architecture.

The principle of an HEVC decoder has been represented in FIG. 2. The video stream 201 is first entropy decoded in a module 202. The residual data are then inverse quantized in a module 203 and inverse transformed in a module 204 to obtain pixel values. The mode data are also entropy decoded and depending on the mode, an INTRA type decoding or an INTER type decoding is performed. In the case of INTRA mode, the INTRA prediction direction is decoded from the bitstream. The prediction direction is then used to locate the reference area 205. If the mode is INTER, the motion information is decoded from the bitstream 202. This is composed of the reference frame index and the motion vector residual. The motion vector predictor is added to the motion vector residual to obtain the motion vector 210. The motion vector is then used to locate the reference area in the reference frame 206. Note that the motion vector field data 211 is updated with the decoded motion vector in order to be used for the prediction of the next decoded motion vectors. This first reconstruction of the decoded frame is then post filtered 207 with exactly the same post filter as used at the encoder side. The output of the decoder is the de-compressed video 209.

Figure 3:
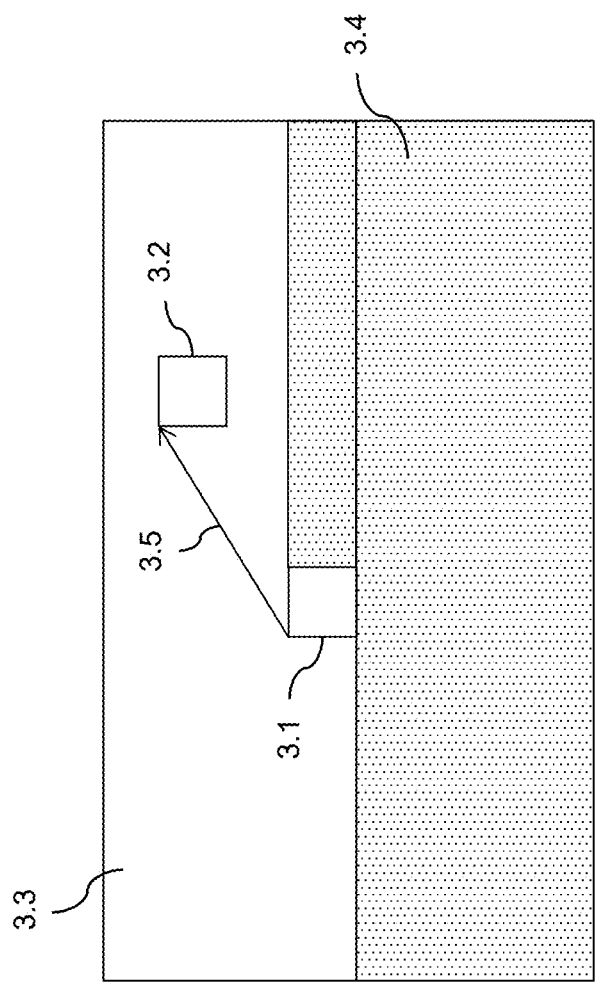
FIG. 3 illustrates the concept of the causal area.

FIG. 3 illustrates the causal principle resulting from block-by-block encoding as in HEVC.

At a high-level, an image is divided into Coding Units that are encoded in raster scan order. Thus, when coding block 3.1, all the blocks of area 3.3 have already been encoded, and can be considered available to the encoder. Similarly, when decoding block 3.1 at the decoder, all the blocks of area 3.3 have already been decoded and thus reconstructed, and can be considered as available at the decoder. Area 3.3 is called the causal area of the Coding Unit 3.1. Once Coding Unit 3.1 is encoded, it will belong to the causal area for the next Coding Unit. This next Coding Unit, as well as all the next ones, belongs to area 3.4 illustrated as a dotted area, and cannot be used for coding the current Coding Unit 3.1. It is worth noting that the causal area is constituted by reconstructed blocks. The information used to encode a given Coding Unit is not the original blocks of the image for the reason that this information is not available at decoding. The only information available at decoding is the reconstructed version of the blocks of pixels in the causal area, namely the decoded version of these blocks. For this reason, at encoding, previously encoded blocks of the causal area are decoded to provide this reconstructed version of these blocks.

It is possible to use information from a block 3.2 in the causal area when encoding a block 3.1. In the HEVC Range Extension draft specifications, a displacement vector 3.5, which can be transmitted in the bitstream, may indicate this block 3.2.

Figure 5:
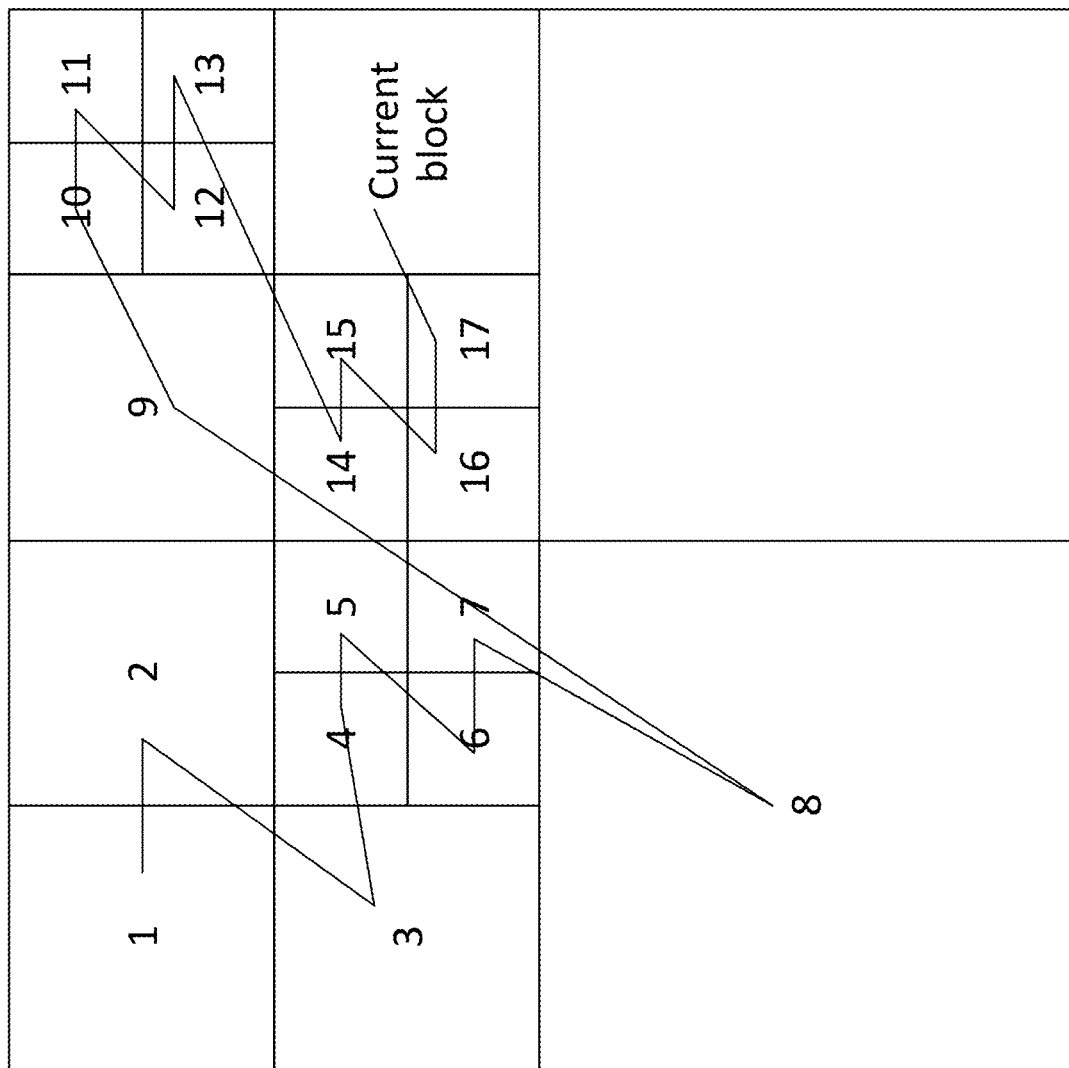
FIG. 5 illustrates the Coding Tree Block splitting into Coding Units and the scan order decoding of these Coding Unit.

FIG. 5 illustrates a splitting of a Coding Tree Block into Coding Units and an exemplary scan order to sequentially process these Coding Units. In the HEVC standard, the block structure is organized by Coding Tree Blocks (CTBs). A frame contains several non-overlapped and square Coding Tree Blocks. The size of a Coding Tree Block can range in size from 64×64 to 16×16. This size is determined at sequence level. The most efficient size, in term of coding efficiency, is the largest one: 64×64. Note that all Coding Tree Blocks have the same size except for the image border, meaning that they are arranged in rows. The size of the border CTBs is adapted according to the amount of remaining pixels.

Each Coding Tree Block contains one or more square Coding Units (CU). The Coding Tree Block is split based on a quad-tree structure into several Coding Units. The processing (coding or decoding) order of each Coding Unit in the Coding Tree Block follows the quad-tree structure based on a raster scan order. FIG. 5 shows an example of the processing order of Coding Units. In this figure, the number in each Coding Unit gives the processing order of each corresponding Coding Unit of this Coding Tree Block.

In HEVC, several methods are used to code the different syntax elements, for example block residuals, information on predictor blocks (motion vectors, INTRA prediction directions, etc.). HEVC uses several types of entropy coding such as the Context based Adaptive Binary Arithmetic Coding (CABAC), Golomb-rice Code, or simple binary representation called Fixed Length Coding. Most of the time a binary encoding process is performed to represent the different syntax elements. This binary encoding process is also very specific and depends on the different syntax element.

For example, the syntax element called "coeff_abs_level_remaining" contains the absolute value or a part of an absolute value of the coefficient residual. The idea of this binary encoding process is to use Golomb-Rice code for the first values and Exponential Golomb for the higher values. More specifically, depending on a given parameter called Golomb Order, this means that for representing the first values, for example values from 0 to 3, a Golomb-Rice code is used, then for higher values, for example values from 4 and above, an Exponential Golomb code is used. The Golomb Order is a parameter used by both the Golomb-Rice code and the exponential Golomb code.

Figure 6:
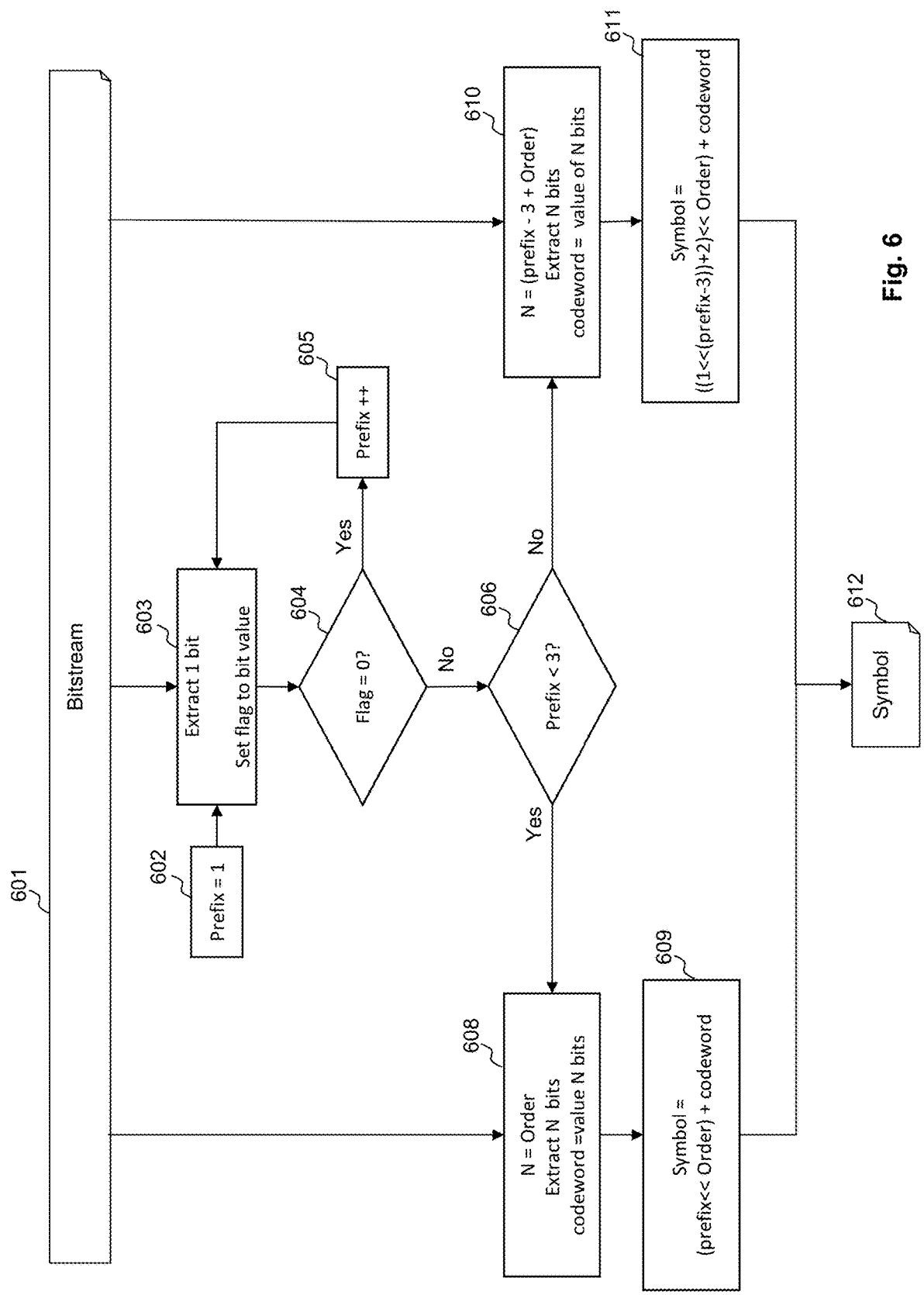
FIG. 6 illustrates the Golomb based binary coding of a syntax element in HEVC.

FIG. 6 illustrates this principle at the decoding side. The input data of the decoding process are the bitstream 601 and the Order which is known as the Rice Golomb parameter, or the Golomb Order. The output of this process is the decoded symbol 612.

The prefix value is set equal to 1 at step 602 then 1 bit is extracted from the bitstream at step 601 and the variable flag is set equal to the decoded value 603. If this flag is equal to 0 at step 604 the Prefix value is incremented 605 and another bit is extracted from the bitstream 603. When the flag value is equal to 1, the decision module 606 checks if the value Prefix is strictly inferior to 3. If this is true, the N=Order bits are extracted 608 from the bitstream 601 and set to the variable "codeword". This corresponds to the Golomb-Rice representation. The Symbol value 612 is set equal to ((prefix<<Order)+codeword) as represented in step 609. Where '<<' is the left shift operator.

If the Prefix is superior or equal to 3 at step 606, the next step is 610 where N=(prefix−3+Order) bits are extracted from the bitstream and set to the variable "codeword" 610. The symbol value 611 is set equal to ((1<<(prefix−3))+2) <<Order)+codeword. This corresponds to the exponential Golomb representation.

In the following, this decoding process, and in a symmetric way the corresponding encoding process, is called Golomb_H with an input parameter corresponding to the Golomb Order. It can be noted in a simple way Golomb_H (Order).

In HEVC, for some syntax elements such as residuals, the Golomb Order is updated in order to adapt the entropy coding to the signal to be encoded. The updating formula tries to reduce the Golomb code size by increasing the Golomb Order when the coefficients have large values. In the HEVC standard, the update is given by the following formula:

$$\text{Order}=\text{Min}(cLastRiceOrder+(cLastAbsLevel>(3*(1<<cLastRiceOrder))?\ 1:0),4)$$

Where cLastRiceOrder is the last used Order, cLastAbsLevel is the last decoded coeff_abs_level_remaining. Please note that for the first parameter to be encoded or decoded, cLastRiceOrder and cLastAbsLevel are set equal to 0. Moreover please note that the parameter Order cannot exceed the value of 4 in this formula. And where the expression (C ? A:B) has the value A if the condition C is true and B if the condition C is false.

The HEVC Range Extension, also commonly called HEVC RExt, is an extension that is currently being drafted for the new video coding standard HEVC.

Figure 4:
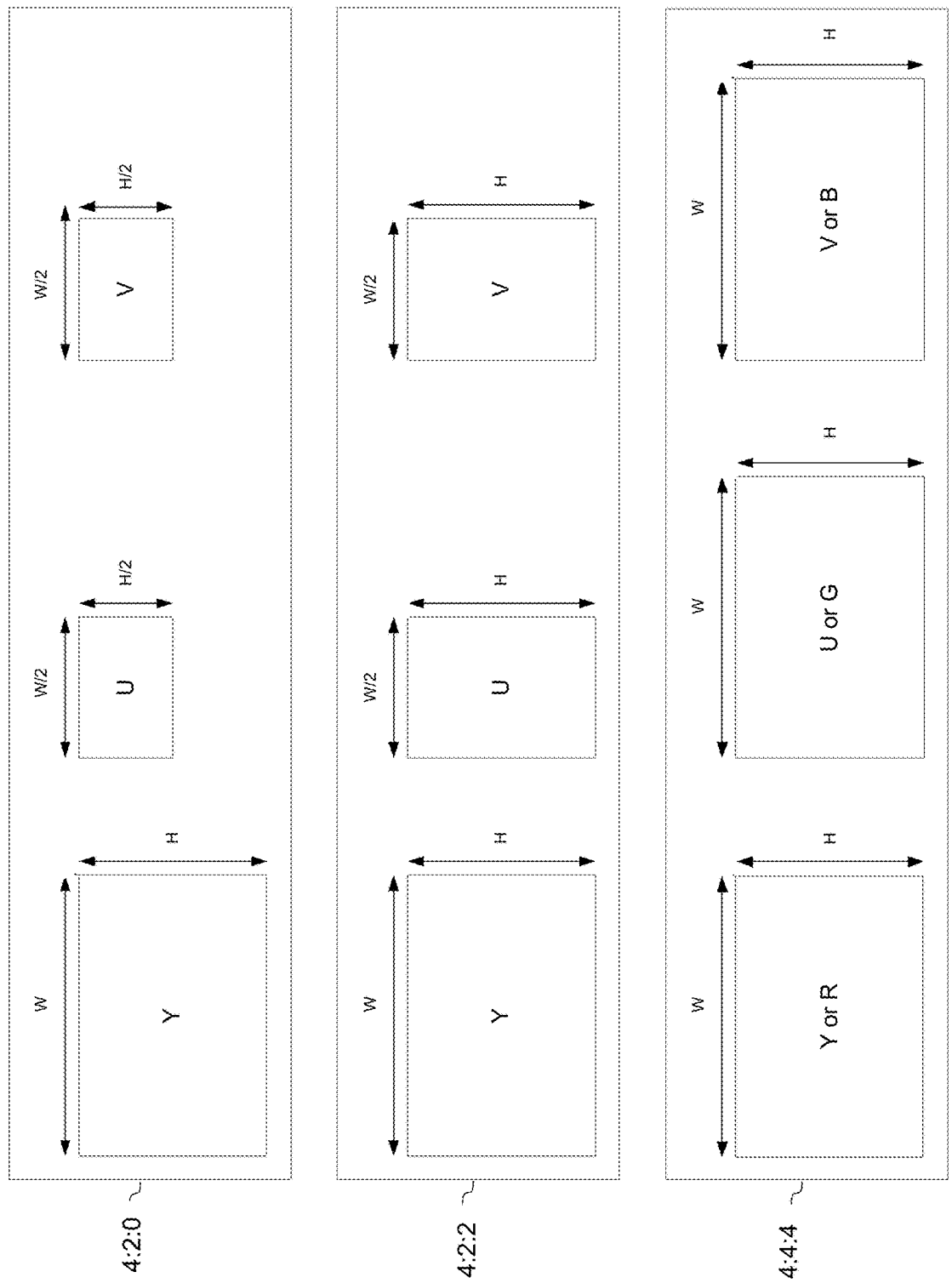
FIG. 4 illustrates Chroma formats supported by HEVC RExt.

An aim of this extension is to provide additional tools to code video sequences with additional colour formats and bit-depth, and possibly losslessly. In particular, this extension is designed to support 4:2:2 colour format as well as 4:4:4 video format in addition to 4; 2.0 video format (see FIG. 4). A colour image is generally made of three colour components R, G and B. These components are generally correlated, and it is very common in image and video compression to de-correlate the colour components prior to processing the images. The most common format that de-correlates the colour components is the YUV colour format. YUV signals are typically created from RGB representation of images, by applying a linear transform to the three inputs R, G and B input frames. Y is usually called Luma component, U and V are generally called Chroma components. The term 'YCbCr' is also commonly used in place of the term 'YUV'.

Regarding the bit-depth which is the number of bits used to code each colour component of a pixel, although the current HEVC standard is able to deal with 4:2:0 colour format with 8 and 10 bits bit-depth (i.e. 256 to 1,024 possible colours), HEVC RExt is about to be designed to additionally support 4:2:2 and 4:4:4 video format with an extended bit-depth ranging from 8 bits up to 16 bits (i.e. up to 65,536 possible colours). This is particularly useful to have a larger dynamic of colour components.

HEVC RExt is also designed to provide a lossless encoding of the input sequences; this is to have a decoded output 209 strictly identical to the input 101. To achieve this, a number of tools have been modified or added, compared to the conventional HEVC lossy codec. A non-exhaustive list of exemplary modifications or additions to implement losslessly is provided here below:
  removal of the quantization step 108 (203 at the decoder);
  forced activation of the bypass transform, as normal cosine/sine transforms 107 may introduce errors (204 at the decoder);
  removal of tools specifically tailored for compensating quantization noise, such as post filtering 115 (207 at the decoder).

For HEVC RExt, the updating formula of the Golomb Order has been further modified in order to be adapted to deal with higher bit-depth and to take into account very high quality required by application dealing with video compression of extended format (4:2:2 and 4:4:4) including lossless coding. For HEVC RExt, the updating formula has been changed as follows:

$$\text{Order}=\text{Min}(c\text{LastRiceOrder}+(c\text{LastAbsLevel}\!>\!>\!(2+c\text{LastRiceOrder})),7)$$

With this formula, the maximum value of Order is 7. Moreover, for the first coding of the coeff_abs_level_remaining for a sub-block of Transform block, the Golomb order is set equal to:

$$\text{Order}=\text{Max}(0,c\text{RiceOrder}-(\text{transform\_skip\_flag}||\text{cu\_transquant\_bypass\_flag ? 1:2}))$$

where
the variable "transform_skip_flag" is set to 1 if the transform (e.g. DCT 107 or 204) is skipped for the current coding unit and 0 if the transform is used,
the variable "cu_transquant_bypass_flag" is set to 1 if the coding unit is losslessly encoded and 0 otherwise,
the variable "cRiceOrder" is set equal to last used Order from another sub-block of the transform block and otherwise is set to 0.

Additional tools for HEVC RExt are currently being designed to efficiently encode "screen content" video sequences in addition to natural sequences. The "screen content" video sequences refer to particular video sequences which have a very specific content corresponding to those captured from a personal computer of any other device, containing for example text, PowerPoint presentation, Graphical User Interface, tables (e.g. screen shots). These particular video sequences have quite different statistics compared to natural video sequences. In video coding, performance of conventional video coding tools, including HEVC, proves sometimes to be underwhelming when processing such "screen content".

The current tools currently discussed on in HEVC RExt to process "screen content" video sequences include the Intra Block Copy mode and the Palette mode. Prototypes for these modes have shown good coding efficiency compared to the conventional method targeting natural video sequences. The present application focuses on the Palette coding mode.

The Palette mode of HEVC RExt is a prediction mode. It means that the Palette method is used to build a predictor for the coding of a given coding unit similarly to a prediction performed by motion prediction (Inter case) or by an Intra prediction. After the generation of the prediction, a residual coding unit is transformed, quantized and coded. In other words, the same processes as described above with reference to FIGS. 1 and 2 apply.

Figure 8:
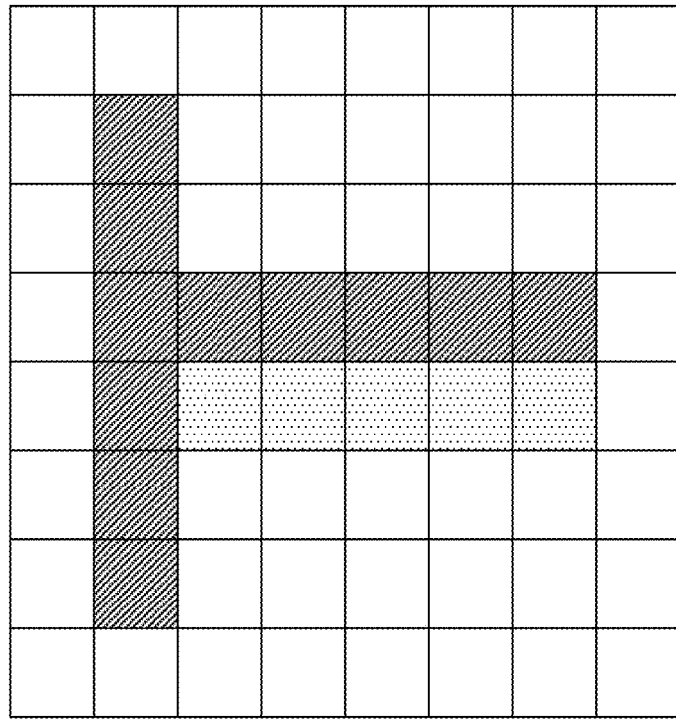
FIG. 8 illustrates an example of a coding unit with its corresponding block of levels and the associated palette.

A palette is generally represented by a table containing a finite set of N-tuple of colors, each color being defined by its components in a given colour space (see for example 803 in FIG. 8 based on YUV colour space). For example, in a typical RGB format, the palette is composed of a list of P elements of N-tuple (where N=3 for a RGB). More precisely, each element corresponds to a fixed triplet of colour components in the RGB format. Of course this is not limited to a RGB or YUV colour format. Any other colour format can be represented by a palette and can use a smaller or a higher number of colour components, meaning that N may be different from 3.

At the encoder side, the Palette mode, under consideration in RExt, consists in transforming pixel values of a given input coding unit into indexes called levels identifying the entries in an associated palette. After the transformation, the resulting coding unit or block is composed of levels and is then transmitted to the decoder with the associated palette, generally a table having a finite number of triplets of colours used to represent the coding unit. Since the palette defines a finite number of colours, the transformation into a block of indexes usually approximates the original input coding unit.

To apply the Palette mode at the encoder side, an exemplary way to transform a coding unit of pixels is performed as follows:
find the P triplets best describing the coding unit of pixels to encode, for example by minimizing overall distortion;
then associate with each pixel of the coding unit the closest colour among the P triplets: the value to encode (or level) (which thus forms part of the block of indexes) is then the index corresponding to the entry of the associated closest colour. The predictor block of indexes is thus obtained from the palette by comparing the entries of the palette to each pixel of the coding unit, in order to identify, for each pixel, the entry which defines the closest colour.

For each coding unit, the palette (i.e. the P triplets found), the block of indexes or levels and the residual representing the difference between the original coding unit and the block of indexes in the colour space (which is the block predictor) are coded in the bitstream 110 and sent to the decoder.

At the decoder, the Palette mode consists in performing the conversion in the reverse way. This means that each decoded index associated with each pixel of the coding unit is replaced by the corresponding colour in the palette decoded from the bitstream, in order to reconstruct the corresponding colour for each pixel of the coding unit. This is the reconstruction of the block of indexes in the colour space (i.e. of the coding unit predictor). Since the Palette mode is a prediction mode, the associated residual is decoded from the bitstream and then added to the reconstructed coding unit predictor to build the final reconstructed coding unit.

Figure 7:
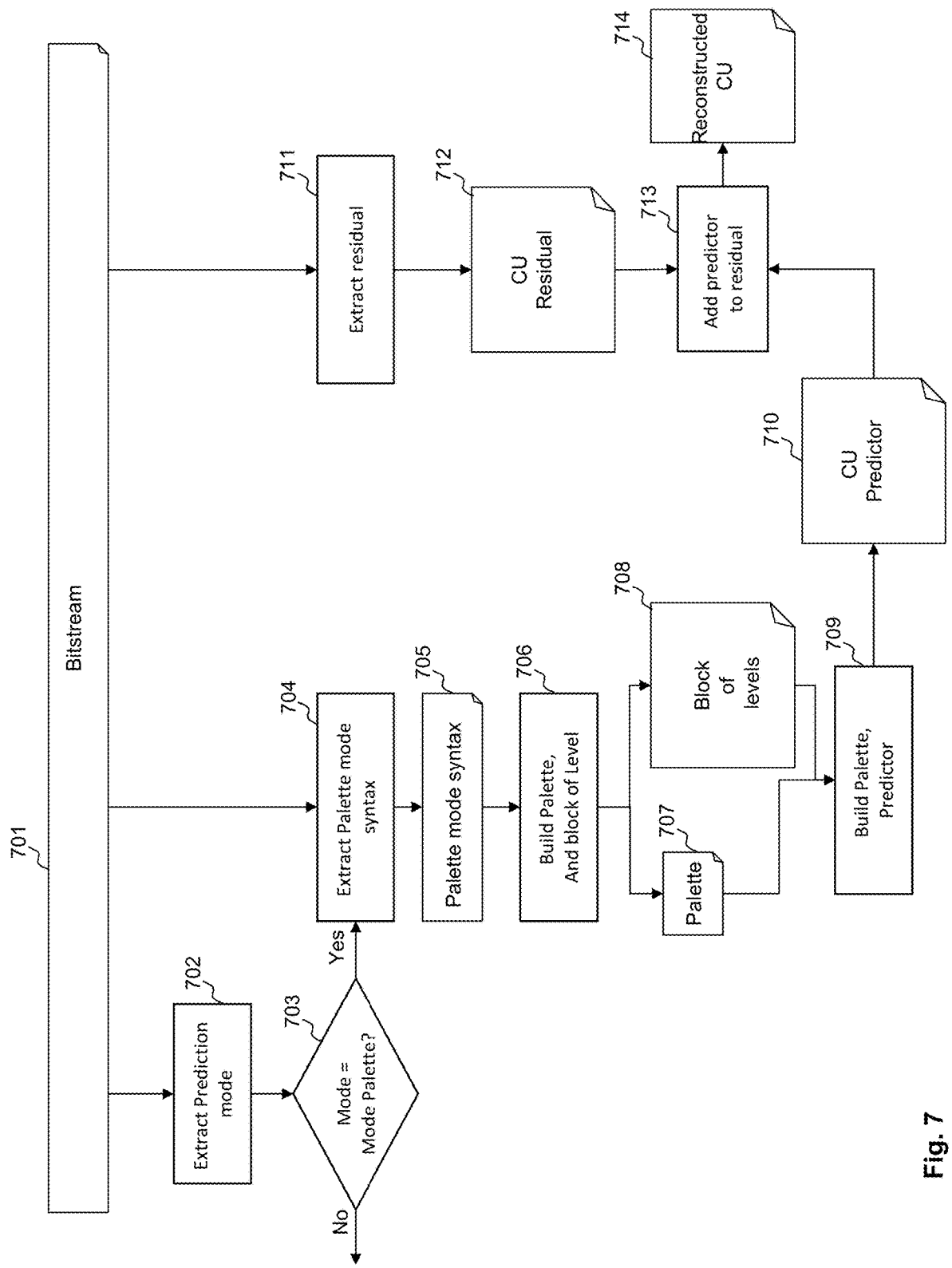
FIG. 7 illustrates the principle of Palette mode prediction at the decoder side under investigation in the Range Extension of HEVC.

FIG. 7 further illustrates the principle of Palette mode at the decoder. The prediction mode for the current coding unit is extracted at step 702 from the bitstream 701. Currently, the Palette mode is identified by a flag located before the skip flag in the bitstream (the other coding modes have been described above with reference to FIGS. 1 and 2). This flag is CABAC coded using a single context. If this mode is the Palette mode 703 then the related syntax of the Palette mode 705, i.e. the information on the palette, the block of levels and the residual, is extracted and decoded 704 from the bitstream 701.

Next, during step 706, two elements are built from the decoded data: the palette 707 and the block of levels 708. From this block of levels and the associated palette, the coding unit predictor in pixel domain 710 is built 709. This means that for each level of the block of levels, a color (RGB or YUV) is associated with each pixel.

Then the coding unit residual is decoded 711 from the bitstream 701. In the current implementation of Palette mode, the residual associated with a Palette mode is coded using the common HEVC Inter residual coding method, i.e. using Golomb coding. To obtain the residual of the coding unit, the conventional inverse quantization and inverse transformation are performed. The block predictor 710 is added 713 to this coding unit residual 712 in order to form the reconstructed coding unit 714.

FIG. 8 illustrates the principle of the Palette mode at the encoder. The current coding unit 801 is converted into a block 802 of the same size which contains a level for each pixel instead of 3 colour values (Y, U, V) or (R, G, B). The palette 803 associated with this block of levels is built based on coding unit overall distortion minimization and associates at each entry, an entry index or level with corresponding pixel colour values. Note that for monochrome application, the pixel value can contain only one component.

As mentioned in relation to FIG. 7, the palette (as well as the residual) is coded and inserted into the bitstream for each coding unit. In the same way, the block of levels (corresponding to the coding unit predictor) is coded and inserted into the bitstream and an example of the coding is given below with reference to FIG. 9. In this example, the block of levels is scanned in a horizontal order.

The block of levels 91 is exactly the same as the one illustrated in FIG. 8 under reference 802. The tables 92 and 93 describe the successive syntax elements used to code the block of levels 91. Table 93 should be read as the continuation of table 92. The syntax elements in the table correspond to the encoding of the groups of levels surrounded by bold lines in the block 91.

The block of levels is encoded by group of successive pixels in scan order. Each group is encoded using a first syntax element giving a prediction direction, a second element giving the repetition, and an optional third element giving the value of the pixel, namely the level. The repetition corresponds to the number of pixels in the group.

These two tables represent the current syntax associated with the Palette mode. These syntax elements correspond to the encoded information associated in the bitstream for the block of levels 91. In these tables, three main syntax elements are used to fully represent the operations of the Palette mode and are used as follows when successively considering the levels of the block of levels 91.

A first syntax element, called "Pred mode" makes it possible to distinguish between two encoding modes. In a first mode corresponding to "Pred mode" flag equal to "0", a new level is used for the current pixel. The level is immediately signaled after this flag in the bitstream. In a second mode corresponding to "Pred mode" flag equal to "1", a "copy up" mode is used. More specifically, this means that the current pixel level corresponds to the pixel level located at the line immediately above starting on the same position for a raster scan order. In that case of "Pred mode" flag equal to "1", there is no need to signal a level immediately after the flag because the value of the level is known by reference to the value of the level of the pixel just above in the block of levels 91.

A second syntax element called "Level" indicates the level value of the palette for the current pixel only in the first mode of "Pred mode".

A third syntax element, called "Run", is used to encode a repetition value in both modes of "Pred mode". Considering that the block of levels 91 is scanned from the top left corner to the bottom right corner, row by row from left to right and top to bottom, the Run syntax element gives the number of successive pixels in block 91 having the same encoding.

This "Run" syntax element has a different meaning which depends on the "pred mode" flag. When Pred mode is 0, "Run" element is the number of successive pixels of the predictor block having the same level value. For example, if Run=8 this means that the current "Level" is applied to the current pixel and to the following 8 pixels which corresponds to 9 identical successive samples in raster scan order.

When Pred mode is 1, "Run" element is the number of successive pixels of the predictor block having a level value corresponding to the level value of their above pixel in block 91, i.e. where the "copy up" mode is applied. For example, if Run=31 this means that the level of the current pixel is copied from the pixel of the line above as well as the following 31 pixels which corresponds to 32 pixels in total.

Tables 92 and 93 represent the eight steps to represent the block 91 by using the Palette mode. Each step starts with the coding of the "Pred mode" flag which is followed by the "Level" syntax element when "Pred mode" flag equals "0", or by the "Run" syntax element when "Pred mode" flag equals "1". The "Level" syntax element is always followed by a "Run" syntax element.

When the prediction mode decoded for the current block is the palette mode, the decoder first decodes the syntax relating to this block and then applies the reconstruction process for the coding unit.

Figure 10:
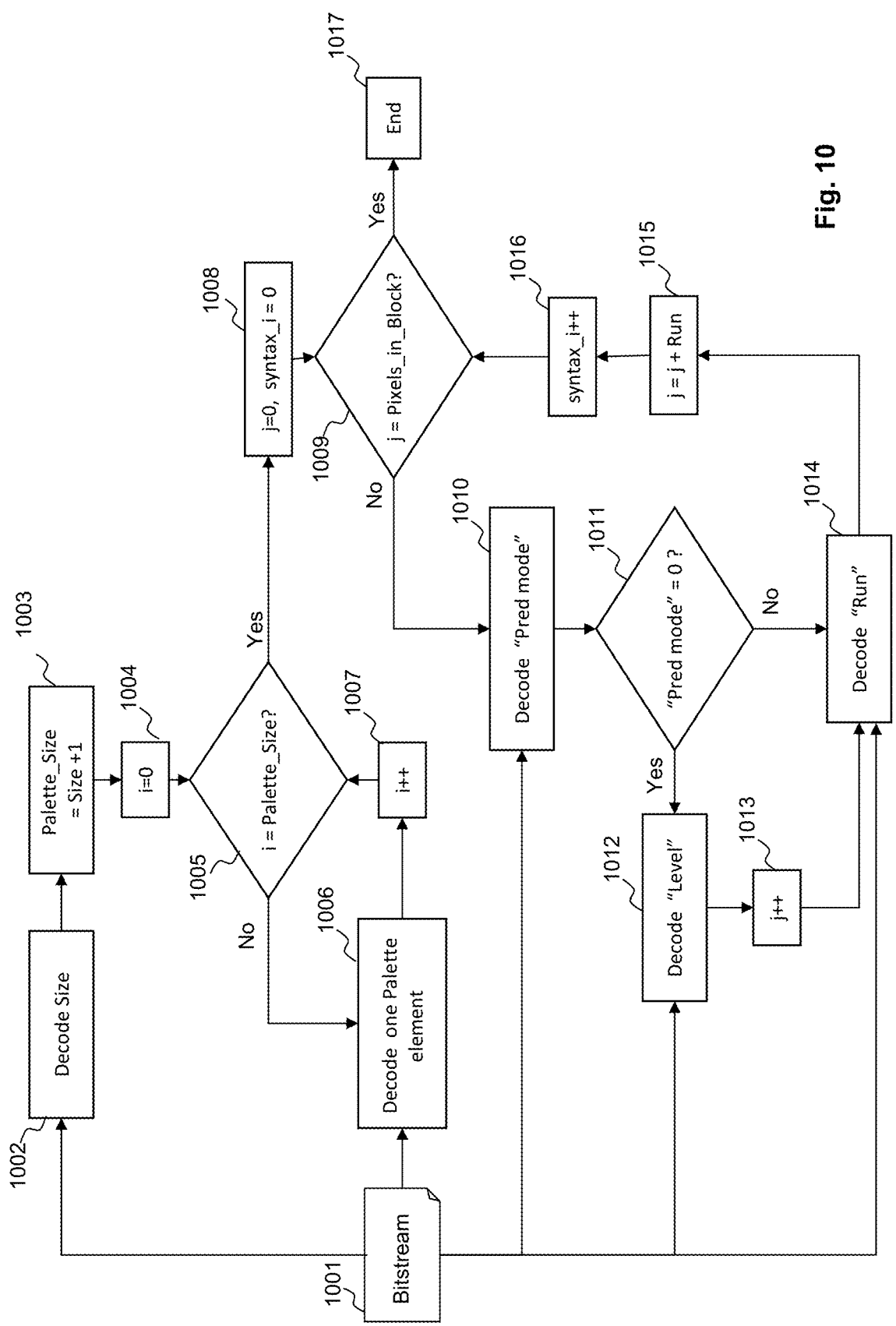
FIG. 10 illustrates the decoding process of the syntax elements relating to the Palette mode.

FIG. 10 illustrates the decoding process of the syntax elements relating to the Palette mode. First, the size of the palette is extracted and decoded 1002 from the bitstream 1001. The exact size of the palette (Palette_size) is obtained by adding 1 to this size value decoded at step 1002. Indeed, the size is coded by using a unary code for which the value 0 has the smallest number of bits (1 bit) and the size of the palette cannot be equal to 0, otherwise no pixel value can be used to build the block predictor.

Next the process corresponding to the palette values decoding starts. A variable i corresponding to the index of the palette is set equal to 0 at step 1004 next a test is performed at step 1005 to check whether i is equal to the palette size (Palette_size) or not. If it is different from the palette size at step 1005, one palette element is extracted from the bitstream 1001 and decoded at step 1006 and is then added to the palette with the associated level/index equal to i. Then the variable i is incremented through step 1007. If i is equal to the palette size at step 1005, the palette has been completely decoded.

Next the process corresponding to the decoding of the block of levels 91 is performed. First, the variable j, corresponding to a pixel counter, is set to 0 as well as the variable syntax_i 1008. Then a check is performed to know whether the pixel counter corresponds to the number of pixels contained in the block. If the answer is yes at step 1009 the process ends at step 1017, otherwise the value of the flag "Pred mode" corresponding to one prediction mode is extracted from the bitstream 1001 and decoded 1010.

The value of "Pred mode" is added to a table at the index syntax_i containing all "Pred mode" value decoded. If the value of this "Pred mode" is equal to 0, step 1011, the syntax element corresponding to "Level" is extracted from the bitstream 1001 and decoded 1012. This variable "Level" is added to a table at the index syntax_i containing all levels decoded. The variable j corresponding to the pixel counter is incremented by one 1013.

Next the "Run" syntax element is decoded at step 1014. If the syntax element "Pred Mode" is equal to 1, step 1011, the "Run" value is also decoded at step 1014. This syntax element "Run" is added to a table at the index syntax_i containing all the runs decoded.

Next at step 1015, the value j is incremented by the value of the run decoded at step 1014. The variable syntax_i is incremented by one to consider the next set of syntax elements. If the counter j is equal to the number of pixels in the block then the syntax to build the block of levels 91 is finished 1017. At the end of this process related to the Palette, the decoder knows the palette, and the tables containing the list of all the "Pred mode", "Level" and "Run" syntax elements associated with the Palette mode of this coding unit. The decoder can then proceed with the reconstruction process of the coding unit as described through FIG. 7.

In a slight variant of this embodiment of FIG. 10, the "Pred mode" element is not provided for the first line of pixels at the top of the block of levels 91. This is because, since these pixels are deprived of levels at a line above, the "copy up" mode cannot be executed. Therefore, as long as j is less than the block width at step 1009, no "Pred mode" element is provided and steps 1010-1011 are shortcut, thereby directly performing step 1012. Note that this slight variant decreases the size of the encoded block of levels.

In an embodiment that can be combined with either the above embodiment of FIG. 10 or its slight variant, several blocks of levels may be generated instead of only one. This means that several levels are used for all or parts of the pixels. For instance, a first block of levels may be built for a first colour component (Y for example), while another block of levels may be built for the at least one remaining component (U and V for example). Of course, three blocks of levels for the three colour components may be contemplated. The choice to have several blocks of level and their correspondence with the colour components may be signalled in the bitstream using specific flags. In a variant, this may be implied by the colour format of the image.

The process of FIG. 10 has been described above in relation with the Palette mode prediction process of FIG. 7, where a residual is encoded and thus extracted and decoded at steps 711 and 712 before being added to the Coding Unit predictor.

In a variant of the Palette mode prediction process as described in FIG. 7, no residual may be provided (i.e. encoded at the encoding side). It results in FIG. 7 being deprived of steps 711, 712 and 713, the reconstructed Coding Unit 714 being the same as the Coding Unit predictor 710.

However, there may still be pixels of the Coding Unit that are improperly described by levels of the palette, meaning that no corresponding relevant levels have been found in the palette. These pixels are referred to as "escape" pixels, since no corresponding value is set in the block of levels.

The syntax elements built during the process of FIG. 10 for the block of levels may thus be supplemented, for those "escape" pixels, with explicit pixel values from the original Coding Unit. The explicit pixel values may be signalled and transmitted in the bitstream.

An example of signalling the pixels is to add an "escape" flag before the "Pred mode" element (i.e. before step 1010) indicating whether a pixel is palette-coded (therefore subject to step 1010) or escape-coded (therefore with an explicit pixel value). The "escape" flag is followed by the explicit pixel value (no "Pred mode", "Level" and "Run" elements are provided for this pixel).

In a variant to the "escape" flag, a specific Level value (dedicated to "escape" pixels and obtained at step 1012) may be used to signal an "escape" pixel. In this case, the "Run" element should be the explicit pixel value. This specific value may only occur when the palette being built reaches its maximum size, thereby saving the cost of signalling escape values for each palette size.

In any embodiment, the explicit pixel values may be coded predictively (e.g. as a difference to a neighbour pixel value) or not, and may be quantized or not, with possible consequences for the entropy coding (contextual and number of bits, etc.).

Referring back to the palette, each palette element, constituted by three values in the above examples, is generally encoded using three binary codes. The length of the binary codes corresponds to the bit-depth of each color component. The palette size is typically encoded using unary code. The "Pred mode" element is encoded using one bit (as well as the "escape" flag if any). The "Level" element is encoded using binary code with binary code length equal to b, where $2^b$ is the smallest integer equal or above the palette size. And the "Run" element is encoded using Golomb_H(Order=3) as explained above in relation to FIG. 6.

Figure 11:
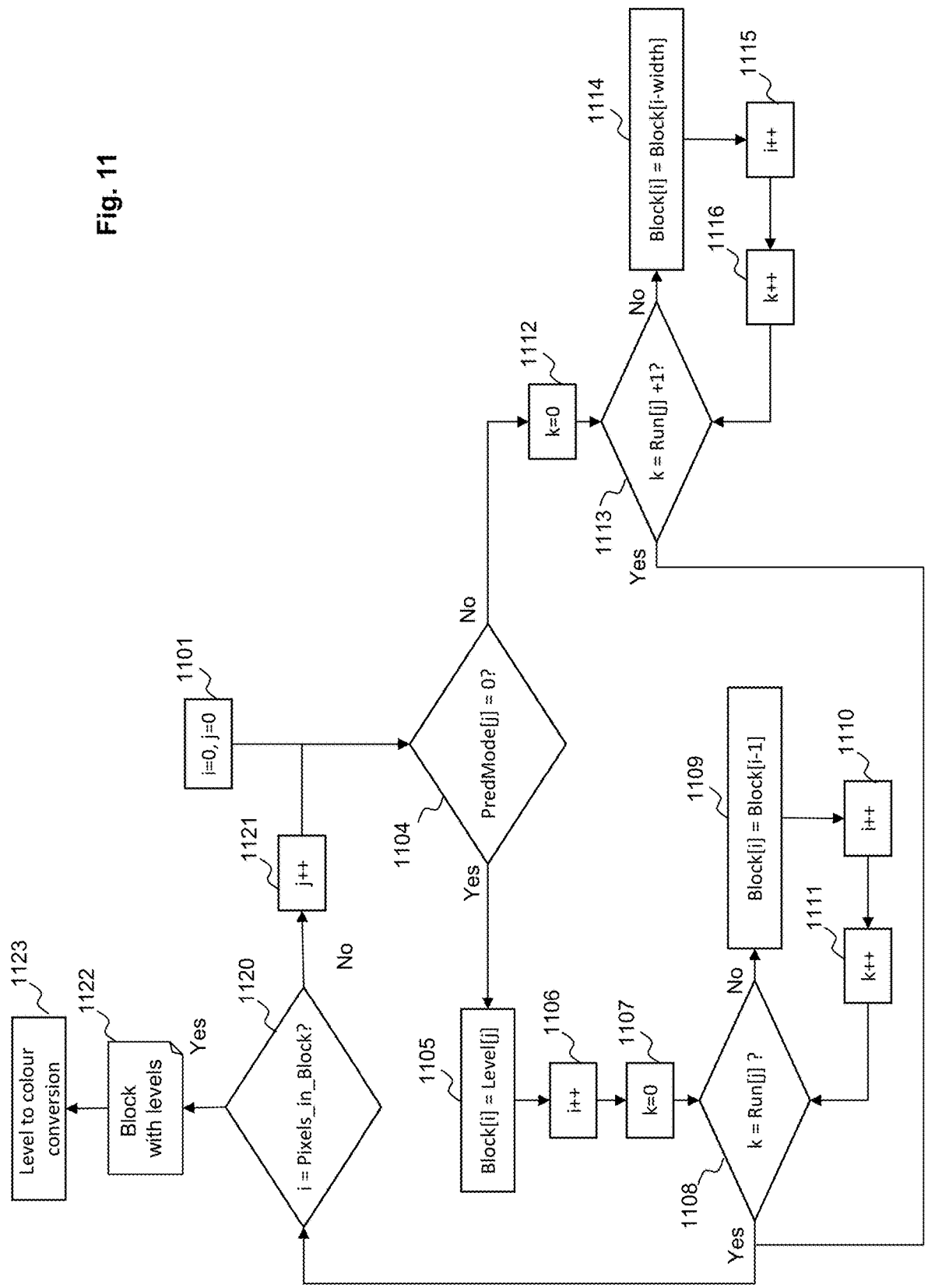
FIG. 11 illustrates the reconstruction process to build the block of levels at the decoding side.

FIG. 11 illustrates the reconstruction process to build the block of levels 91 and then the block predictor in the colour space that has to be used as predictor. The input data of this process are the tables obtained using the process of FIG. 10 above, and containing the list of "Pred mode", "Level" and "Run". Note that one skilled in the art is able to adapt the teachings below to the embodiments relying on the presence of "escape" pixels.

An additional item of input data to the "Pred mode", "Level" and "Run" elements is the size of the coding unit 801 (which is the same as the size of the block of levels 802/91) known from the quadtree (FIG. 5) signalled in the bitstream.

In a first step 1101, a variable i, representing a pixel counter, is set equal to 0 and a variable j, to successively consider each set of syntax elements, is also set equal to 0. At step 1104, the element Pred_mode[j] extracted from the table of "Pred mode" at index j is checked against 0.

If it is equal to 0, a new level is encoded for the current pixel i. As a consequence, the value of the pixel at position i is set equal to the level at the index j from the table of levels; Block[i]=Level[j]. This is step 1105. The variable i is incremented by one at step 1106 to consider the next pixel, and the variable k, dedicated to count the pixels already processed in the current Run, is set equal to 0 at step 1107.

A check is performed at step 1108 to determine whether or not k is equal to the "Run" element of the table of runs at the index j: k=Run[j] ?. If not equal, the level of the pixel at position i is set equal to the level value of the pixel at position i−1: Block[i]=Block[i−1]. This is step 1109. The variable i and the variable k are then incremented by one at respectively steps 1110 and 1111. If k=Run[j] at step 1108, the propagation of the left level value is finished and step 1120 is performed (described below).

If Pred_mode[j] is different from 0 at step 1104, the "copy up" mode starts with the variable k set equal to 0 at step 1112. Next, step 1113 checks whether or not (k−1) is equal to the "Run" element of the table of runs at the index j: k=Run[j]+1? If not equal, the level value of the pixel at position i is set equal to the level value of the pixel at position i of the above line: Block[i]=Block[i−width], where "width" is the width of the block of levels (the same as the coding unit) as deduced from the input size of the coding unit. This is step 1114. Next, the variable i and the variable k are incremented by one at respectively steps 1115 and 1116. If k=Run[j]+1 at step 1113, the prediction mode 'copy up' is completed and the process goes on at step 1120.

At step 1120, a check is performed to determine whether or not the variable i is equal to the amount of pixels in the block 91/CU 801. If not equal, the variable j is incremented by one at step 1121 to consider the next set of syntax elements and the process loops back to step 1104 described above.

If all the pixels have been processed at step 1120, the final block of levels 91 is obtained at step 1122: this corresponds to table Block[ ]. Then a final step 1123 consists in converting each level in colour values using the palette 803 decoded using the process of FIG. 10 (except for the "escape" pixels which directly have their pixel values). This final step affects pixel values (Y, U, V) or (R, G, B) at each block position according to the level of this position in the block and the corresponding entries in the palette.

Other aspects of the palette mode as introduced in HEVC RExt concern the determination by the encoder of the palette to be used to encode the current coding unit (see FIG. 12 below), and the selection of the Pred mode, Level and Run syntax elements at the encoder (see FIG. 13 below).

Figure 12:
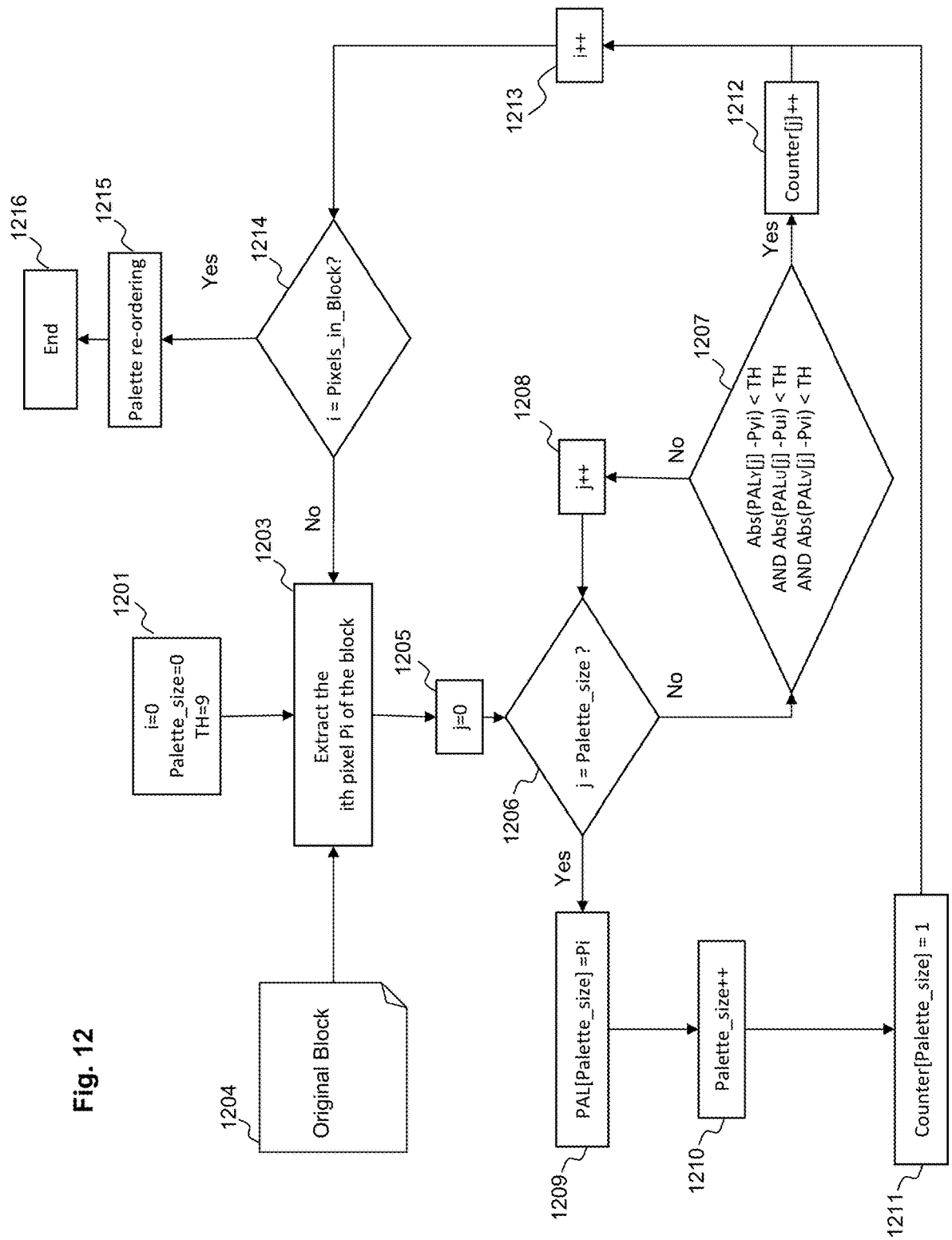
FIG. 12 illustrates an exemplary palette determination algorithm at the encoder.

FIG. 12 illustrates an exemplary palette determination algorithm at the encoder. The input data of this process are the original coding unit of pixels and its coding unit size. In this example, a YUV palette is built, but other implementations may result in having an RGB palette built in the same way.

At a first step 1201, a variable j representing a pixel counter is set to 0, a variable "Palette_size" to follow the growth of the palette as it is being built is also set to 0, and a variable "TH" representing a threshold is set to 9. Next at step 1203, the pixel $p_i$, i.e. having the index i according to a scanning order, is read at step 1203 from the original coding unit 1204. Then the variable j is set equal to 0 at 1205 and at step 1206 a check is performed to determine whether or not the palette size is equal to the variable "j" (meaning that all the palette elements of the palette under construction have been considered).

If the palette size is equal to j, the palette at the index "j" is set equal to the pixel value $p_i$ at step 1209. This means that the current pixel $p_i$ becomes a new element in the palette, with index j associated with it. More precisely the following assignment is performed:

$PAL_Y[j]=(Yi)$ $PAL_U[j]=(Ui)$ $PAL_V[j]=(Vi)$ where $PAL_{Y,U,V}$ are three tables to store the colour values.

The palette size (Palette_size) is incremented by one at step 1210 and an occurrence table Counter is set equal to 1 for the index 'Palette size' at step 1211. Then the variable i is incremented by one at step 1213 to consider the next pixel "i" of the current coding unit. A check is then performed at step 1214 to determine whether or not all the pixels of the current coding unit have been processed. If they have all been processed, the process is completed by an ordering step 1215 explained later on, otherwise the next pixel is considered at step 1203 described above.

Back to step 1206, if j is different from palette_size, step 1207 is performed where the absolute value for each colour component between $p_i$ and the palette element at the index j is computed. The formulas are shown in the Figure. If all the absolute differences are strictly less than the predefined threshold TH, the occurrence counter regarding the element "j" in the palette is incremented by one at step 1212. Step 1207 creates a class for each element of the palette under construction, such a class encompassing colours neighbouring the colour of the element, given the margin TH. Thus step 1212 counts the occurrences of each class. Step 1212 is followed by step 1213 already described.

If the condition of step 1207 is not met, the variable j is incremented by one at step 1208 to consider the next palette element in the palette. This is to compare the other palette colour elements to the current pixel through new occurrence of step 1207. If no element in the palette meets the criterion of step 1207, a new element is added to the palette as described above with reference to steps 1209, 1210 and 1211.

One may note that the decision module 1207 can compared each color element for a 4:4:4 (YUV or RGB) sequences and can only compare the Luma colour component for 4:2:0 sequences.

At the end of the process of FIG. 12, the table "Counter" contains the number of occurrences of the classes defined by the respective palette elements. Then the palette elements are ordered at step 1215 according to their occurrences so that the most frequent element is in the first position (entry with the lowest index or "level") in the palette.

One may also note that the size of the palette can be limited to a maximum size, for example 24 entries. In such a case, if the size of the palette resulting from step 1215 exceeds 24, the palette is reduced by removing the elements (entries) from the $25^{th}$ position in the ordered palette. This results in a palette being built.

Figure 13:
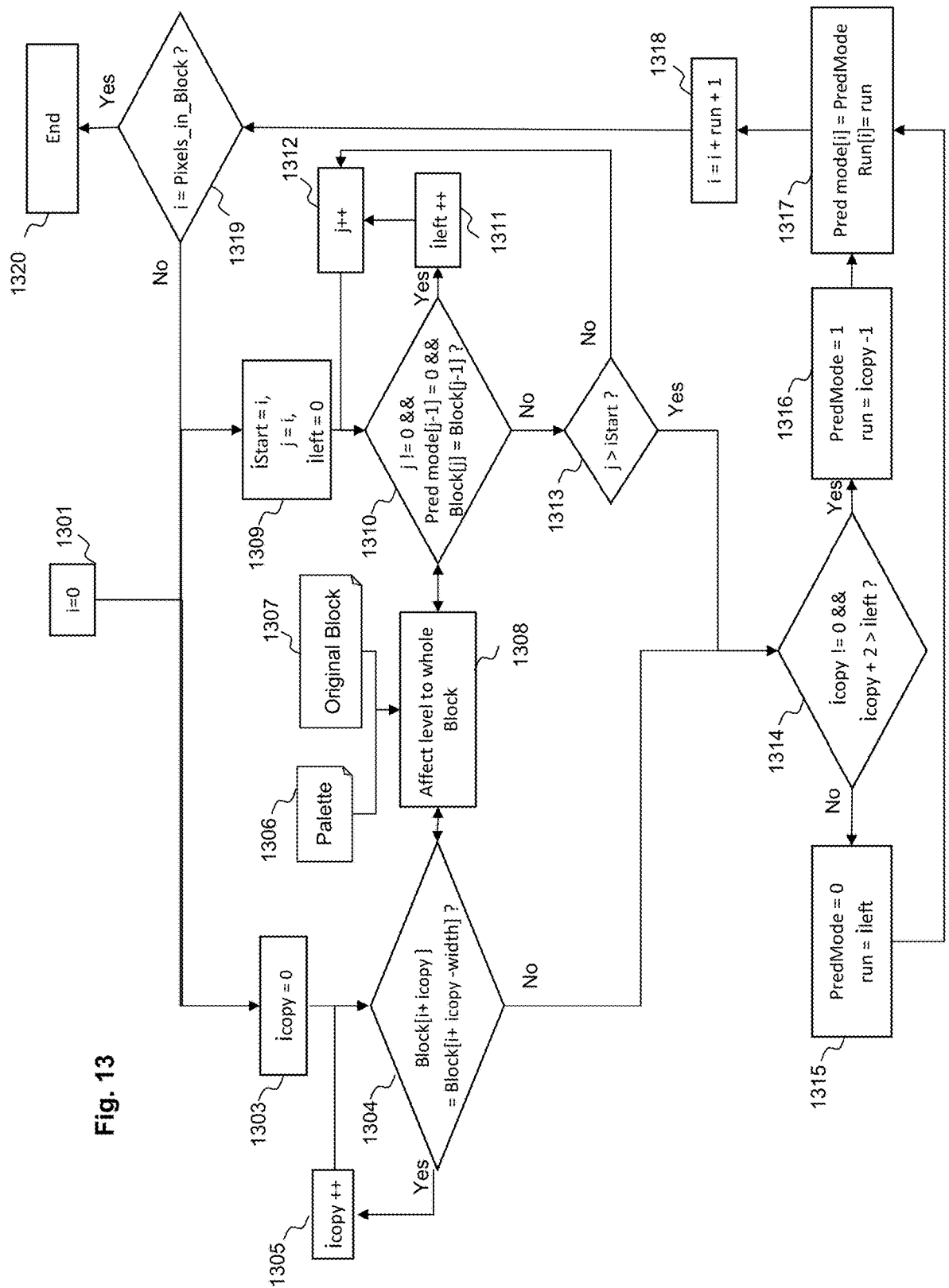
FIG. 13 illustrates the selection of the Pred mode, Level and Run syntax elements at the encoder for the Palette mode.

Turning now to the selection of the Pred mode, Level and Run syntax elements at the encoder, input data of the process of FIG. 13 are the original coding unit of pixels, the palette as built through the process of FIG. 12 and the coding unit size. In particular, this evaluation is performed when determining which coding mode between INTRA coding, INTER coding and Palette coding has to be used.

At a first step 1301, the variable "i" representing a pixel counter is set to 0. The process described below seeks to determine the syntax elements for the pixels starting from i. The two modes of prediction are evaluated independently: "Pred mode"=0 on the right hand part of the Figure, and "Pred mode"=1 on the left hand part of the Figure.

For the 'copy up' prediction (corresponding to "Pred mode"=1), the variable "$i_{copy}$" used to count the number of levels in the current Run is set equal to 0 at step 1303. Then at step 1304 the current level at pixel location i:Block[i+$i_{copy}$], is compared to the level of the pixel located just above in the above line: Block[i+$i_{copy}$–width], where "width" corresponds to the width of the current coding unit. Note that the level Block[i+$i_{copy}$] of each pixel of the coding unit is determined in parallel at step 1308. This step consists in associating with the pixel at the position i, the closest palette element (in practice its index or level) as already explained above. This step uses the position i, the palette 1306 and the original coding unit 1307.

If Block[i+$i_{copy}$]=Block[i+$i_{copy}$–width] at step 1304, the variable "$i_{copy}$" is incremented by one at step 1305 to consider the next pixel value of the block of pixels and to indicate that the current pixel level at position i+$i_{copy}$ can be included in the current "copy up" Run. If Block[i+$i_{copy}$] is different from Block[i+$i_{copy}$–width] at step 1304 meaning that the current evaluation of a "copy up" Run has ended, the variable "$i_{copy}$" is transmitted to the decision module 1314. At this stage of the process, the variable "$i_{copy}$" corresponds to the number of values copied from the line just above.

For the left value prediction (corresponding to "Pred mode"=0), the loop to determine the Run value ($i_{left}$) is processed in parallel or sequentially. First the variable "$i_{start}$" used to store the index i of the current pixel is set to "i", and the variable "j" used to consider successively the pixel levels following index "i" is also set equal to "i" and the variable "$i_{left}$" used to count the current Run under construction is set equal to 0. This is step 1309. Next, step 1310 consists in determining whether or not j !=0 and "Pred_mode[j–1]"=0 and Block[j]=Block[j–1]. Pred_mode[ ] is a table used by the encoder to store the prediction mode (either 1 or 0 for respectively the "copy up" prediction and the left value prediction). It is filled up progressively at step 1317 described below as the successive pixels are processed, and has been initialized with zero values for example at step 1301: Pred_mode[k]=0 for any k.

If the condition at step 1310 is met, the variable "$i_{left}$" is incremented by one at step 1311 to indicate that the current pixel level at position j can be included in the current "left value" Run, and the variable j is incremented by one at step 1312 to consider the next pixel value of the block of pixels.

If the condition at step 1310 is not met, the variable "j" is compared to "$i_{start}$" to determine if it is the first pixel value to be examined for the current "left value" Run. This is step 1313. If "j" is equal to or less than "$i_{start}$", meaning that it is the first pixel value to be examined for the current Run, then it starts the current Run and the next pixel value is considered at step 1312 described above. If "j" is strictly higher than "start", meaning that a first pixel value different from the pixel value of the current "left value" Run has been detected, the variable "$i_{left}$" which corresponds to the length of the current "left value" Run is transmitted to the decision module 1314. Note that, as the loop for "copy up" prediction, the level Block[i] at the index i is determined in the same loop at step 1308.

After having computed the maximum run for the 'left value prediction' and the 'copy up' mode, the variable "$i_{left}$" and "$i_{copy}$" are compared at step 1314. This is to determine whether or not "$i_{copy}$" !=0 and "$i_{copy}$"+2 is higher than "$i_{left}$". This is an exemplary criterion to select either the copy up mode or the left value prediction mode. In particular, the parameter "2" may be slightly changed.

The condition at step 1314 means that if "$i_{copy}$" is equal to 0 or is smaller than or equal to $i_{left}$-2, the "left value prediction" mode is selected at step 1315. In that case, a "PredMode" variable is set equal to 0 and a Run variable is set equal to "$i_{left}$" at same step 1315. On the other hand, if "$i_{copy}$" is different from 0 and is strictly higher than "$i_{left}$-2", the "copy-up" mode is selected at step 1316. In that case, the "PredMode" variable is set equal to 1 and the Run variable to $i_{copy}$-1 at step 1316.

Next the tables containing the "Pred_mode" and the "Run" at the encoder are updated with the current value "Predmode" and "Run", at step 1317. Then, the next position to consider in the block of pixels is computed at step 1318, which corresponds to the current position i incremented by the "run" value+1. Then a check is performed at step 1319 to determine whether the last pixels of the coding unit have been processed. If it is the case, the process ends at step 1320, otherwise the evaluation of the two prediction modes "left prediction" and "copy up" are evaluated starting at steps 1303 and 1309 for the next pixel position to obtain a new set of syntax elements.

At the end of this process, the encoder knows the levels for each sample of the coding unit, and is able to encode the corresponding syntax of the block of levels based on the content of the three tables Pred_mode[ ], Block[ ] and Run[ ].

As described above, the Palette mode as currently designed in HEVC RExt requires a palette to be transmitted for each coding unit. This represents a large amount of data in the bitstream, and thus a coding cost. The inventors have envisaged an improvement of the Palette mode to improve its coding efficiency According to one aspect of the invention, the current palette for a current coding unit is predicted using a palette predictor. In a variant regarding the invention, the current palette is predicted from entries of two or more palettes, the two or more palettes being palettes previously used to process blocks of pixels, for example using a palette predictor built from the two or more palettes. This makes it possible to reduce the amount of information to be transmitted for each palette associated with a coding unit. Various embodiments are described below.

As the approach of the invention is prediction-based, the obtaining of the predictor for the current coding unit is first described with reference to FIGS. 14 to 18, 22 and 24 to 26, and then the syntax elements to actually describe the prediction to the decoder are described with reference to FIGS. 19 to 22 and 27.

Figure 14:
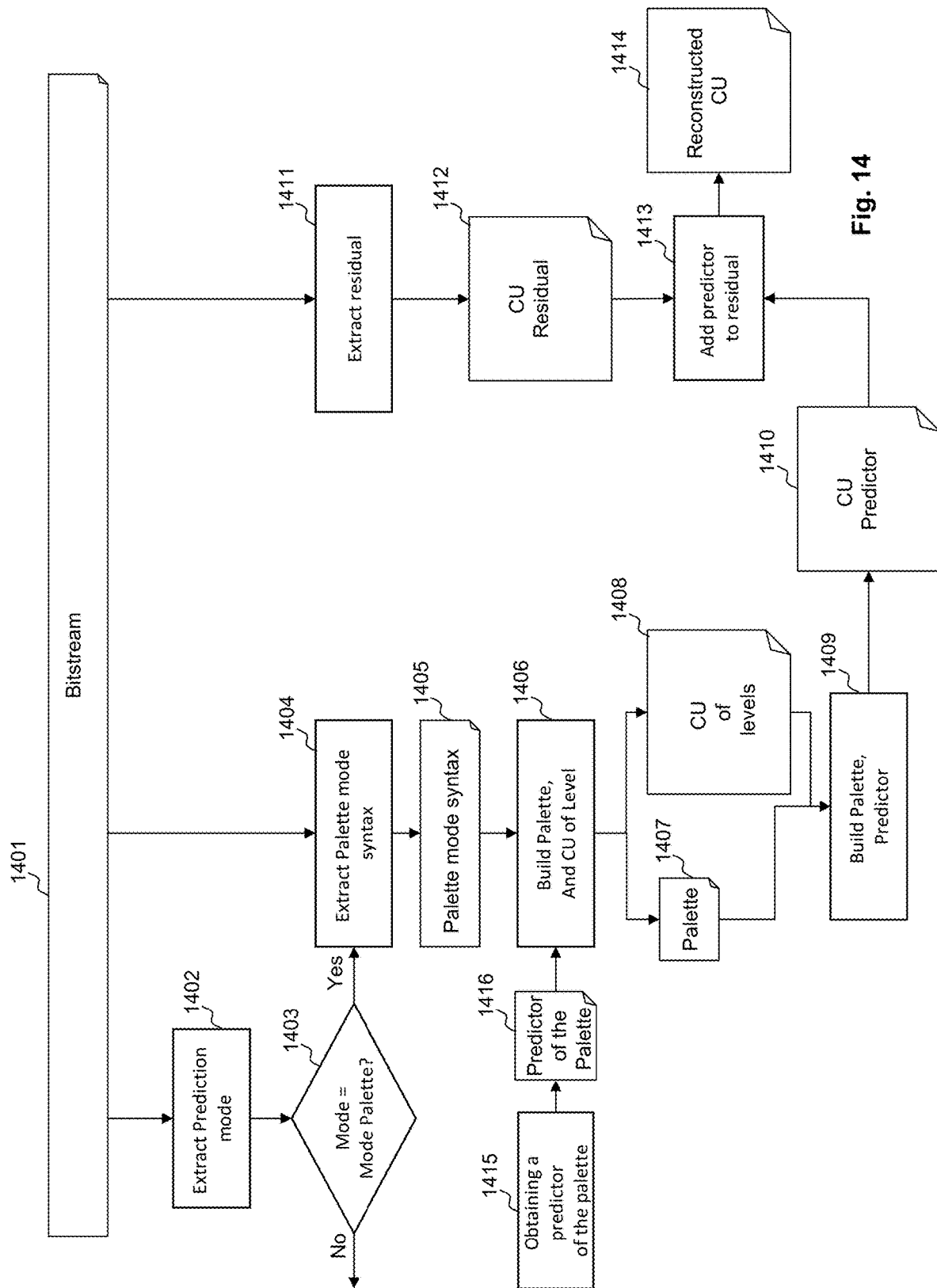
FIG. 14 illustrates the principle of using the palette prediction.

General steps of a decoding process implementing the invention are shown in FIG. 14 which is based on FIG. 7 described above. One skilled in the art would directly understand the corresponding operations at the encoder to appropriately build the bitstream. Blocks 14xx in FIG. 14 are similar to blocks 7xx in FIG. 7. As shown in the Figure, the main idea of the invention is implemented at step 1406 where the palette is at least partly predicted from a palette predictor 1416 instead of being entirely decoded from the bitstream. Several ways to obtain 1415 the palette predictor are described below, including obtaining a palette used to predict a previously processed block of pixels or coding unit;

a reference palette predictor associated with a coding entity that includes the current coding unit;

entries corresponding to values of pixels neighbouring the current coding unit; and at least one entry of the current palette that precedes a current entry to be predicted in the current palette.

According to first embodiments to obtain the palette predictor, blocks of pixels of the image are processed according to a predefined scanning order as described above with reference to FIG. 5 where the CUs of a CTB are coded/decoded according to a scan order. The palette predictor for the current block of pixels is then selected from a set of palettes used to predict previously processed blocks of pixels. Preferably, the palette predictor for the current block of pixels is a palette used for the last processed block of pixels. This may be implemented by storing the last used decoding palette (for the last processed coding unit) in memory. Of course another palette from among the already used palettes may be selected as a palette predictor, in which case an identifier of such selected palette should be provided to the decoder.

According to the scan order used, it is generally observed that the last used palette, and thus the palette predictor, is one of the palettes used for previously processed coding units that are contiguous with the current coding unit. This ensures high redundancy between the coding units is taken into account to obtain an efficient coding. For example, based on FIG. 5, the palette predictor can be one of the palettes used to process the left or above coding units 15, 17, 12 and 13.

To avoid poor palette prediction due to a palette predictor which has content far from the actual content of the current coding unit, specific embodiments provide a reset of the last used palette (or of the set of previously used palettes). Such reset may occur at each new CTB, i.e. when the current coding unit starts a new coding entity made of blocks of pixels, or at each new line or row of CTBs as introduced above, or even at each new frame.

Such reset also makes it possible for the encoder or the decoder to estimate the palette mode for each CTB (or row of CTBs or frame) in parallel. However, since some correlations often exist between the coding units of 2 CTBs, the reset is preferably performed for each new row of CTBs.

This is illustrated using FIG. 14a which shows a frame with several CTBs (each represented by a square). The CTBs on the left in thick lines are the CTBs for which the last used Palette is reset because each of them starts a new line of CTBs.

The reset at the first CTB of a line is a more efficient approach than the reset at Frame level. This is because the CTBs are encoded in a horizontal raster scan order, and thus for the first CTB of a line of CTBs, the last used palette is potentially predicted from a spatially far CTB (the last one of the CTB line just above). Given the spatial distance between the CTBs, the correlation between them is very low and thus a dependency (prediction) between their respective palettes is not worthwhile.

The reset of the last used palette may mean that no palette is available as a palette predictor to possibly predict a current palette. In that case, the current palette, e.g. the palette of the very first coding unit processed in the first CTB of the line, cannot be predicted. This reset may be performed by setting the Previous_Palette_size variable (storing the size of the last used palette) to 0.

In addition, the reset of the last used palette also increases the global coding cost of the palette mode in a substantial way since no value can be predicted, thereby biasing towards smaller palette sizes and therefore smaller and less efficient palette predictors. This is because new elements in the block can be reused by other blocks, therefore actually mutualizing the bits spent for the first block. A typical solution would be using dynamic programming algorithms such as Viterbi, where the coding decision for a block is selected only after a few blocks have been encoded. This is however prohibitively complex and simpler solutions are preferred.

Such increase of the coding cost may thus cause the coding mode selector (see step 106) to select it more rarely and not immediately after the reset (thus with delay). However, it is worth having the palette mode selected for coding the coding units. For this purpose, embodiments provide to boost the probability that the palette mode is selected by cheating on the bit coding cost of the first coding of a coding unit after the reset occurred (i.e. with an empty or default palette predictor). This is to have a bit coding cost lower than it should be, thereby increasing the probability that the palette mode is selected.

False information on the bits used for coding may be provided to artificially obtain this lowering of the bit coding costs. This false or cheating information or "bonus" for a color component may depend on the operating point of the codec (i.e. how much distortion improvement a bit should bring), on the chroma format, on the at least one color component concerned and/or the number of elements in the palette for the current coding unit.

For instance, the case may be considered of a palette of RGB or YUV elements, each component R/G/B/Y/U/V having e.g. 8 bits components. Therefore, the bit cost resulting from the coding of one entry of the palette used for the first coding unit after palette reset is normally 3×8=24 bits. However, in the embodiments discussed here, a bonus may be applied to correct this bit cost, for example by artificially decreasing it to only 8 bits. The palette mode is thus more likely to be selected at step 106.

In particular embodiments where two or more levels are needed to represent a pixel (e.g. one level for the component Y and one level for the pair of components U and V), two or more palettes are actually used to code a block of pixels. A bonus may be applied to each of the two or more palettes. For example, if two palettes, one for component Y and the other for component U+V, are provided, a bonus may consist in modifying the bit cost of one Y element from 8 bits to 4 bits and the bit cost of one U+V element from 16 bits to 6 bits.

As it may be worth predicting the palette for the coding unit first processed, a variant includes replacing the last used palette by a by-default palette, so that the by-default palette is used as a palette predictor for the first coding unit of the line of CTBs. Various ways to generate a by-default palette (both the encoder and the decoder operate in the same way) may be considered. As an example, the by-default palette may include a set of predetermined entries corresponding to colour values equally distributed over a colour space. The equidistribution may concern the three colour components. However, in a preferred embodiment, the colour values may be equally distributed over the Y component. And the U and V component values are fixed, for example at the median value of the U or V components in the colour space. The U and V values may be directly computed from the bit-depth of the components, by assigning the value bit-depth/2 or bit-depth>>1, where '>>' is the right shift operator. An example of the distribution along the Y component is the following formula: YLevel=(Level*bit-depth)/Previous_Palette_size, where Level corresponds to the entry index of the by-default table as explained above (and thus is incremented by one at each new value Y), bit-depth is the bit-depth of the Y component. Note that the Previous_Palette_size may be equal to the last used palette, or to an average Palette_size computed from the last decoded CTB or line of CTBs or frame, or to a predefined number such as 4.

According to other embodiments to obtain the palette predictor, reference palette predictors are associated with respective coding entities of coding units that form the image, such as CTBs, lines of CTBs, slices, slice segment, tile, frame or sequence. And the palette predictor for the current block of pixels is the reference palette predictor associated with the coding entity that includes the current block of pixels. These embodiments may require the reference palette predictor to be transmitted in the bitstream for each coding entity.

Figure 15:
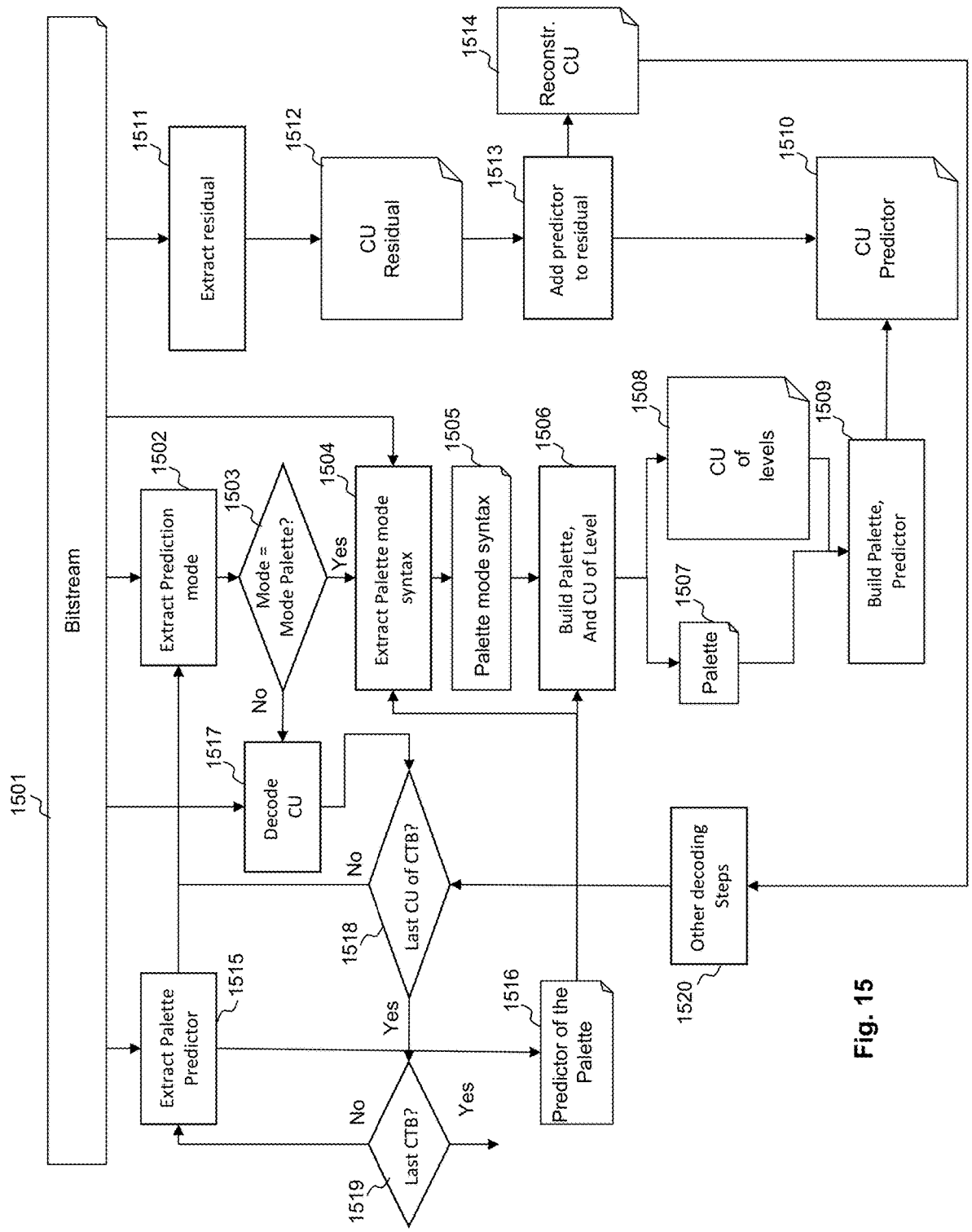
FIG. 15 illustrates the decoding process based on reference palette predictors transmitted in the bitstream according to embodiments of the invention.

FIG. 15 illustrates the decoding process based on reference palette predictors transmitted in the bitstream. This Figure is based on FIG. 14 and thus blocks 1501 to 1514 are similar to blocks 1401 to 1414, except that the module 1506 builds the palette using the reference palette predictor 1516 decoded from the bitstream. Of course, a corresponding process is performed at the encoder to include the reference palette predictor in the bitstream.

At the beginning of the CTB decoding (or CTB line, Slice, Frame, etc. decoding), the reference palette predictor 1516 is extracted from the bitstream at step 1515. Note that the use of the reference palette predictor may lead to having no palette provided in the bitstream for any coding unit of the current coding entity CTB. In this case one flag may be provided in the bitstream and thus be extracted therefrom in order to signal not to decode any palette for the coding units. In a variant, this flag may be replaced by using the value 0 for the Palette_size to indicate the decoder that no palette is to be decoded for the current coding unit. This variant requires that the Palette_size be equal to decodedSize instead of decodedSize+1 in step 1003 above. To save any bit used for signaling the use of the reference palette predictor, the reference palette predictor can be transmitted at the end of the CTB if at least one CU of the current CTB is coded using the Palette coding mode.

In any case, the reference palette predictor is extracted and decoded if needed to decode one of the coding units of the current CTB. Module 1502 extracts the prediction mode. If it is not the Palette mode (test 1503), the decoder decodes the CU with the corresponding mode 1517. Otherwise (the palette mode), the palette for the current coding unit is decoded as in FIG. 7. However, the building 1506 of the palette 1507 in this embodiment depends on the reference palette predictor 1516. Examples of this dependency and of corresponding syntax elements 1505 are described below.

When the coding unit is decoded (1517, 1520) as described above for FIGS. 7 and 13, the decoder checks whether or not it was the last coding unit of the CTB at step 1518. Note that this figure does not contain the full syntax decoding of a CTB which may involve other syntax elements. If it was not the last coding unit, the prediction mode for the next CU is extracted at step 1502. If it was the last coding unit, the remaining processes to entirely decode the CTB are performed (not shown) and the decoder checks whether or not it was the last CTB of the frame at step 1519. If it was not the last CTB, the reference palette predictor for the next CTB is extracted from the bitstream at step 1515 described above. Of course, this figure is not complete and several decoding steps that do not concern the present invention have been omitted.

As described, the reference palette predictor transmitted is used as the predictor of the palette used for each coding unit CU in the current CTB. As described below, the reference palette predictor can be used to predict elements of the palette or, in a variant, the reference palette predictor can be used as the palette for the current coding unit. In that case, the reference palette predictor 1516 is directly transmitted to module 1509 thereby causing module 1507 to be no longer required.

The selection of the reference palette predictor at the encoder may contribute to coding efficiency. Several algorithms can be used to determine the "best" reference palette predictor. For example, the palette used to predict the largest coding unit in the current CTB can be selected as the reference palette predictor for the CTB. In another example, the palette that minimizes a rate-distortion criterion from the palettes used to predict all the coding units composing the current CTB may be determined and used as the reference palette predictor for the CTB. Of course, other selection criteria may be used.

According to yet other embodiments to obtain the palette predictor, the palette predictor for the current coding unit includes entries corresponding to values of pixels neighbouring the current coding unit. In these embodiments, the palette predictor for the current CU is extracted from the neighboring pixels as shown by way of example in FIG. 16.

In this example, the selected pixels are pixels contiguous with the upper and left sides of the current block of pixels, because they belong to the causal area as defined above with reference to FIG. 3. These contiguous pixels are shown in grey color in the Figure. In particular, the selected pixels are a fixed number, for example the same three pixels (dark grey pixels 1601 to 1603 in the Figure) as those used for INTRA prediction mode, namely the pixels that are, relative to the contiguous current coding unit, top-left, top-right and bottom-left. Of course, another number of pixels may be considered. Preferably the relevant pixels to select are known by both the encoder and the decoder so that no additional signalling information is needed. However, some embodiments may envisage selecting specific pixels at the encoder and then signalling, in the bitstream, the number of selected pixels and those selected pixels.

In one embodiment, a restricted set of neighbouring pixels is considered. For example, this set of pixels is selected in order that the pixels have the highest spatial distance. This creates diversity and avoids duplicate pixels.

Figures 16, 17:
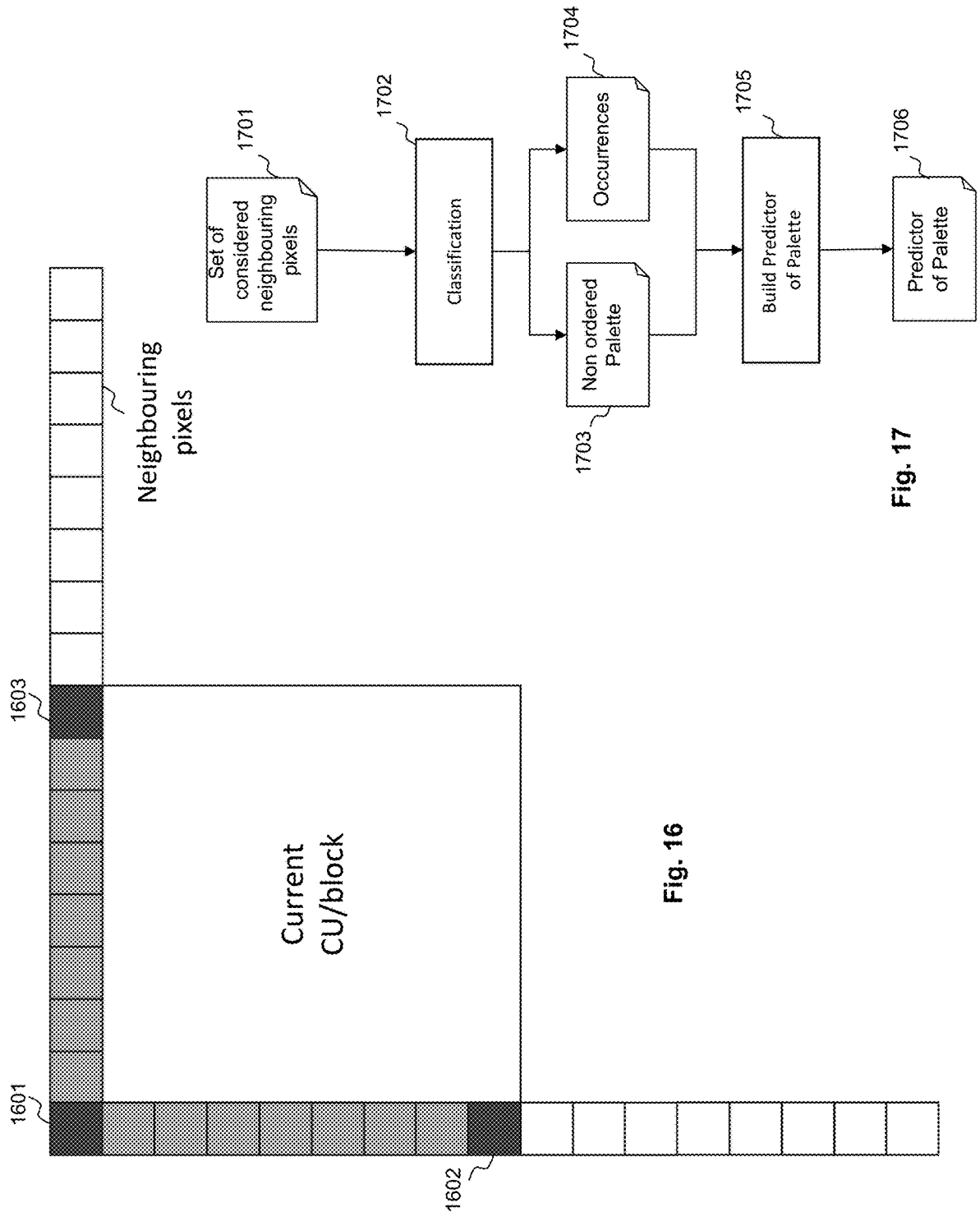
FIG. 16 illustrates the current coding unit with neighboring pixels used as predictors in embodiments of the invention.
FIG. 17 illustrates the generation of the palette predictor for the current coding unit, based on the neighbouring pixels according to embodiments of the invention.

FIG. 17 illustrates the generation of the palette predictor for the current coding unit, based on the neighbouring pixels. As noted above, the order of the elements in the palette predictor is important. This requires the definition of classes for the palette elements (here neighbouring pixels). This determination process can be performed at both the encoder and the decoder.

In one embodiment, the neighbouring pixels 1701 are classified 1702. Note that the neighbouring pixels may include pixels that are not directly contiguous with the current coding unit. Each neighboring pixel of the considered set of neighbouring pixels is associated with a class (so with an entry index) depending on its colour distance from already existing entries in the palette predictor, for example using the criteria of step 1207 in FIG. 12. In an embodiment, the classes are defined by the three pixels 1601 to 1603 shown in FIG. 16. This results in a non-ordered palette predictor 1703. In addition, during the classification 1702, the occurrences 1704 of each class are counted.

Based on the non-ordered palette predictor 1703 and the occurrences 1704, the palette predictor 1706 with ordered entries is built at step 1705, for example having the most frequent entries first. Note that the entries having insignificant occurrences (for example below a threshold) may be discarded from the palette predictor.

In an embodiment, two pixels of the same class have exactly the same pixel value (the criterion used for classification thus does not involve absolute value and requires a threshold TH set to zero). Note that in the images targeted by HEVC RExt (and thus by the Palette mode) which include text or screenshots, there are few different values in contiguous coding units. Classifying the pixels based on an identity of pixel values is thus relevant.

FIG. 18 illustrates an example of classification. 1801 show the current coding unit with contiguous pixels which have either a first pixel value (represented by class '1'), or a second pixel value (represented by class '2') or a third pixel value (represented by class '3'). The set of neighboring pixels is represented with its related classes in table 1802. Table 1802 gives the occurrences associated with each class. The palette predictor that is built from table 1802 is shown in table 1803, by ordering the classes according to their occurrences and removing non-significant predictor entries (here entry corresponding to class '1' due to its low number of occurrences, namely 2 in the example). To remove a predictor entry, the algorithm can take into account the number of neighbouring pixels, the number of classes and/or the occurrences of the most probable neighbouring pixels.

According to yet other embodiments to obtain the palette predictor, the current palette has ordered entries, and predicting the current palette using the palette predictor comprises predicting an entry of the current palette from a preceding entry of the same current palette. In other words, the palette predictor when processing a given entry of the palette is made of (includes) the entries that are prior to the given entry in the colour palette currently being built. The current palette is thus intra predicted.

Figure 22:
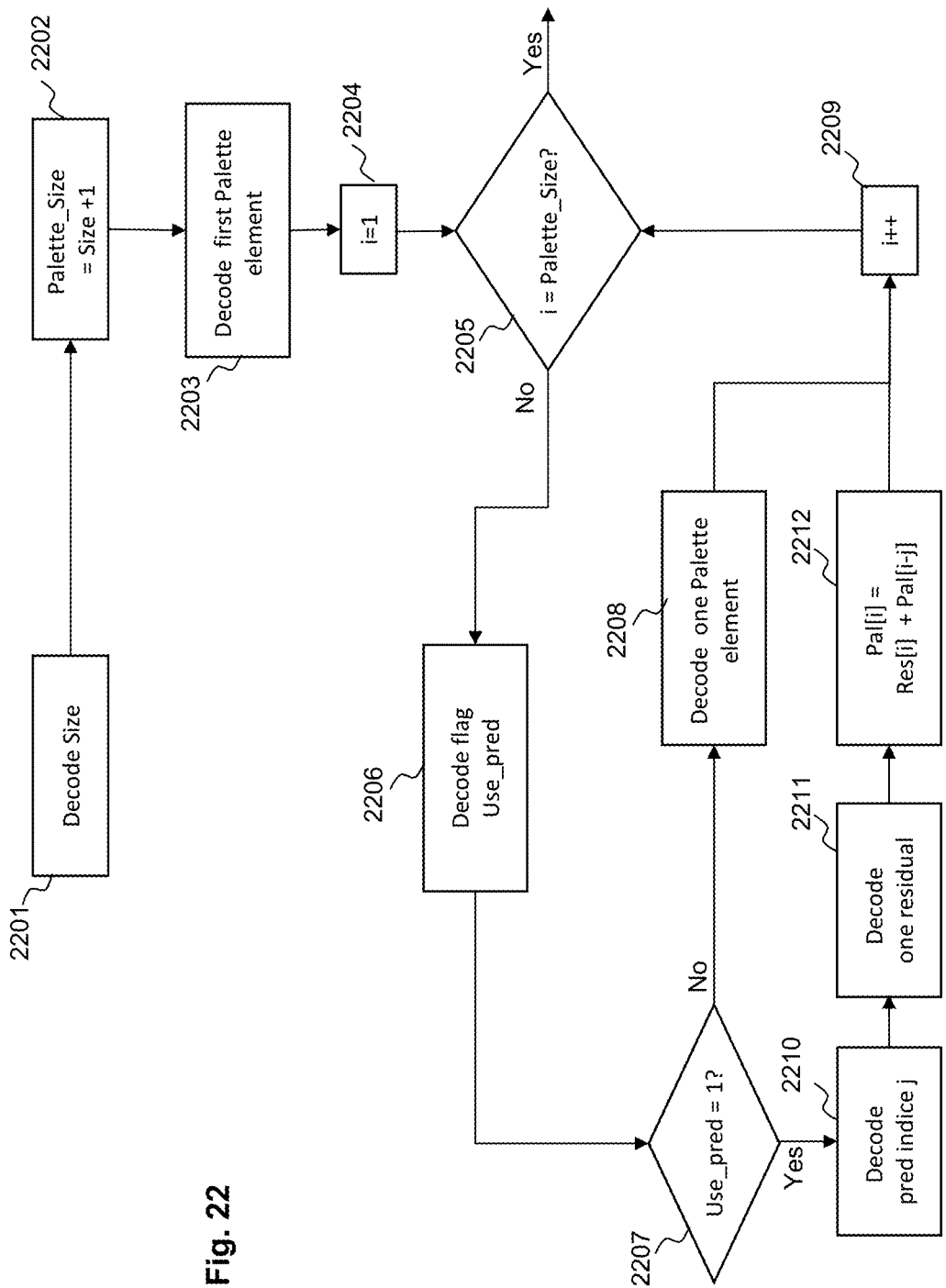
FIG. 22 illustrates the intra prediction of the palette according to embodiments of the invention.

This is illustrated by FIG. 22 which shows the decoding process to obtain the predicted palette based on signaling in the bitstream when appropriate. FIG. 22 only reproduces the part corresponding to the top left part of FIG. 10, i.e. the generation of the predicted palette. The remainder of FIG. 10 thus has to be performed to obtain the syntax elements defining the block predictor 91.

As shown, the Palette_size is decoded and computed at steps 2201 and 2202. Next, the first palette element is decoded. As the palette is intra predicted, the first palette element is not predicted and thus is directly decoded from the bitstream. Then the variable i provided to successively consider each palette entry is set equal to 1 at step 2204. The other palette elements are decoded through the next steps. In particular, for each palette element, a flag, namely Use_Pred, is decoded at step 2206 to determine whether or not (test 2207) the palette element at index i uses intra prediction or not. If it does not use Intra prediction, the palette element is decoded directly from the bitstream at step 2208. Otherwise, index j corresponding to the index of the palette element predictor in the current palette is decoded from the bitstream at step 2210. Note that the encoder may have coded index j relatively to index i in order to save bits, in which case the decoder operates in the reverse way. Then the residual is decoded at step 2211 and the palette element Pal[i] is set equal to Res[i]+Pal[j] and added to the palette at step 2212. Then the index i is incremented by one at step 2209 to consider the next palette element. Once all the palette elements have been decoded (test 2205), the process continues at step 1008 of FIG. 10.

In one embodiment, the element predictor of the palette element i is the palette element i−1, i.e. the palette entry directly preceding the current palette element in the current palette. In such case, module 2210 can be omitted, and the palette element Pal[i] is set equal to Res[i]+Pal[i−1] when it is predicted. In one embodiment, all the palette entries, except the first one, are predicted from the palette element directly preceding them in the current palette. In such case, the Use_pred flag may be omitted since the decoder knows how to obtain/decode the palette elements using intra prediction. This means that modules 2206 and 2208 can be omitted.

To improve the coding efficiency of the intra prediction of the palette element, the palette element may be ordered according to their values and not to their occurrences at the encoder.

According to yet other embodiments, the current palette is predicted from entries of two or more palettes. This means that a palette predictor could be built from two or more palettes. In particular, the two or more palettes may be partly or entirely merged to form a new palette predictor for the current palette.

This is because the prediction mechanisms as introduced above may rely on a single palette selected, as palette predictor, from e.g. a set of palettes used to predict previously processed blocks of pixels. This may impact the quality of the palette predictor. For example, if among successive blocks of pixels B1, B2 and B3, blocks B1 and B3 are each made of a lot of different pixels but B2 is made of few different pixels, the fact of using the directly previous palette as a palette predictor for the next palette leads to using the palette of B2 (which has few palette elements) as a palette predictor for B3. But this would drastically reduce the number of elements in the palette predictor for B3 and thus the ability to efficiently predict the palette for B3.

The inventors have found it is worth combining two or more palettes to build a new palette to process a new block of pixels.

Figure 24:
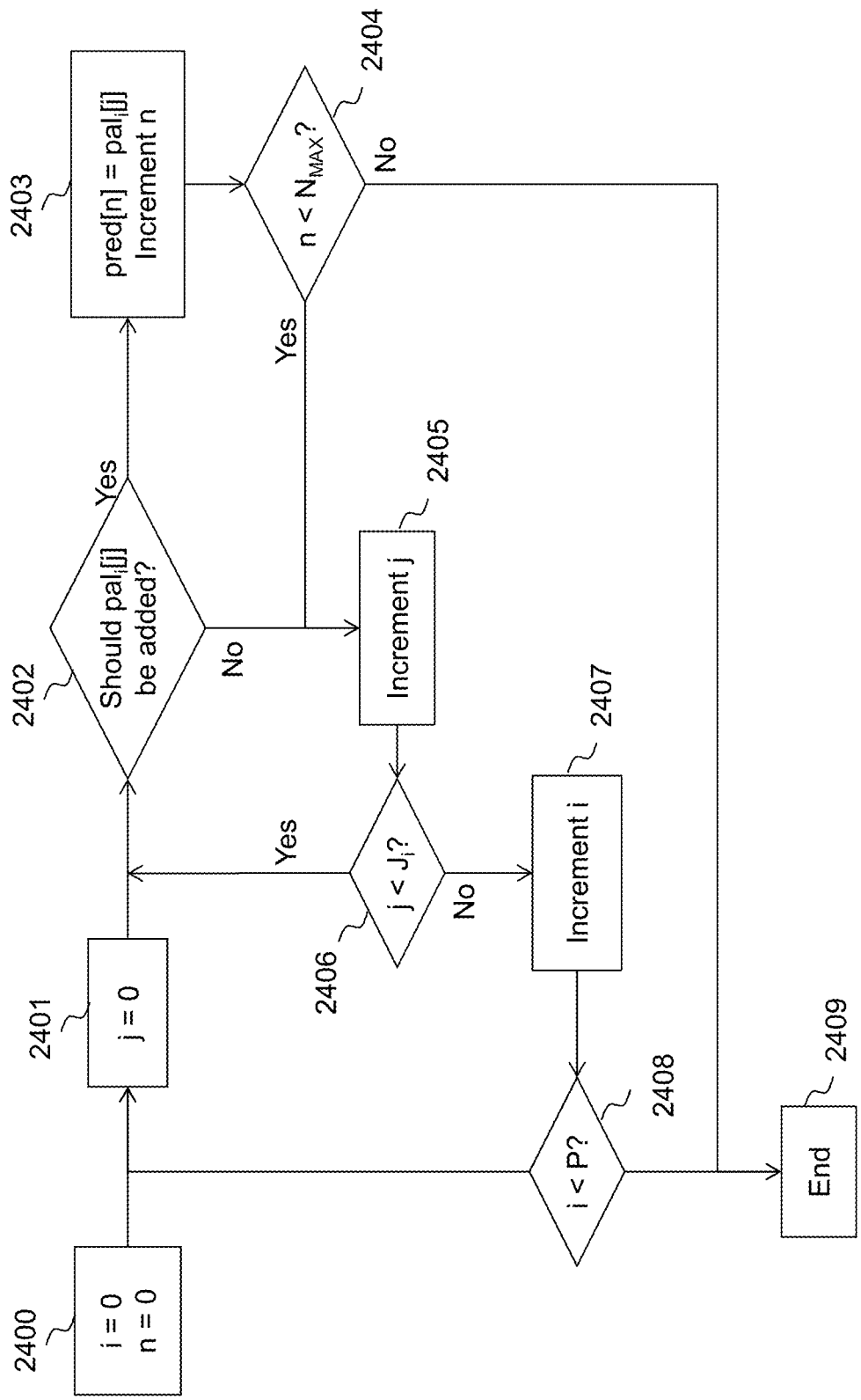
FIG. 24 is a flowchart illustrating general steps for building a palette predictor from two or more palettes already existing, according to some embodiments of the invention.

FIG. 24 is a flowchart illustrating general steps for building a palette predictor from two or more palettes already existing. The existing palettes may include all or part of the current palette, last palette predictors (including reference palette predictors), spatially or temporally neighboring palettes, and a by-default palette (e.g. containing by-default palette elements such as the one whose components are all 0).

In the process of FIG. 24, P represents the number of already existing palettes taken into account; $pal_0, \ldots, pal_{P-1}$ are the corresponding palettes; "pred" is the palette predictor as formed by the process, with $N_{MAX}$ its maximum number of palette elements; $J_k$, $k \in [0;P]$ is the number of elements in palette $pal_k$; "i" is a variable representing a palette counter to successively consider each of the P palettes $pal_0, \ldots, pal_{P-1}$; "n" is a variable representing the current number of palette elements in the palette predictor "pred" being built; and "j" is a variable representing a palette element counter to successively consider each palette element of the current palette $pal_i$.

The palettes $pal_0, \ldots, pal_{P-1}$ may be ordered for example to first process the most recent palettes, e.g. with low indexes. This is to add more recent elements as close as possible to the beginning in the palette predictor.

The process starts at step 2400 by initializing the first palette to consider ("i"=0) and the current predictor element in the palette predictor "pred" to be built ("n"=0). The process then enters the loops to successively consider each palette $pal_i$.

At step 2401, the palette element counter "j" is initialized at 0 to consider the first palette element of the current palette $pal_i$.

At step 2402, it is checked whether or not the current palette element $pal_i[j]$ of the current palette $pal_i$ satisfies a particular criterion to trigger or not addition of this palette element to the palette predictor "pred".

The triggering criterion may simply rely on comparing $pal_i[j]$ to the elements already added in the palette predictor "pred" (i.e. pred[0] . . . pred[n−1]) to decide the addition of the current palette element to "pred" if $pal_i[j]$ is different from pred[0] . . . pred[n−1], and to decide not to add the current palette element to "pred" if $pal_i[j]$ is the same as one element of "pred". Note that the comparison between two elements $pal_i[j]$ and pred[k] may be a strict comparison or strict similarity (strict equality between their components) or a loosen comparison/similarity (the differences between corresponding components of the elements are below respective thresholds). In a variant, only a specific amount of the n elements pred[k] may be involved in the comparison, the exact amount depending on the value of "n". This is because the number of comparisons may quickly increase. This, using for example n/2 or at most 4 elements involved in the comparison may be a good trade-off between coding efficiency and complexity.

However other triggering criteria may be involved such as a bitmap of Use_pred flags as described below with reference to FIGS. 19 to 21. These Use_pred flags are generated by an encoder to signal which values can be reused as a value in the current palette, e.g. by comparing one by one each of the palette entries with the palette predictor entries. In particular, this approach advantageously makes it possible not to transmit explicitly or not to duplicate palette elements. The number of flags depends on the sizes of the palette predictor and how the elements are signaled.

The outcome of step 2402 is that a decision is taken as to add or not the current palette element $pal_i[j]$ to the palette predictor "pred".

If decision is taken not to add it, the process goes to step 2405.

If decision is taken to add it, the process goes to step 2403 where the current predictor element pred[n] is set to the current palette element pal$_i$[j]. The next predictor element in "pred" is next selected by incrementing "n".

Next, step 2404 consists in checking whether or not a maximum number of predictor elements of "pred" have been determined. If they have not been, the process goes to step 2405. Otherwise, the palette predictor "pred" is fully determined and the process ends at step 2409.

At step 2405, the next element in the current palette pal$_i$ is selected by incrementing the palette element counter "j".

At step 2406, it is checked whether or not all the palette elements of the current palette pal$_i$ have been considered and processed: j<J$_i$. If not, the process loops back to step 2402 to process the next palette element pal$_i$[j]. If the whole current palette pal$_i$ has been processed, the process goes to step 2407, where the palette counter "i" is incremented to consider the next palette, if all the palettes pal$_0$, . . . , pal$_{P-1}$ have not yet been processed (check at step 2408).

If all the palettes pal$_0$, . . . , pal$_{P-1}$ have been processed, the process ends at step 2409.

Note that the above various embodiments to obtain the palette predictor may be partly or all combined to provide several basis for predicting all or some of the palette elements.

Figure 19:
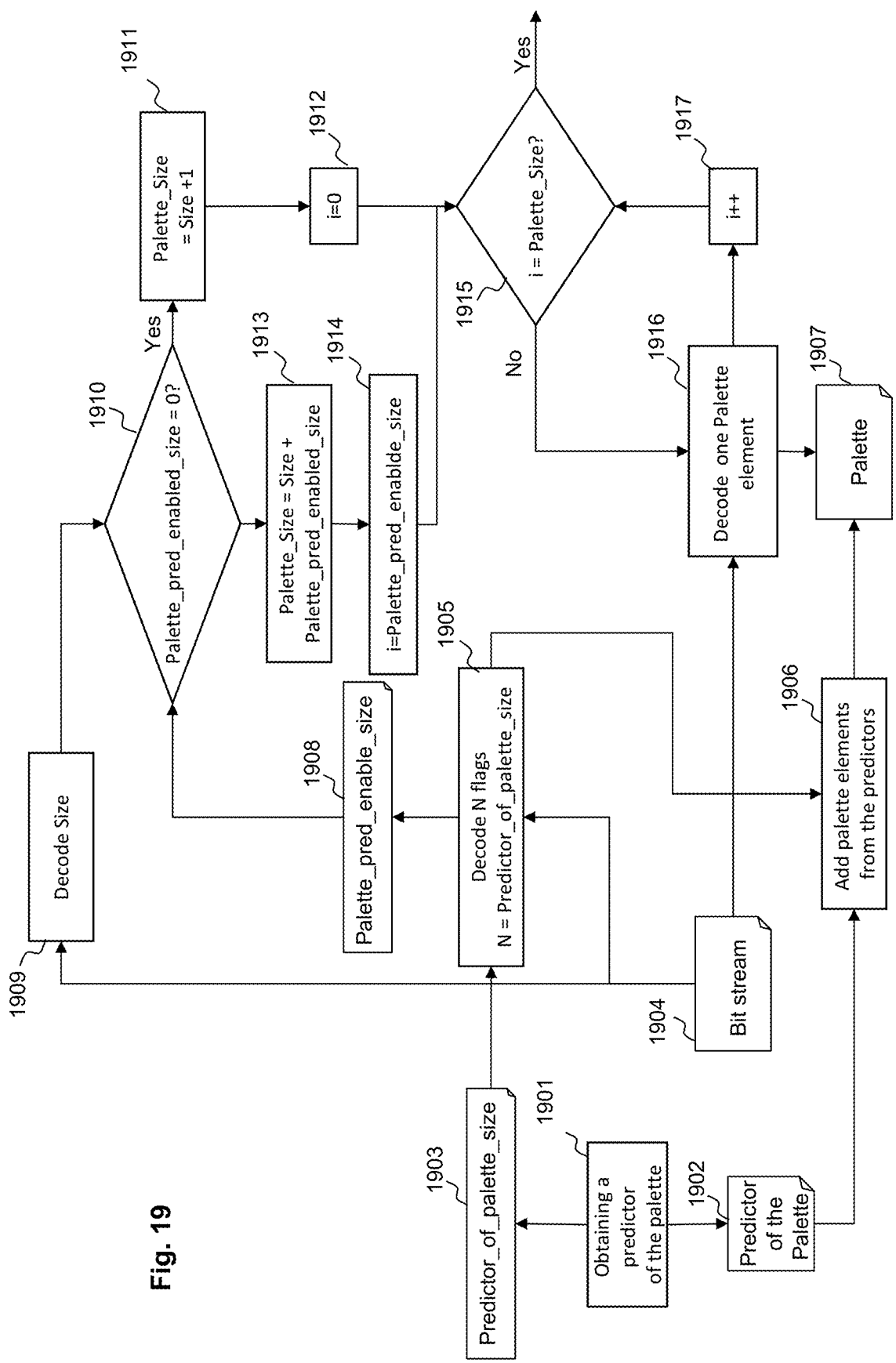
FIG. 19 illustrates the decoding of the palette syntax based on a bitmap of flags according to embodiments of the invention.
Figure 21:
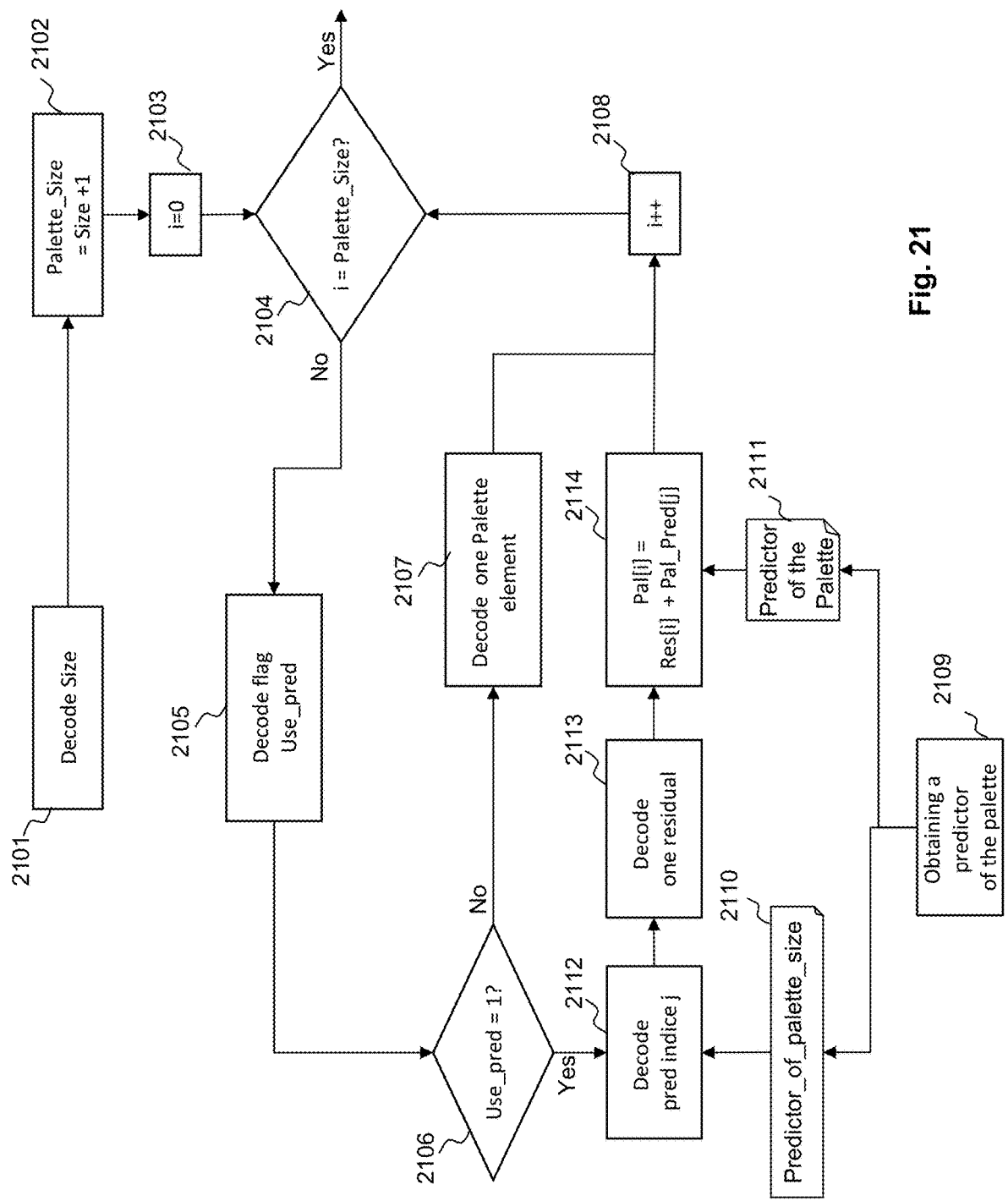
FIG. 21 illustrates a decoding process based on having residuals between palette elements and element predictors according to embodiments of the invention.

Turning now to the the syntax elements to actually describe the palette prediction to the decoder, reference is now made to FIGS. 19 to 21, although FIG. 22 described above already introduces a mechanism to define the palette prediction. The palette predictor is considered to be retrieved and its size (Predictor_of_palette_size) is known.

According to embodiments concerning the syntax elements, predicting the current palette using the palette predictor comprises obtaining a bitmap of flags, each of which defining whether or not a corresponding entry in the palette predictor is selected as an entry of the current palette. As a result, in addition to information making it possible for the decoder to retrieve the appropriate palette predictor, only the bitmap needs to be sent to the decoder. This bitmap may be sent in replacement of the palette as defined in HEVC RExt for the current coding unit.

The syntax of the bitmap contains M flags, M being equal to the number of elements in the palette predictor. The ith decoded flag defines whether or not the element i from the palette predictor is used to fill (predict) the current palette for the current coding unit. In a variant, the bitmap may be restricted to a lower number of flags from a flag corresponding to the first element in the palette predictor to a flag corresponding to the last element that has to be used as an element predictor. The size of the bitmap is specified in the bitstream in a similar fashion to that in which the palette size is specified in HEVC RExt bitstream.

For example, the elements of the palette predictor that are associated with a flag (bit) equal to 1 are copied in the current palette at the first available position, keeping their order.

In another embodiment, additional entries are added at the end of the current palette having the selected entries from the palette predictor. For example, first the bitmap is decoded from the bitstream and the corresponding entries of the palette predictor are copied into the current palette, then additional pixels may be added at the end of the current palette in the same way as the conventional palette transmission.

In one embodiment seeking to provide the predicted palette element as additional palette element, the determining of the Palette_size is adapted to be increased by the number of predicted palette elements: to do so, the Palette_size is set equal to the decoded size+the number of flags set equal to 1 in the bitmap (Palette_pred_enable_size). If Palette_pred_enabled_size is equal to 0, the Palette_size is set equal to the decoded size+1 as described in step 1003.

FIG. 19 illustrates the decoding of the palette syntax of these embodiments based on the bitmap of flags. As for FIG. 22, FIG. 19 is based on FIG. 10 but only the part relating to the palette decoding is shown.

First, the palette predictor 1902 is obtained at step 1901 according to any of the embodiments described above. In addition, the Predictor_of_palette_size 1903 is also obtained. Module 1905 decodes N flags from the bitstream 1904, where N=Predictor_of_palette_size.

For each flag equal to 1, the corresponding element from the palette predictor is added to the current palette 1907 at the first available index, during step 1906. Palette_pred_enabled_size 1908 representing the number of flags equal to 1 in the bitmap is transmitted to decision module 1910. The size of the remainder of the palette is also decoded from the bitstream 1909. Decision module 1910 determines whether or not Palette_pred_enabled_size is equal to 0. If it is equal to 0 meaning that there is no predicted palette element in the current palette, the Palette_size is set equal to the decoded Size+1 at step 1911, and the variable i used to successively consider each entry of the current palette is set equal to 0 at step 1912. If Palette_pred_enabled_size is different from 0 meaning that there is at least one predicted palette element in the current palette, the Palette_size is set equal to the decoded Size+Palette_pred_enabled_size at step 1913, and the variable i is set equal to Palette_pred_enabled_size. Next, the decoding loop of palette elements is performed through steps 1915, 1916 and 1917 corresponding to steps 1005, 1006 and 1007 of FIG. 10. This loop stops when the variable i is equal to the Palette_size. The decoded Palette elements 1916 are added at the end of the current Palette 1907, i.e. after the predicted palette elements. In one embodiment, Palette_size is always set equal to the decoded Size+Palette_pred_enabled_size at step 1913 to simplify the implementation so that modules 1910, 1911 and 1912 can be omitted.

Note that the values "0" and "1" for the flags may be inverted, meaning that flag=1 is used when the corresponding element in the palette predictor is not used to predict an element of the palette under construction (the reverse for flag=0).

This inversion of the meaning of the values of the flags is useful to prevent a phenomenon called "start code emulation": if a series of bytes matches what is called a start code, the series must be transformed to make it no longer matching the start code and to have a unique start code, through an expansion process increasing the size of the bitstream. By using 1 instead of 0, this size increase is avoided.

FIG. 20 illustrates the process of FIG. 19 with an example. The palette predictor obtained using any of the embodiments described above with reference to FIGS. 14 to 18 is table 2001 which contains five elements associating an index or level with colour values. The decoded flags of the bitmap are represented in table 2002. In this example, two flags are set equal to 1: one for level 0 and one for level 2 of the palette predictor. The corresponding palette elements are thus added to the current palette 2003 with the first level available, respectively level 0 and level 1. Then new palette entries may be decoded from the bitstream as proposed in HEVC RExt and added to the position 2 and 3.

One may note that when the palette predictor is transmitted, only the flags (bitmap) corresponding to the palette predictors is needed. To reduce signaling, the same bitmap may be used for all the coding units belonging to the same CTB, slice, tile, slice segment, frame or sequence for which a single reference palette predictor is transmitted.

The bitmap of Use_pred flags has been defined in the above description referring to FIGS. 19 and 20. Reference is now made back to FIG. 24, and more specifically to step 2402, where a triggering criterion to authorize addition of a current palette element pal,[j] to the palette predictor "pred" under construction is used. As introduced above, this triggering criterion may involve the bitmap of Use_pred flags.

In some embodiments, the palette predictor under construction includes entries from a first palette which has been predicted based on a second palette (used as predictor) using a bitmap of flags as described above, each flag of which defining whether or not a corresponding entry in the second palette is selected as an entry to predict an entry in the first palette. Particular to this embodiment is that the palette predictor is built by also including the entries of the second palette corresponding to a flag of the bitmap that defines no selection of the entry to predict the first palette.

Figure 25:
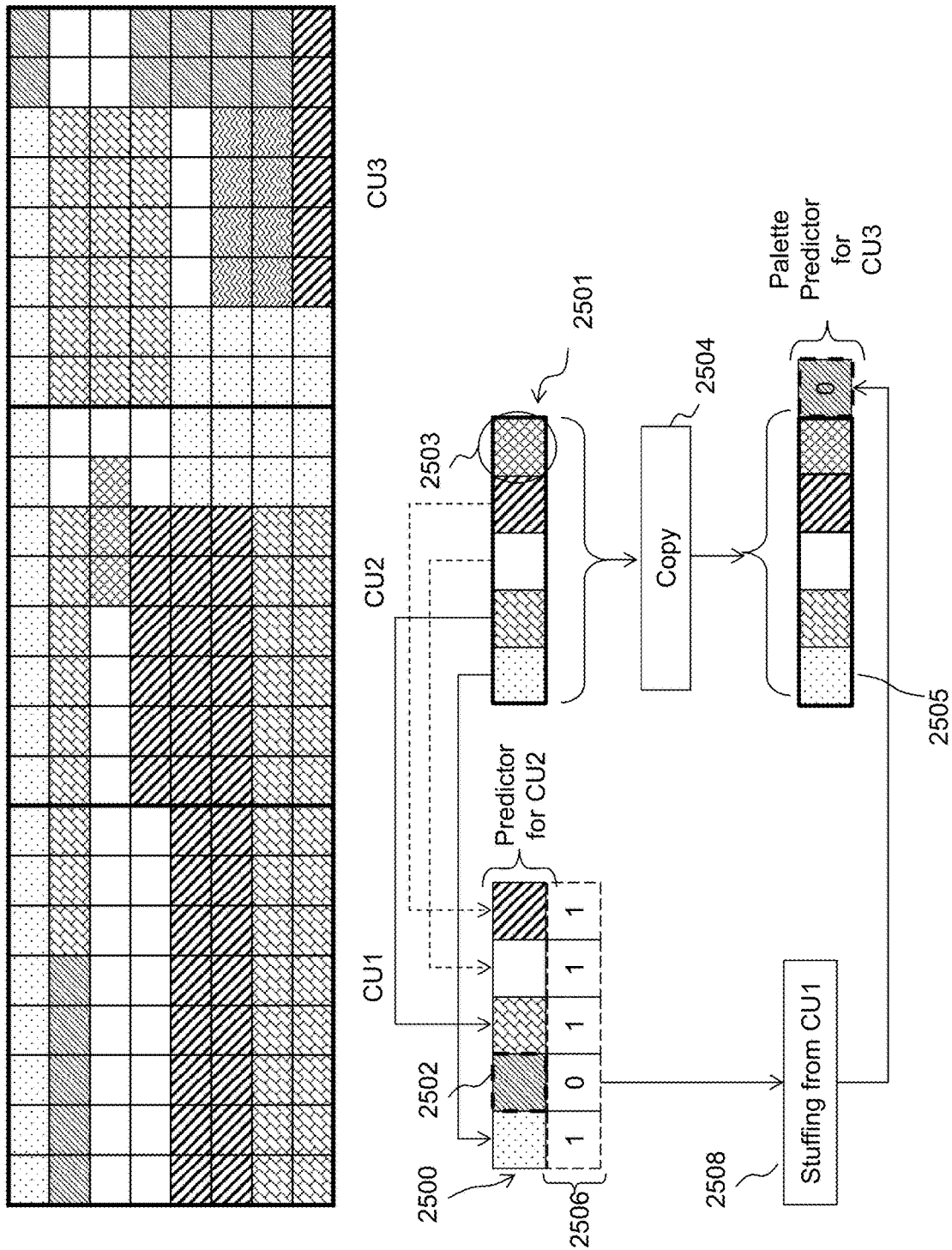
FIG. 25 illustrates an exemplary implementation of the approach of FIG. 24.

FIG. 25 illustrates an exemplary implementation of such approach.

Three Coding Units, CU1 to CU3, are shown that may be consecutive coding units being processed in a current image.

Reference 2500 represents the palette used to process (encode or decode) CU1. This palette may have been encoded in the bitstream (and thus retrieved by the decoder) or predicted using any mechanism described in the present application.

Using the predictor generation mechanism based on the last used palette as described above, this palette 2500 is used as a palette predictor for building the palette 2501 to process CU2. The prediction of palette 2501 is based on bitmap 2506 of Use_pred flags as described above. It is to be recalled that the flags take the value 1 or 0 depending of the use or not, respectively, of the corresponding element for predicting the palette of a next CU. In a variant, flag=1 may mean not selecting the corresponding element, while flag=0 may mean selecting the element for predicting the palette of the next CU.

As a result, in the present example, the first, third, fourth and fifth elements of palette predictor 2500 are copied into palette 2501 as defined in the bitmap 2506. The second element 2502 is not reused (flag=0 in bitmap 2506). Note that an additional palette element 2503 may have been added to the end of palette 2501 being built, based on the mechanisms described above (e.g. explicitly transmitted in the bitstream).

Also, palette 2501 is used as a palette predictor to build the palette to process CU3. In the example of the Figure, all the elements of palette 2501 are copied (step 2504) into the palette for CU3. In a variant to this example, a bitmap (not shown) may be provided to identify which elements of palette 2501 should be copied into the palette for CU3, similarly to the bitmap 2506 defining the elements to be copied into palette 2501.

Specific to this embodiment of the invention, palette predictor 2500 is also used as a predictor for building the palette to process CU3.

To achieve such building, a palette predictor 2505 is built from palettes 2500 and 2501. As mentioned above, all the elements of palette 2501 are copied (step 2504) into palette predictor 2505. In this example, the entries of palette predictor 2500 corresponding to a flag of the bitmap that defines no selection of the entry to predict palette 2501 (i.e. usually with flag=0, for example element 2502), are added (step 2508) to palette predictor 2505. This is because the other entries of palette predictor 2500 are already in palette predictor 2505 thanks to the copying step 2504. This selection of element 2502 can be performed very quickly thanks to the flags in bitmap 2506.

A bitmap may be provided to predict, based on palette predictor 2505, the palette to process CU3.

Of course, palette predictor 2505 may also be directly the palette to process CU3. However, palette predictor 2505 continuously grows as it includes all the elements defined in previous palettes. It grows up to a limit from which the elements of the palette predictor no longer fitting in it are not added to the predictor in spite of the value of their Use_pred flag.

The addition of element 2502 is preferably performed at the end of palette predictor 2505. One may directly observe that the resulting palette predictor is enriched compared to situations described above.

One particular advantage of adding the unused elements at the end of the palette predictor is that the elements are approximately ordered by their age and their level of use. This results in having the last elements in the palette predictor that are the least useful ones and the most likely to be removed. A decision can thus be taken to remove some elements from the palette predictor under construction, for example based on the number of uses of this element when processing to the last M (M integer to be defined) blocks of pixels using respective palettes that include this element.

Of course, this process can be adapted so as to put unused elements first in the palette predictor, or even interleaved with some of the elements from palette 2401.

Note that the selection of unused elements from a previous palette guarantees that the elements are unique, and therefore the Use_pred flags are not redundant. The palette predictor efficiency is thus maximized.

The above approach of the invention involving the building of a palette predictor from two or more palettes only impacts the palette predictor building step 1901 of FIG. 19.

Figure 26:
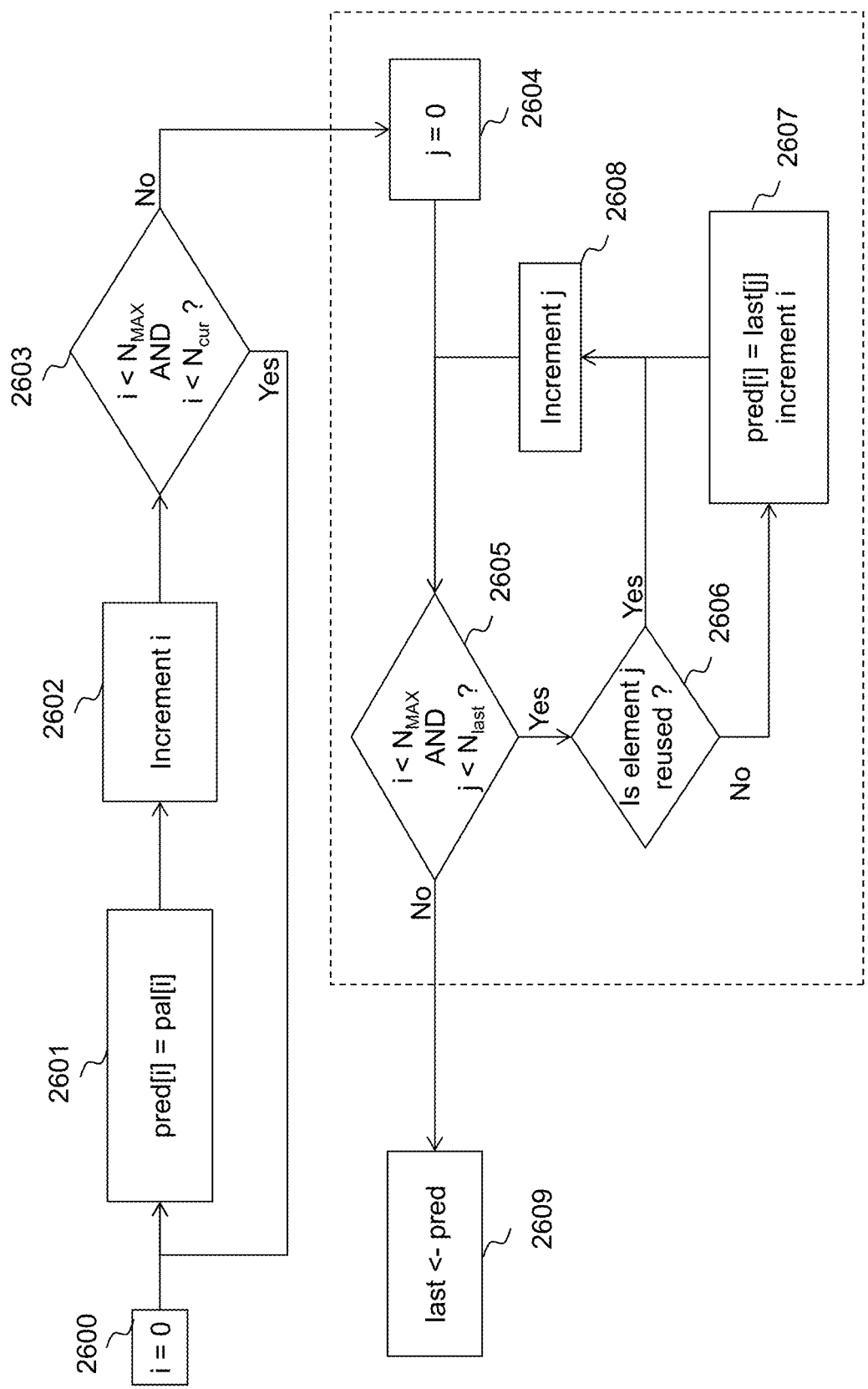
FIG. 26 illustrates an implementation of the process of FIG. 24.

FIG. 26 illustrates an embodiment of step 1901 to build a palette predictor, such as predictor 2505, with the above approach, which embodiment is more specific than the general steps described above with reference to FIG. 24. Such palette predictor 2505 is used to build the palette to process CU3, based on Use_pred flags of a corresponding bitmap (not shown).

To sum up this process with reference to the example of FIG. 25, it consists in copying the elements of CU2 palette 2501 represented by an array "pal" into an array of predictor elements "pred" (step 2504). "pred" is a temporary buffer used to copy the elements from the palette array "pal". At the end of the process, "pred" is the palette predictor.

In addition, the possible stuffing elements (such as 2502) are added to "pred", further to the already copied elements.

Structure "pred" contains a maximum of $N_{MAX}$ elements. $N_{MAX}$ ideally can be bigger than the maximum number of elements in a palette. A good compromise between coding efficiency and memory has been found with $N_{MAX}=64$, i.e. twice the maximum size of a palette in the example.

"pal" is a structure containing $N_{cur}$ elements, dedicated to storing the last palette used, i.e. palette 2501 in the example of FIG. 25.

"last" is a structure containing $N_{last}$ elements, dedicated to storing a previous palette or predictor, for example the palette predictor of the last used palette, i.e. palette predictor 2500 in the example of FIG. 25. Corresponding Use-pred flags are also stored in memory, for example in a so-called "Use_pred" array.

Note that "pal" is the last palette used while "last" is the palette predictor of this last palette used.

Step 2600 initializes the copy of "pal" into "pred": the first element of each structure is selected by setting the loop counter "i" to 0. Then the copy loop starts at step 2601: the current element of "pred" is set equal to the one of "pred". Then step 2602 makes it possible to select the next element of "pal" by incrementing the loop counter "i".

Step 2603 then checks whether or not the last element of either the palette predictor under construction "pred" or the palette "pal" has been reached (given $N_{MAX}$ for "pred" and $N_{cur}$ for "pal").

If the last element has not been reached, the process loops back to step 2601 to copy the next element. Otherwise, the process goes to step 2604.

The contribution of the other palette, here previous palette 2500, to the building of the palette predictor 2505 according to this embodiment of the invention results from the following steps 2604 to 2608.

These steps allow the stuffing operation referenced 2508 in FIG. 25. They provide additional elements to "pred" in addition to the elements resulting from the copy of the preceding palette "pal".

Step 2604 selects the first element of the previous palette "last" by initializing the loop counter "j" to 0.

Step 2605 then occurs where it is checked whether or not the last element of either "pred" or "last" has been reached.

If not, the process continues in step 2606. Otherwise, the process ends at step 2609.

Step 2606 consists in checking whether or not the current element "j" in "last" has already been reused. Like at step 2402 above, this may consist in checking whether the Use_pred flag associated with this element in the "Use_pred" array is set to 0 (not reused) or 1 (reused). In a variant, it may consist in verifying whether or not the current element already exists in "pred" being built.

If not reused, step 2607 occurs where the current element "j" is added from "last" to "pred" (at the end of "pred"). So the next element of "pred" is selected by incrementing "i".

In any case, the next element in "last" is selected by incrementing "j" at step 2608.

When all the elements of "last" or "pred" have been processed, the process ends at step 2609.

Note that for a next iteration of the process of FIG. 26, the structure "last" may be updated to store the palette predictor of the palette used for CU3 (which is about to be the last used palette), i.e. by receiving a copy of "pred" which stores the palette predictor 2505 for CU3. Note that the last used palette for the next iteration (when processing a new coding unit CU4) is the palette built for CU3 from palette predictor 2505. Therefore, this is the palette built for CU3 which has to be stored in "pal" for the next iteration.

As mentioned above, this embodiment provides a way to build each new palette predictor in such a way that the size of the palette predictor tends to continuously increase. Of course, the number $N_{MAX}$ provides a limit to the maximum size of the palette predictor. However, $N_{MAX}$ is usually selected quite large, often larger than the maximum size of the palettes.

It is to be recalled that a bitmap of Use_pred flags has to be provided to the client device to perform prediction of the new palette from the newly constructed palette predictor. The larger the value of $N_{MAX}$, the greater the number of extraneous Use_pred flags in the bitmap. This has a cost in transmission because each flag costs at least one bit.

A way to mitigate these extraneous costs, without additional techniques, is to compute $N_{MAX}$ as a combination of $N_{cur}$ and $N_{last}$. For example, $N_{MAX}$ may be defined as fact*$N_{last}$, where fact may depend on the color format and the component(s) affected. For instance, fact=6 for 4:4:4 color format, while fact=1 for luma and fact=2 for chroma in other formats.

However, this approach has been found not to be the optimal solution, in particular in the case of the embodiment of FIG. 26 where an optimal $N_{MAX}$ has been determined to be about 64.

An embodiment as proposed in FIG. 27 below provides a modified syntax for the bitmaps to decrease their size. In particular, the bitmap of flags includes at least one element at a predefined position in the bitmap for signalling whether or not the bitmap includes, after the predefined position, at least one additional flag that defines selection of an entry of the a palette predictor to predict another palette.

Figure 27:
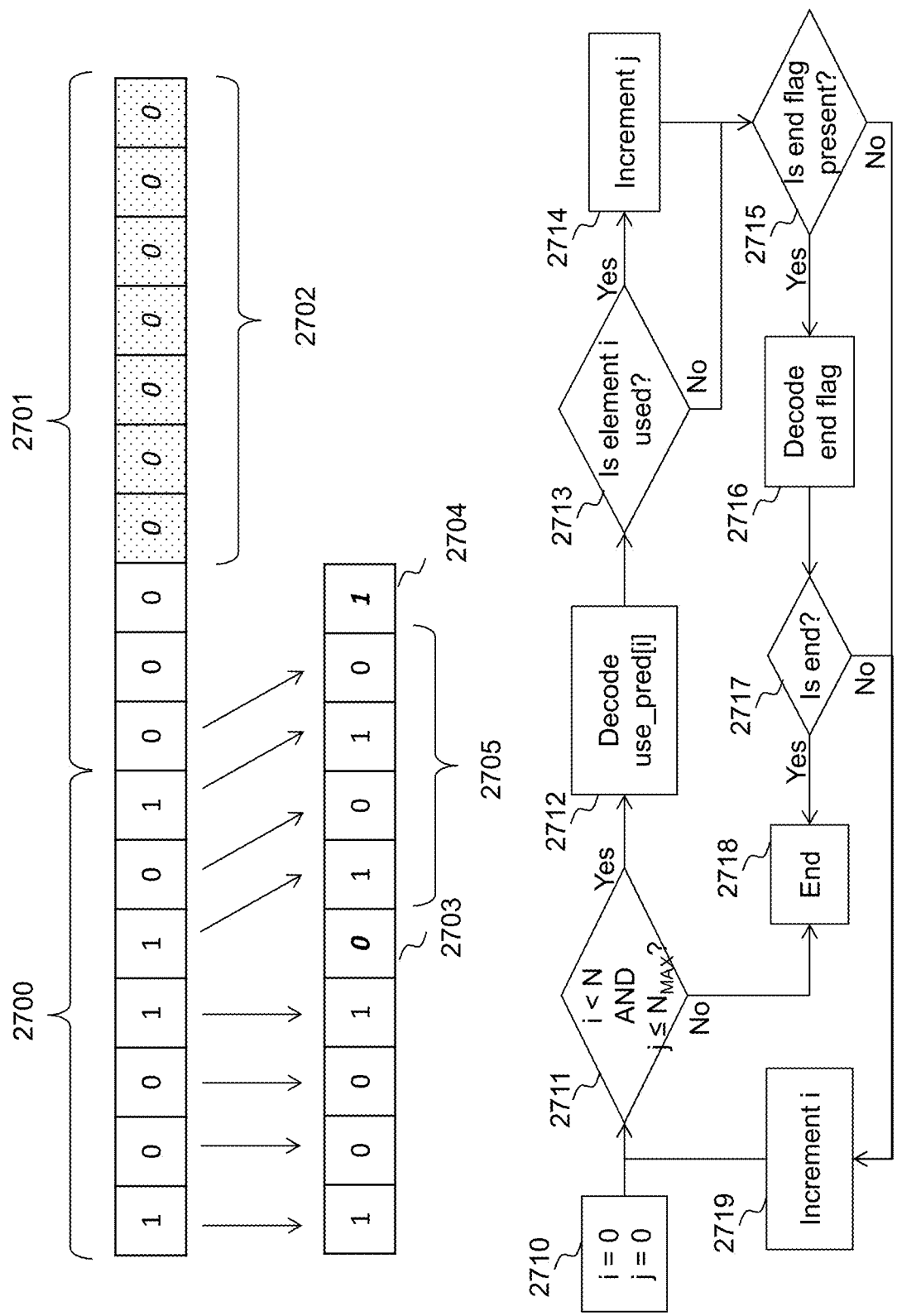
FIG. 27 illustrates a modified syntax for bitmaps of flags defining how a palette can be predicted from a palette predictor, and comprises a flowchart illustrating steps for decoding the modified syntax of a bitmap.

FIG. 27 illustrates a modified syntax for the Use_pred flags associated with a palette predictor (e.g. predictor 2505) to predict a palette (e.g. the palette to process CU3). Note that the modified syntax may be used for any bitmap.

A bitmap as described above (i.e. without the modified syntax) is shown at the top of FIG. 27. It usually includes two parts:

part referenced 2700 which intermingles flags set to "0" and flags set to "1". Part 2700 ends with the last flag set to "1". This part defines all the elements of the palette predictor that are used in the predicted palette; and part referenced 2701 which is the remaining part of the bitmap, exclusively made of flags set to "0" and thus corresponding to elements not reused. Note that it is usual that the last part of the bitmap is made exclusively of "0"s since the corresponding elements are usually the old and less used ones.

Note that this split into two parts is provided here only for illustrative purposes. The bitmap 2700+2701 is provided if the modified syntax according to the invention is not implemented.

Below this bitmap, the bitmap with the modified syntax is shown. One may note that its size is drastically reduced.

The modified syntax exploits the existence of consecutive "0" flags 2702 by inserting additional elements or bits at specific locations in the series of Use_pred flags.

As an illustration, bits 2703 and 2704 have been added to indicate whether or not there are other Use_pred flags set to "1" afterwards in the bitmap.

These additional bits are designated "end-of-prediction" flags and they do not provide indication as to whether or not a corresponding entry in the palette predictor is selected as an entry to predict an entry in the palette currently under construction. On the contrary, these additional flags shift the Use_pred flags to the right.

As an example, the "end-of-prediction" flags may take the value "0" to indicate that there are other flags equal to 1 in the remaining part of the bitmap, while they may take the value "1" when there are no other flags equal to 1 in the remaining of the bitmap.

Regarding the example of 2703 and 2704, the value "0" of flag 2703 indicates that there are remaining elements to predict using the bitmap, as evidenced by the flags being set to 1 in the subpart 2705, while flag 2704 is set to 1, because there is no longer any element predicted (all the other Use_pred flags are set to 0).

As a consequence, while flags 2703 and 2704 were added, subpart 2701 could be entirely skipped, although only subpart 2702 is skipped in the example, thus reducing costs of transmission.

The locations for the additional "end-of-prediction" flags are preferably predefined depending on the properties of the palette mode. However, they should be selected taking into account what follows:

it is worth having an end-of-prediction flag early to avoid sending too many Use_pred flags for small palettes; and it is worth having end-of-prediction flags at periodic intervals, ideally powers of 2, to parse the bitmap easily.

Taking this into account, an embodiment provides predefined positions for the end-of-prediction flags after the 4$^{th}$ Use_pred flag location, and then every eight Use_pred flags starting after the 16$^{th}$ Use_pred flag, then after the 24$^{th}$ Use_pred flag and so on.

The bottom of FIG. 27 is a flowchart illustrating steps for decoding the modified syntax of a bitmap.

The steps 2715 to 2717 of the process are specific to the modified syntax.

Step 2710 initializes the decoding loop by setting the loop counter "i" to 0 and the number "j" of predicted elements to 0.

Step 2711 then checks whether or not there is any element left in the palette predictor (i<N), as it may happen that the predictor is empty (N=0), and that there is no flag left to decode (a palette having a maximum number $N_{MAX}$ of elements).

If there is no further element to process, the process ends at step 2718.

Otherwise, the Use_pred flag is decoded for element i of the palette predictor at step 2712.

At step 2713, it is determined whether or not the element i is used for predicting the palette under construction. For example, a flag set to 1 means that the corresponding element i of the palette predictor is used.

In the affirmative, the number "j" of used elements is incremented at step 2714.

In any case, the process continues with step 2715, rather than going directly to step 2719 as it would without the modified syntax.

Step 2715 checks whether or not an "end-of-prediction" flag (e.g. 2703 or 2704) is present next to the current i$^{th}$ Use_pred flag. For example, the check can be based on the value of "i" (e.g. whether it is 4, 16, 24, . . . as suggested above).

If the next flag is not an "end-of-prediction" flag, a normal process resumes by going to step 2719.

Otherwise, the "end-of-prediction" flag is decoded at step 2716. Once it has been decoded, step 2717 determines whether or not the "end-of-prediction" flag indicates the end of the prediction, i.e. if it is set to 1.

If the "end-of-prediction" flag does not indicate the end of the prediction, the decoding of the Use_pred flags proceeds at step 2719 by selecting the next Use_pred flag through incrementing of the loop counter "i".

If the "end-of-prediction" flag indicates the end of the prediction, the process ends at step 2718.

The outcome of this process is that all relevant Use_pred flags have been obtained to determine which element of the palette predictor should be used for predicting the palette under construction. Note that the elements for which no Use_pred flag has been obtained must be considered as unused.

According to other embodiments regarding the syntax elements, predicting the current palette using the palette predictor comprises obtaining at least one (possibly two or more) entry residual corresponding to the difference between at least one corresponding entry of the current palette and an entry of the palette predictor. In these embodiments, a residual between the current palette element and the palette predictor is transmitted in the bitstream. The residual Res[i] is equal to Pal[i]-Pal_Pred[j], where Res[i] is the residual for level i, Pal[i] is the current palette element for level i, and Pal_Pred[j] is the element predictor identified by level j. Note that the palette predictor j usually needs to be transmitted unless it is known by the decoder (for example because j is fixed relatively to i, for instance j=i).

The decoding of the residual for the three colour components is different from the decoding of the palette element. Indeed, as mentioned in the prior art, a palette element is coded with a fix length of N bits, with N=3*bit-depth. For the residual and in order to save bits, each color component residual may be coded with an adaptive code, such as a Golomb code (in the same way as the coefficients of the block residual).

FIG. 21 illustrates a decoding process based on having such residuals between the palette elements and element predictors. Again, this Figure only shows the part related to the palette decoding. In addition, to simplify the Figure, the bitstream has not been represented.

The decoded size of the palette is extracted from the bitstream at step 2101 and the Palette_size is set equal to the decoded Size+1 at step 2102. The variable i used to successively consider each palette entry is set to 0 at step 2103. Then the loop to decode the palette starts with test 2104 to determine whether or not all the palette entries have been processed. For the palette element i, a flag, Use_pred, is decoded from the bitstream at step 2105 to determine (test 2106) whether or not the palette element i uses prediction or not. If the palette element i does not use prediction, it is decoded at step 2107 using conventional mechanisms and added to the palette at the level equal to i. Then the variable i is incremented by one at step 2108 to consider the next palette element. If the palette element i uses prediction, the predictor index j is decoded from the bitstream at step 2112. Note that for coding efficiency purposes, the length of the code used to encode the predictor index j depends on Predictor_of_Palette_size 2110. Thus, in parallel, the palette predictor 2110 is obtained as described above and Predictor_of_Palette size 2011 is also obtained.

Once the predictor index j is known, the residual Res[i] of the palette element is also decoded from the bitstream at step 2113. Then, the palette element Pal[i] is computed from the formula Res[i]+Pal_Pred[j] at step 2114 using the palette predictor Pal_Pred 2111. The palette element Pal[i] is then added to the current palette. Next, the variable i is incremented by one at step 2108 to consider the next palette element. At the end of this process, the current palette has been decoded.

In one embodiment, the index j is set equal to i, in which case the predictor index j is no longer required to be transmitted to the decoder. Consequently, module 2112 can be omitted. In addition, a residual may be obtained for every element of the current palette that has a corresponding entry with the same entry index/level in the palette predictor. In this case, if i is superior or equal to the Predictor_of_Palette_size, no residual is decoded. Furthermore, the flag Use_pred is no longer required since the decoder knows which palette elements to predict based on Predictor_of_Palette_size. Consequently, modules 2105 and 2106 can be omitted. These approaches reduce the number of signaling bits required for the palette prediction, by removing the signaling of the predictors. This is useful when the palette elements are ordered according to their occurrences.

In embodiments, only one or two colour components out of the three (or more) are predicted.

Above have been described several ways to obtain a palette predictor (FIGS. 14 to 18, 22 and 24 to 26) and several ways to define and signal the prediction of the palette from the palette predictor (FIGS. 19 to 22 and 27). These embodiments can be combined, except that when the current palette is intra predicted, only the residual approach can be used (otherwise two entries would be the same in the palette). In a preferred embodiment, the palette predictor is the last decoded CU with a reset at each line of CTBs or at each CTB; and the palette predictor is signaled with a flag bitmap indicating whether or not the elements of the palette predictor have to be copied in the current palette being built.

Figure 23:
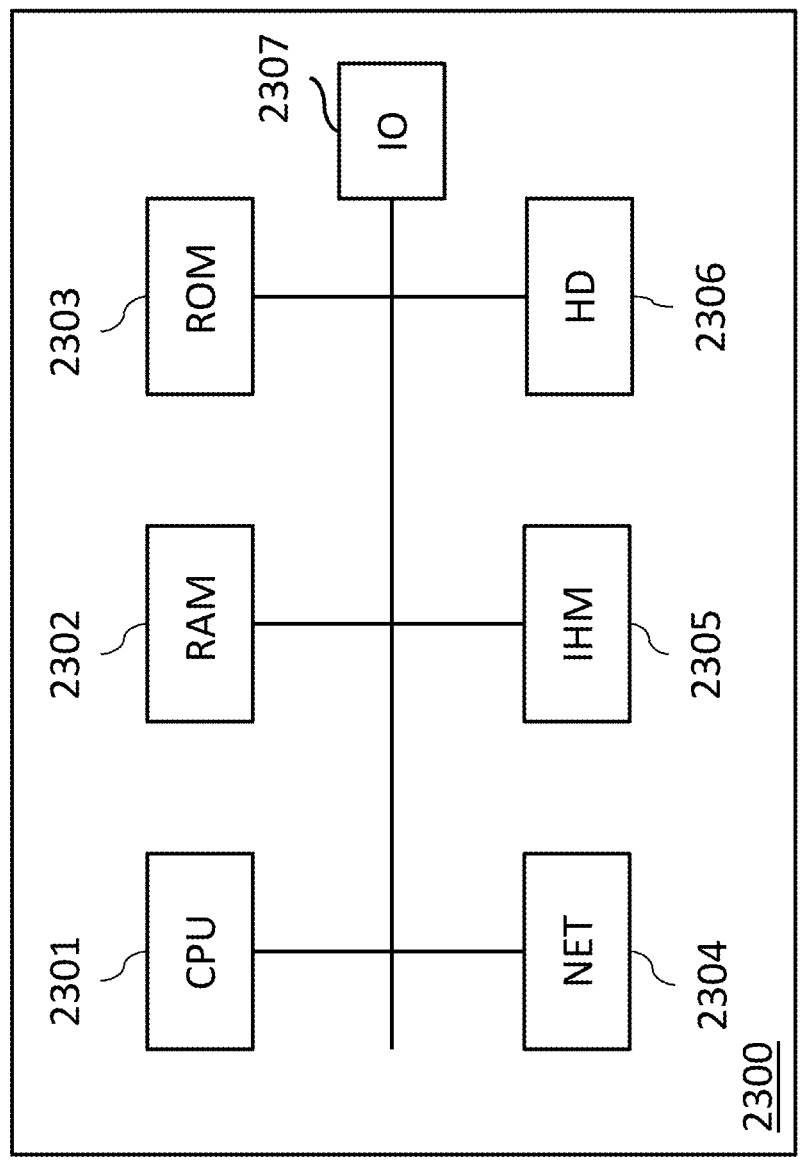
FIG. 23 is a schematic block diagram of a computing device for implementation of one or more embodiments of the invention.

FIG. 23 is a schematic block diagram of a computing device 2300 for implementation of one or more embodiments of the invention. The computing device 2300 may be a device such as a micro-computer, a workstation or a light portable device. The computing device 2300 comprises a communication bus connected to:
- a central processing unit 2301, such as a microprocessor, denoted CPU;
- a random access memory 2302, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;
- a read only memory 2303, denoted ROM, for storing computer programs for implementing embodiments of the invention;
- a network interface 2304 is typically connected to a communication network over which digital data to be processed are transmitted or received. The network interface 2304 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 2301;
- a user interface 2305 may be used for receiving inputs from a user or to display information to a user;
- a hard disk 2306 denoted HD may be provided as a mass storage device;
- an I/O module 2307 may be used for receiving/sending data from/to external devices such as a video source or display.

The executable code may be stored either in read only memory 2303, on the hard disk 2306 or on a removable digital medium such as for example a disk. According to a variant, the executable code of the programs can be received by means of a communication network, via the network interface 2304, in order to be stored in one of the storage means of the communication device 2300, such as the hard disk 2306, before being executed.

The central processing unit 2301 is adapted to control and direct the execution of the instructions or portions of software code of the program or programs according to embodiments of the invention, which instructions are stored in one of the aforementioned storage means. After powering on, the CPU 2301 is capable of executing instructions from main RAM memory 2302 relating to a software application after those instructions have been loaded from the program ROM 2303 or the hard-disk (HD) 2306 for example. Such a software application, when executed by the CPU 2301, causes the steps of the flowcharts shown in FIGS. 14, 15, 17, 19, 21, 22 and 24 to 27 to be performed.

Any step of the algorithms shown in FIGS. 14, 15, 17, 19, 21, 22 and 24 to 27 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for processing a current block of pixels of an image using a palette mode, the palette mode using a current palette that comprises a set of entries associating respective entry indexes with corresponding pixel values, the method comprising:
   selecting an entry from a first palette predictor as an entry of a second palette predictor, the first palette predictor being used to predict entries of a second palette and the second palette predictor being used to predict one or more entries of the current palette;
   selecting all the entries from the second palette as entries of the second palette predictor, said second palette being used to process a block of pixels in the image immediately preceding the current block,
   wherein said prediction of entries of the second palette using the first palette predictor is based on flags, each flag defining whether or not a corresponding entry in the first palette predictor is selected as an entry in the second palette, and
   wherein said selection of an entry from the first palette predictor as an entry of the second palette predictor comprises determining if an entry of the first palette predictor has a corresponding flag that defines no selection of the entry as an entry in the second palette and, if so, selecting that entry of the first palette predictor to be included in the second palette predictor; and
   predicting one or more entries of the current palette using said second palette predictor.

2. The method of claim 1, wherein the first palette predictor is based on a first palette used to process a block of pixels in the image immediately preceding the block of pixels immediately preceding the current block of pixels in the image.

3. The method of claim 1, wherein the flags form a bitmap which includes at least one element at a predefined position in the bitmap for signaling whether or not the bitmap includes, after the predefined position, at least one additional flag that defines selection of an entry of the first palette predictor to generate the second palette.

4. The method of claim 1, wherein the current palette is predicted from the second palette predictor using flags, each flag of which defining whether or not a corresponding entry in the second palette predictor is selected as an entry to generate an entry in the current palette.

5. The method of claim 1, wherein an entry is added to the second palette predictor if there is no similar entry already in the second palette predictor.

6. A method of encoding a sequence of digital images into a bitstream, at least one block of an image being encoded using a palette mode comprising the method of processing a current block of pixels according to claim 1.

7. A method of decoding a bitstream comprising an encoded sequence of digital images, at least one block of an image having been encoded using a palette mode, comprising the method of processing a current block of pixels according to claim 1.

8. A device for processing a current block of pixels of an image using a palette mode, the palette mode using a current palette that comprises a set of entries associating respective entry indexes with corresponding pixel values, the device comprising:
a prediction unit configured to
select an entry from a first palette predictor as an entry of a second palette predictor the first palette predictor being used to predict entries of a second palette and the second palette predictor being used to predict one or more entries of the current palette, and select all the entries from the second palette as entries of the second palette predictor, said second palette being used to process a block of pixels immediately preceding the current block,
wherein said prediction of entries of the second palette using the first palette predictor is based on flags, each flag defining whether or not a corresponding entry in the first palette predictor is selected as an entry in the second palette,
wherein the prediction unit is configured to select the entry from the first palette predictor as an entry of the second palette predictor by determining if an entry of the first palette predictor has a corresponding flag that defines no selection of the entry as an entry in the second palette and, if so, select that entry of the first palette predictor to be included in the second palette predictor for predicting the current palette; and
wherein the prediction unit is configured to predict one or more entries of the current palette using said second palette predictor.

9. A device for processing a current block of pixels of an image using a palette mode, the palette mode using a current palette that comprises a set of entries associating respective entry indexes with corresponding pixel values, the device having a processor and memory configured to:
select an entry from a first palette predictor as an entry of a second palette predictor, the first palette predictor being used to predict entries of a second palette and the second palette predictor being used to predict one or more entries of the current palette;
select all the entries from the second as entries of the second palette predictor, said second palette being used to process a block of pixels in the image immediately preceding the current block,
wherein prediction of entries of the second palette using the first palette predictor is based on flags, each flag defining whether or not a corresponding entry in the first palette predictor is selected as an entry in the second palette, and
wherein said selection of an entry from the first palette predictor as an entry of the second palette predictor comprises determining if an entry of the first palette predictor has a corresponding flag that defines no selection of the entry as an entry in the second palette and, if so, selecting that entry of the first palette predictor to be included in the second palette predictor; and
predicting one or more entries of the current palette using said second palette predictor.

10. A device for encoding a sequence of digital images into a bitstream comprising a processor and memory configured to:
select an entry from a first palette predictor as an entry of a second palette predictor the first palette predictor being used to predict entries of a second palette, and the second palette predictor being used to predict one or more entries of a current palette,
select all the entries from the second palette as entries of the second palette predictor, said second palette being used to process a block of pixels immediately preceding a current block of pixels,
wherein said prediction of entries of the second palette using the first palette predictor is based on flags, each flag defining whether or not a corresponding entry in the first palette predictor is selected as an entry in the second palette, and
wherein said selection of an entry from the first palette predictor as an entry of the second palette predictor comprises determining if an entry of the first palette predictor has a corresponding flag that defines no selection of the entry as an entry in the second palette and, if so, selecting that entry of the first palette predictor to be included in the second palette predictor; and
predicting one or more entries of the current palette using said second palette predictor.

11. A device for decoding a bitstream comprising a sequence of digital images comprising a processor and memory configured to:
select an entry from a first palette predictor as an entry of a second palette predictor, the first palette predictor being used to predict entries of a second palette and the second palette predictor being used to predict entries of a current palette,
select all the entries from the second palette as entries of the second palette predictor, said second palette being used to process a block of pixels in the image immediately preceding the current block,
wherein prediction of entries of the second palette using the first palette predictor is based on flags, each flag defining whether or not a corresponding entry in the first palette predictor is selected as an entry in the second palette, and
said selection of an entry from the first palette predictor as an entry of the second palette predictor includes determining if an entry of the first palette predictor corresponds to a flag that defines no selection of the entry as an entry in the second palette and, if so, selecting that entry of the first palette predictor to be included in the second palette predictor; and predicting one or more entries of the current palette using said second palette predictor.

12. A non-transitory computer-readable medium storing a program which, when executed by a microprocessor or computer system in a device for processing a current block of pixels of an image using a palette mode, the palette mode using a current palette that comprises a set of entries associating respective entry indexes with corresponding pixel values, causes the device to perform a method comprising:

selecting an entry from a first palette predictor as an entry of a second palette predictor, the first palette predictor being used to predict entries of a second palette and the second palette predictor being used to predict one or more entries of the current palette;

selecting all the entries from the second palette as entries of the second palette predictor, said second palette being used to process a block of pixels immediately preceding the current block, wherein prediction of entries of the second palette using the first palette predictor is based on flags, each flag defining whether or not a corresponding entry in the first palette predictor is selected as an entry in the second palette, and said selection of an entry from the first palette predictor as an entry of the second palette predictor comprises determining if an entry of the first palette predictor corresponds to a flag that defines no selection of the entry as an entry in the second palette and, if so, selecting that entry of the first palette predictor to be included in the second palette predictor; and predicting one or more entries of the current palette using said second palette predictor.

\* \* \* \* \*